US005691493A

United States Patent [19]

Usami et al.

[11] Patent Number: 5,691,493

[45] Date of Patent: Nov. 25, 1997

[54] MULTI-CHANNEL TONE GENERATION APPARATUS WITH MULTIPLE CPU'S EXECUTING PROGRAMS IN PARALLEL

[75] Inventors: Ryuji Usami, Akigawa; Kosuke Shiba, Fussa; Koichiro Daigo, Fussa; Kazuo Ogura, Fussa; Jun Hosoda, Hanno; Teruo Jinbo, Fussa; Takashi Akutsu, Akishima; Yoshiki Negoro, Fussa; Yoshito Yamaguchi, Oome; Hajime Manabe, Higashiyamato, all of Japan

[73] Assignee: Casio Computer Co., Ltd., Tokyo, Japan

[21] Appl. No.: 1,184

[22] Filed: Jan. 7, 1993

Related U.S. Application Data

[63] Continuation of Ser. No. 709,101, May 29, 1991, Pat. No. 5,200,564.

[30] Foreign Application Priority Data

| | | | |
|---|---|---|---|
| Jun. 29, 1990 | [JP] | Japan | 2-170161 |
| Jun. 29, 1990 | [JP] | Japan | 2-170169 |
| Jul. 2, 1990 | [JP] | Japan | 2-175133 |

[51] Int. Cl.$^{6}$ .............................. G10H 1/12; G10H 1/14; G10H 7/02; G06F 9/06

[52] U.S. Cl. .............................. 84/602; 84/604; 395/800; 395/553

[58] Field of Search .............................. 395/800, 575, 395/500, 550, 775, 325, 200, 725, 256, 154, 163, 200.15, 553; 84/645, 602, 615, 609, 617, 618, 659, 647, 653, 604, 668; 364/DIG. 1, DIG. 2, 131, 132, 133, 135, 134; 381/101, 102; 370/85.7, 85.8; 340/825.24

[56] References Cited

U.S. PATENT DOCUMENTS

| | | | |
|---|---|---|---|
| Re. 31,004 | 8/1982 | Niimi | 84/661 |
| Re. 33,738 | 11/1991 | Okumura | 84/605 |
| 4,018,121 | 4/1977 | Chowning | 84/696 |
| 4,036,096 | 7/1977 | Tomisawa et al. | 84/607 |
| 4,046,048 | 9/1977 | Bione | 84/668 |
| 4,184,400 | 1/1980 | Niimi | 84/661 |
| 4,338,674 | 7/1982 | Hamada | 84/604 |
| 4,373,416 | 2/1983 | Endo et al. | 84/604 |
| 4,387,617 | 6/1983 | Kato et al. | 84/615 |
| 4,412,470 | 11/1983 | Jones | 84/645 |

(List continued on next page.)

FOREIGN PATENT DOCUMENTS

| | | |
|---|---|---|
| 60-3892 | 1/1975 | Japan . |
| 54-161313 | 12/1979 | Japan . |
| 57-31156 | 7/1982 | Japan . |
| 57-155594 | 9/1982 | Japan . |
| 58-102296 | 6/1983 | Japan . |
| 59-50498 | 3/1984 | Japan . |
| 59-109090 | 6/1984 | Japan . |

(List continued on next page.)

OTHER PUBLICATIONS

Snell, "Design of a Digital Oscillator which will generate up to 256 Low Distortion Sine Waves in Real Time", Computer Music Jounal, Apr. 1977, pp. 4–29.

Vocabulary for Data Processing, Telecommunications, and Office Systems, Jul., 1981, IBM, p. 316.

(List continued on next page.)

*Primary Examiner*—Daniel H. Pan
*Attorney, Agent, or Firm*—Frishauf, Holtz, Goodman, Langer & Chick

[57] ABSTRACT

A main CPU and a sub CPU take share of executing a tone generating process to generate multiple tone signals on a real-time basis without using an exclusive tone generator. The main CPU and sub CPU are formed on a one-chip LSI, thus facilitating realization of a compact electronic musical instrument. According to another structure, the main CPU executes tone generation while the sub CPU performs an effect process, thereby permitting a one-chip LSI to generate an effect-added musical tone.

9 Claims, 60 Drawing Sheets

U.S. PATENT DOCUMENTS

| | | | |
|---|---|---|---|
| 4,449,437 | 5/1984 | Cotton, Jr. et al. | 84/345 |
| 4,472,993 | 9/1984 | Futamase et al. | 84/629 |
| 4,478,124 | 10/1984 | Kikumoto | 84/602 |
| 4,569,268 | 2/1986 | Futamase et al. | 84/626 |
| 4,570,523 | 2/1986 | Futamase et al. | 84/630 |
| 4,586,417 | 5/1986 | Kato et al. | 84/630 |
| 4,591,977 | 5/1986 | Nissen et al. | 395/200.08 |
| 4,611,300 | 9/1986 | Taylor, Jr. et al. | 365/194 |
| 4,625,081 | 11/1986 | Lotito et al. | 379/88 |
| 4,628,789 | 12/1986 | Fujimori | 84/626 |
| 4,641,238 | 2/1987 | Kneib | 364/DIG. 1 |
| 4,644,840 | 2/1987 | Franz et al. | 84/645 |
| 4,649,564 | 3/1987 | Barnett | 381/63 |
| 4,653,375 | 3/1987 | Honda | 84/637 |
| 4,688,090 | 8/1987 | Veitch | 84/644 |
| 4,701,873 | 10/1987 | Schenk | 364/724.16 |
| 4,719,833 | 1/1988 | Katoh et al. | 84/603 |
| 4,725,945 | 2/1988 | Kronstadt et al. | 395/425 |
| 4,744,281 | 5/1988 | Isozaki | 84/602 |
| 4,803,731 | 2/1989 | Niimi et al. | 381/63 |
| 4,831,573 | 5/1989 | Norman | 367/716 |
| 4,843,938 | 7/1989 | Hideo | 84/606 |
| 4,913,025 | 4/1990 | Nakano | 84/711 |
| 4,932,303 | 6/1990 | Kimpara | 84/621 |
| 4,956,785 | 9/1990 | Kawamura et al. | 364/474.01 |
| 4,998,281 | 3/1991 | Sakata | 381/63 |
| 5,007,323 | 4/1991 | Usami | 84/607 |
| 5,014,230 | 5/1991 | Sinha et al. | 364/578 |
| 5,019,960 | 5/1991 | Ando et al. | 364/132 |
| 5,025,702 | 6/1991 | Oya | 84/659 |
| 5,032,975 | 7/1991 | Yamamoto et al. | 364/134 |
| 5,121,667 | 6/1992 | Emery et al. | 84/645 |
| 5,129,302 | 7/1992 | Nishkawa et al. | 84/601 |
| 5,252,775 | 10/1993 | Urano | 84/645 |
| 5,319,151 | 6/1994 | Shiba | 84/603 |

FOREIGN PATENT DOCUMENTS

| | | |
|---|---|---|
| 60-47612 | 10/1985 | Japan . |
| 61-9693 | 1/1986 | Japan . |
| 61-112193 | 5/1986 | Japan . |
| 61-292688 | 12/1986 | Japan . |
| 1-15878 | 3/1989 | Japan . |
| 2-181795 | 7/1990 | Japan . |
| 2-181796 | 7/1990 | Japan . |
| 2-181797 | 7/1990 | Japan . |
| 2 013 386 | 8/1979 | United Kingdom . |
| 2 162 988 | 2/1986 | United Kingdom . |
| 2 168 190 | 6/1986 | United Kingdom . |

OTHER PUBLICATIONS

Dictionary of Computers, Information Processing, and Telecommunications 2nd edition, 1984, John Wiley & Sons, Inc, 383, 498.

Design of Digital Oscilator Which will Generate up to 256 Low Distortion Sine Wave in Real Time, John Snell, Computer Musical Journal, CA, pp. 4–25, Apr., 1977.

Table Lookup Noise for Sinedul Digital Oscilators, F. Richard, Moore, Computer Musical Journal, CA, Apr. 1977.

<table>
<tr><th>COMMAND NAME</th><th>R1 R2 R3</th><th>OPERATION</th></tr>
<tr><td>roma 0</td><td>000</td><td>NO CONVERSION OF ADDRESS AND DATA</td></tr>
<tr><td>roma 1</td><td>100</td><td>OPERATION TO READ OUT SPECIAL WAVEFORM
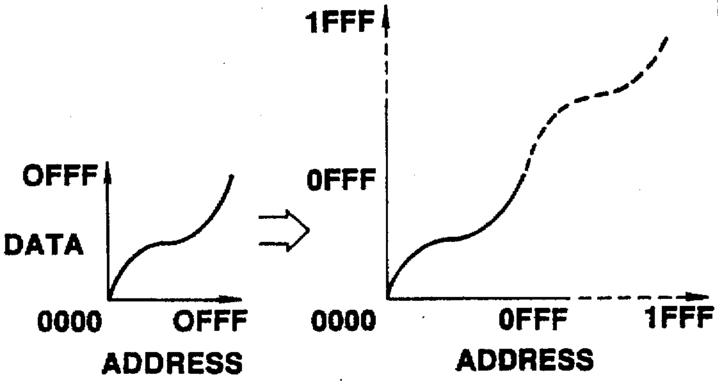

</td></tr>
<tr><td>roma 2</td><td>010</td><td>OPERATION TO READ OUT PART OF EXTERNAL ROM DATA<br>READ LOWER 8 BITS WHEN A15=0<br>READ UPPER 8 BITS WHEN A15=1</td></tr>
<tr><td>roma 3</td><td>001</td><td>
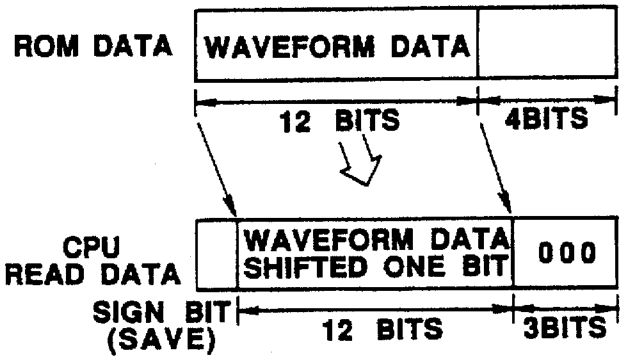

</td></tr>
</table>

FIG.28

| | | | | | | | | |
|---|---|---|---|---|---|---|---|---|
| LFO | LFO | LFO | LFO | LFO | LFO | LFOH | LFOL | LFO DATA |
| DPOINTR | DPOINTL | DERIAAR | DERIAAL | DERIAOR | DERIAOL | | | DELAY ADDRESS DATA |
| C POINT | CERIAA | CERIAO | R POINT | RERIAA | RERIAO | | | CHORUS/ REVERBERATION ADDRESS DATA |
| DRDATAR | DRDATAL | WAVER | WAVEL | EWAVER | EWAVEL | | | WAVEFORM DATA |
| DTIMER | DTIMEL | DRPEATR | DRPEATL | DDEPTHR | DDEPTHL | | | DELAY CONTROL PARAMETER |
| CDEPTH | CDTIME | RT1R | RT2R | RT3R | ---- | ---- | RTmR | CHORUS CONTROL PARAMETER/ RIGHT CHANNEL REVERBERATION DELAY TIME PARAMETER |
| RDEPTH | | RT1L | RT2L | RT3L | ---- | ---- | RTmL | REVERBERATION DEPTH PARAMETER/ LEFT CHANNEL REVERBERATION DELAY TIME PARAMETER |

FIG.62

MULTI-CHANNEL TONE GENERATION APPARATUS WITH MULTIPLE CPU'S EXECUTING PROGRAMS IN PARALLEL

This is a continuation of application Ser. No. 07/709,101 filed May 29, 1991, now U.S. Pat. No. 5,200,564.

BACKGROUND OF THE INVENTION

1. Field of the Invention

The present invention relates to a digital information processing apparatus which digitally executes various processes. More particularly, the present invention pertains to a digital information processing apparatus which has multiple CPUs.

2. Description of the Related Art

Conventionally, various electronic apparatuses are digitized or computerized, and processing circuits have been developed for use in these apparatuses.

For example, in the field of electronic musical instruments, computerization has become common. A tone generating process which requires high-speed processing of a vast amount of data, however, is executed by a specially-designed hardware called a "tone generating circuit". A microcomputer in each electronic musical instrument simply processes control inputs to a musical instrument, such as input through a keyboard or a console panel, control input from an MIDI or other external units, input from an internal or external play memory, and sends a proper command to the tone generating circuit.

There are several problems in the system architecture of such an electronic musical instrument where tone generation is executed by the hardware-based tone generating circuit and processing of control inputs to the musical instrument is executed by the microcomputer. First of all, the hardware-based tone generating circuit is relatively large because the circuit needs a storage device, which temporarily stores data, and an arithmetic operation circuit wherever necessary in various stages for processing musical tone parameters. Secondly, a significant change often becomes inevitable in altering the design of the hardware-based tone generating circuit, thus requiring an enormous amount of time and effort for development of the circuit. Further, the interface between the microcomputer and the hardware-based tone generating circuits should be reviewed for every tone generating circuit, and be redeveloped.

For the above-described reasons, there has been proposed a digital information processing apparatus for an electronic musical instrument which can generate musical tones only by a microcomputer controlled by a program, not using any hardware-based tone generating circuit (U.S. patent application Ser. No. 07/455,978 filed on Dec. 22, 1989, now abandoned).

According to the embodiment of the above application, a single CPU executes a program to generate musical tones. In this case, the processing speed of the CPU needs to be increased to improve the performance of generating musical tones. Since the processing speed of the CPU is restricted by the limited operation speed of a semiconductor device used in the CPU, however, the realizable performance to generate musical tones is limited accordingly.

The forgoing description has been given with reference to an electronic musical instrument, for example, but the same shortcomings may arise in other various types of electronic apparatuses for processing digital information.

SUMMARY OF THE INVENTION

It is therefore a primary object of the present invention to provide a digital information processing apparatus which depends as little as possible on hardware, and is suitable to process a great deal of data at a high speed.

More specifically, it is an object of the present invention to provide a digital information processing apparatus for use in an electronic musical instrument, which has a relatively high performance to generate musical tones without using a hardware-based tone generating circuit.

It is another object of the present invention to provide a digital information processing apparatus for use in an electronic musical instrument, which executes a tone generating process and an effect process based on program control without using tone generating hardware or a hardware-based digital effect circuit.

According to one aspect of the present invention, there is provided a digital information processing apparatus comprising a plurality of CPUs operable by respective programs, and means for permitting the CPUs to execute a predetermined process in parallel in accordance with the programs.

The predetermined process is a process to generate tone signals in the case of a digital information processing apparatus for use in an electronic musical instrument.

With the above arrangement, higher processing performance can be realized as the number of CPUs in use increases.

The identical hardware having no significant difference from the structural point of view may be used for individual CPUs. Basically, programs which are executed by the individual CPUs have only to be designed for the purposes of the processes of these CPUs, thus facilitating the system structure as a digital information processing apparatus.

The present invention proposes improved technologies of accessing the internal data between a plurality of CPUs and preventing an access contention to a common memory shared by the CPUs.

In the case of a digital information processing apparatus for use in an electronic musical instrument, the tone signal generating processes will be executed in parallel. As one example, a plurality of CPUs execute the parallel processing, bearing their share of the tone generating channels. For instance, the first CPU deals with a tone signal generating process for N tone generating channels, and the second CPU deals with a tone signal generating process for another N tone generating channels. This structure is effective in increasing the number of polyphonic sounds that can be simultaneously generated.

As a preferable structural example, the plurality of CPUs include one main CPU and at least one sub CPU to be controlled by the main CPU; the main CPU comprises MCPU program storage means for storing an input processing program for performing an input process to process inputs to a musical instrument and a tone generating program for performing a tone generating process to generate tone signals based on a result of the input process with respect to the musical instrument, MCPU address control means for controlling an address of the MCPU program storage means, MCPU data storage means for storing data necessary for the input process with respect to the musical instrument and the tone generating process, MCPU arithmetic operation means for executing an arithmetic operation, and MCPU operation control means for decoding individual commands of the programs stored in the MCPU program storage means and controlling operations of the MCPU address control means, the MCPU data storage means and the MCPU arithmetic operation means; and the at least one sub CPU each comprises SCPU program storage means for storing a tone generating program for generating musical tones based on the result of the input process with respect to the musical instrument executed by the input processing program stored in the MCPU program storage means, SCPU address control means for controlling an address of the SCPU program storage means, SCPU data storage means for storing data necessary for the tone generating process, SCPU arithmetic operation means for executing an arithmetic operation, and SCPU operation control means for decoding individual commands of the program stored in the SCPU program storage means and controlling operations of the SCPU address control means, the SCPU data storage means and the SCPU arithmetic operation means.

According to another aspect of the present invention, there is provided a digital information processing apparatus comprising a plurality of CPUs operable by respective programs, and means for permitting the CPUs to execute respective portions of one predetermined process in accordance with the programs.

The predetermined process is a process to generate tone signals in the case of a digital information processing apparatus for use in an electronic musical instrument.

With the above arrangement, higher processing performance can be realized as the number of CPUs in use increases.

The identical hardware having no significant difference from the structural point of view may be used for individual CPUs. Basically, programs which are executed by the individual CPUs have only to be designed for the purposes of the processes of these CPUs, thus facilitating the system structure as a digital information processing apparatus.

In the case of a digital information processing apparatus for use in an electronic musical instrument, the tone signal generating processes will be executed in parallel, but the parallel processing may be performed in various modes. In one mode, a plurality of CPUs may be connected in a pipelining manner to carry out the parallel tone signal generating process. For instance, the first CPU deals with a first portion of the entire process of generating tone signals, while the second CPU deals with the second portion in the tone generating process in accordance with the result of the processing executed by the first CPU. The individual CPUs execute the processing at a predetermined interval in order to maintain the rate of sampling tone output data. While one CPU is executing a partial process j for the i-th tone data sample, the next CPU executes a partial process (j+1) for the (i−1)-th tone data sample. In the pipelined system, generally, the processing time from the entrance of the pipeline to the exit often becomes a problem as a response delay. In the case where the digital information processing apparatus is applied to an electronic musical instrument, however, fortunately a response delay of about several milliseconds does not matter. If the sampling frequency for tone output data (corresponding to the interval of executing the partial processes for individual CPUs) is set to 20 KHz with the pipeline-originated response delay of one millisecond, therefore, twenty CPUs at a maximum can be pipeline-connected. The structure having multiple or a plurality of CPUs pipeline-connected to generate musical tones is thus effective in the case of employing a tone synthesizing system which has a complicated tone-synthesizing algorithm and requires many processes. In a specific mode, when the tone signal generating process includes a process for the general system control and a tone generating process, the first CPU may bear its share and deal with the control process and the first portion of the tone generating process, and the second CPU may bear its share of the remaining portion of the tone generating process. In this example, although the tone generating process is properly divided and the partial processes are allotted to the two CPUs, it is desirable that the partial process, such as multiplication, requiring a relatively long processing time be allotted to the second CPU, while allotting the remaining portion of the processing with a relatively low burden to the first CPU that should perform the general system control. More specifically, when the tone generating process includes an envelope process and a waveform process for adding an envelope to a tone signal, the first CPU executes only the envelope process which does not involve multiplication, while the second CPU executes the waveform process which involves multiplication of the envelope data originated from the envelope process. In this manner, the burden on each CPU can be significantly reduced, thereby improving the processing speed and enhancing the tone generating performance.

According to a further aspect of the present invention, the first CPU may handle the general control process while the second CPU exclusively copes with the tone generating process. In this case, even if alteration of a tone generating circuit is necessary, the hardware need not be changed, so that the digital information processing apparatus of the present invention can easily applied to various types of electronic musical instruments.

As a preferable example of the structure of the first and second CPUs, the multiple CPUs include one main CPU and at least one sub CPU to be controlled by the main CPU; the main CPU comprises MCPU program storage means for storing an input processing program for performing an input process to process inputs to a musical instrument and a tone generating program for performing a tone generating process to generate tone signals based on a result of the input process with respect to the musical instrument, MCPU address control means for controlling an address of the MCPU program storage means, MCPU data storage means for storing data necessary for the input process with respect to the musical instrument and the tone generating process, MCPU arithmetic operation means for executing an arithmetic operation, and MCPU operation control means for decoding individual commands of the programs stored in the MCPU program storage means and controlling operations of the MCPU address control means, the MCPU data storage means and the MCPU arithmetic operation means; and the at least one sub CPU each comprises SCPU program storage means for storing a tone generating program for generating musical tones based on the result of the input process with respect to the musical instrument executed by the input processing program stored in the MCPU program storage means, SCPU address control means for controlling an address of the SCPU program storage means, SCPU data storage means for storing data necessary for the tone generating process, SCPU arithmetic operation means for executing an arithmetic operation, and SCPU operation control means for decoding individual commands of the program stored in the SCPU program storage means and controlling operations of the SCPU address control means, the SCPU data storage means and the SCPU arithmetic operation means.

According to a different aspect of the present invention, there is provided a digital information processing apparatus comprising multiple CPUs operable by respective programs, and means for permitting the multiple CPUs to take their share in executing multiple predetermined processes in accordance with the programs.

The multiple predetermined processes are a process to generate tone signals and an effect process for the tone signals in the case of a digital information processing apparatus for use in an electronic musical instrument.

with the above arrangement, higher processing performance can be realized as the number of CPUs in use increases.

The identical hardware having no significant difference from the structural point of view may be used for individual CPUs. Basically, programs which are executed by the individual CPUs have only to be designed for the purposes of the processes of these CPUs, thus facilitating the system structure as a digital information processing apparatus.

In the case of a digital information processing apparatus for use in an electronic musical instrument, the tone signal generating processes will be executed in parallel, but the parallel processing may be performed in various modes. In one mode, multiple CPUs may be pipeline-connected to execute the parallel processing involving tone signal generation and addition of an effect to a tone signal. For instance, the first CPU handles the tone signal generating process while the second CPU deals with the effect adding process in accordance with the result of the processing executed by the first CPU. The individual CPUs execute the processing at a predetermined interval in order to maintain the rate of sampling tone output data. While one CPU is executing a process for the i-th tone data sample, the next CPU executes the effect adding process for the (i−1)-th tone data sample. In addition, each tone generating process and effect process may be divided into partial processes, which can be executed through the pipeline process of the multiple CPUs. In the pipelined system, generally, the processing time from the entrance of the pipeline to the exit often becomes a problem as a response delay. In the case where the digital information processing apparatus is applied to an electronic musical instrument, however, fortunately a response delay of about several milliseconds does not matter. If the sampling frequency for tone output data (corresponding to the interval of executing the partial processes for individual CPUs) is set to 20 KHz with the pipeline-originated response delay of one millisecond, therefore, twenty CPUs at a maximum can be pipeline-connected. The structure having multiple CPUs pipeline-connected to generate musical tones and add an effect to the musical tones is thus effective in the case of employing a tone-synthesizing and effect-adding system which has complicated algorithms for tone synthesis and addition of an effect and requires many processes.

As a preferable structural example of the present invention, at least two CPUs are used. More specifically, in this case, the multiple CPUs include one main CPU and at least one sub CPU to be controlled by the main CPU; the main CPU comprises MCPU program storage means for storing an input processing program for performing an input process to process inputs to a musical instrument and a tone generating program for performing a tone generating process to generate tone signals based on a result of the input process with respect to the musical instrument, MCPU address control means for controlling an address of the MCPU program storage means, MCPU data storage means for storing data necessary for the input process with respect to the musical instrument and the tone generating process, MCPU arithmetic operation means for executing an arithmetic operation, and MCPU operation control means for decoding individual commands of the programs stored in the MCPU program storage means and controlling operations of the MCPU address control means, the MCPU data storage means and the MCPU arithmetic operation means; and the at least one sub CPU comprises SCPU program storage means for storing an effect process program for adding an effect to the tone signals generated by the main CPU in accordance with the input process executed by the input processing program in the MCPU program storage means, SCPU address control means for controlling an address of the SCPU program storage means, SCPU data storage means for storing data necessary for adding the effect, SCPU arithmetic operation means for executing an arithmetic operation, and SCPU operation control means for decoding individual commands of the program stored in the SCPU program storage means and controlling operations of the SCPU address control means, the SCPU data storage means and the SCPU arithmetic operation means.

Further, with the above structure, the main CPU executes a process according to the tone generating program for each sampling period, and the sub CPU performs a process according to the effect process program for each sampling period with respect to a tone signal transferred from the main CPU, and outputs a resulting effect-added tone signal in synchronism with the sampling period.

It is preferable that the sub CPU comprises first latch means for latching the effect-added tone signal at the timing of a program control signal from the SCPU operation control means, and second latch means, provided between the output of the first latch means and the input of digital/analog converting means, for latching the output signal from the first latch means at the timing of an accurate sampling period signal.

With the above structure, the effect-added tone signal can be output as an analog signal with less distortion in the accurate sampling period. In other words, the period for the digital-to-analog conversion in the digital/analog converting means can be kept with the accuracy of the sampling period signal, so that the distortion occurring in the process of digital-to-analog conversion is made as small as possible, permitting an effect-added, high-quality acoustic signal to be output outside.

It would be obvious for those skilled in the art from the following description of preferred embodiments that the present invention may take other structures and modifications and may be applied to other applications as well.

BRIEF DESCRIPTION OF THE DRAWINGS

Other objects and features of the present invention will be readily understood by those skilled in the art from the following description of preferred embodiments of the present invention in conjunction with the accompanying drawings of which:

FIG. 28 is a diagram illustrating a list of external memory access commands including a command to convert data from an external memory and fetch it;

FIG. 62 is a diagram illustrating a RAM table of the SCPU for an effect process.

DETAILED DESCRIPTION OF THE PREFERRED EMBODIMENTS

Preferred embodiments of the present invention will now be described in detail referring to the accompanying drawings.

<FIRST EMBODIMENT>

<Outline>

According to the first embodiment, the present invention is applied to an electronic musical instrument. This embodiment (FIGS. 1 to 34) has several features. The first feature of this embodiment lies in that multiple microcomputers or CPUs, which are operated by respective programs, are used as tone generators for generating musical tones and no conventional specially-designed hardware-based tone generator is required. One of the CPUs functions as a main CPU or a master CPU (10), which not only generates musical tones but also deals with input units, such as a keyboard and function keys, and output units, such as DAC, according to an application (a musical instrument in this case)(see FIGS. 4 and 5). The other CPUs serve as sub CPUs or slave CPUs (20) with respect to the master CPU, and execute a tone generating process (see FIG. 6). Therefore, the individual CPUs take their share of the load of the tone generating process.

The second feature is concerned with a mechanism for each sub CPU to start and terminate its operation. According to the first embodiment, the sub CPU starts in response to a timer interrupt that requests the master CPU to execute tone generation, so that the master CPU and the sub CPU execute a tone generating process in parallel. When the sub CPU terminates its operation (tone generating process), the sub CPU issues an end signal and is reset (stopped) by the end signal which is then sent to the master CPU (see FIGS. 8 and 16). Owing to this feature, the master CPU can effectively control and grasp the operational period of the sub CPU. This feature can permit efficient execution of a tone generating task which demands a high-speed operation (a task for generating a digital sample of a tone signal).

Figure 16:
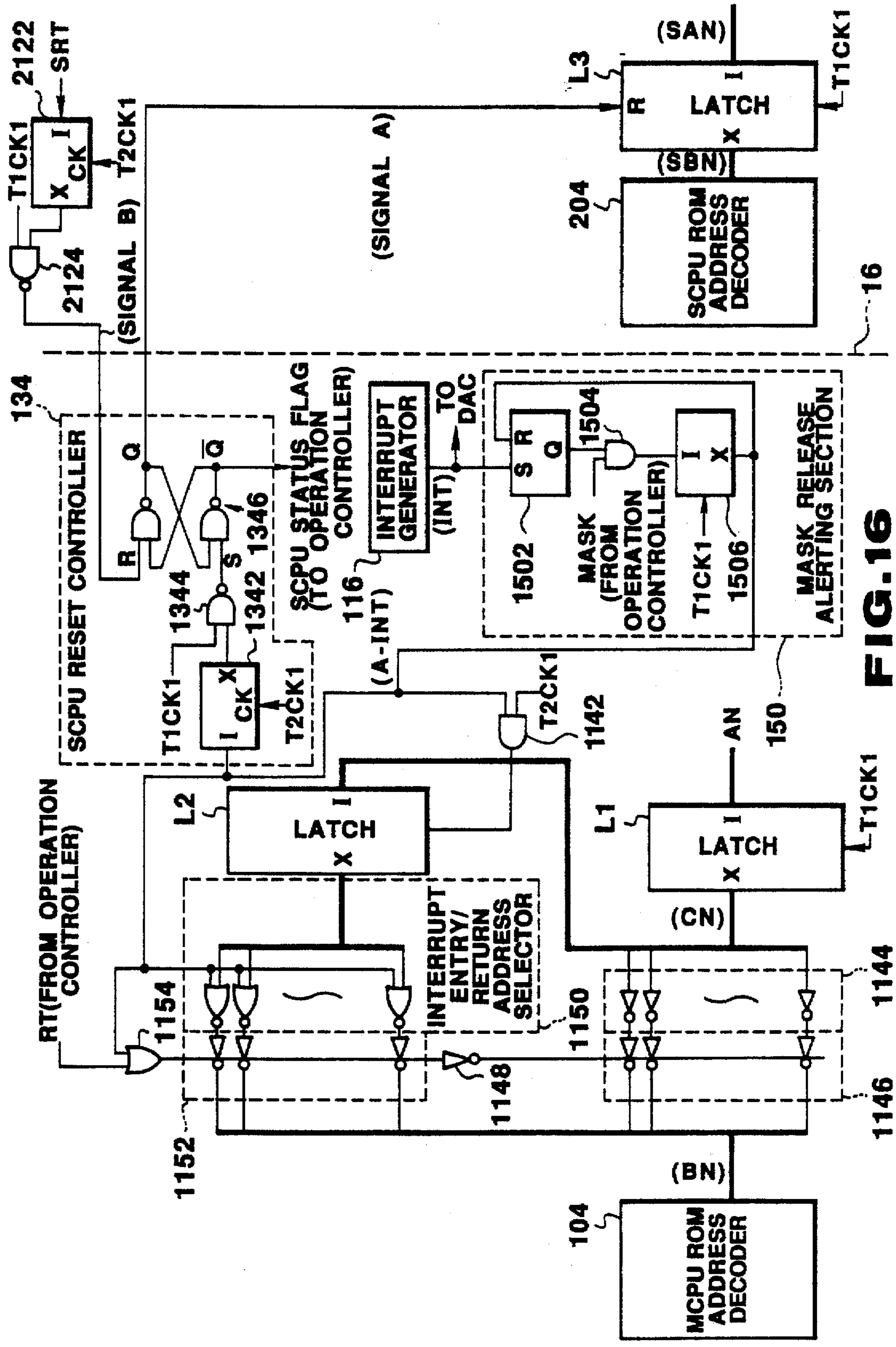
FIG. 16 is a block diagram illustrating a circuit which has an interrupt mask function.
Figure 17:
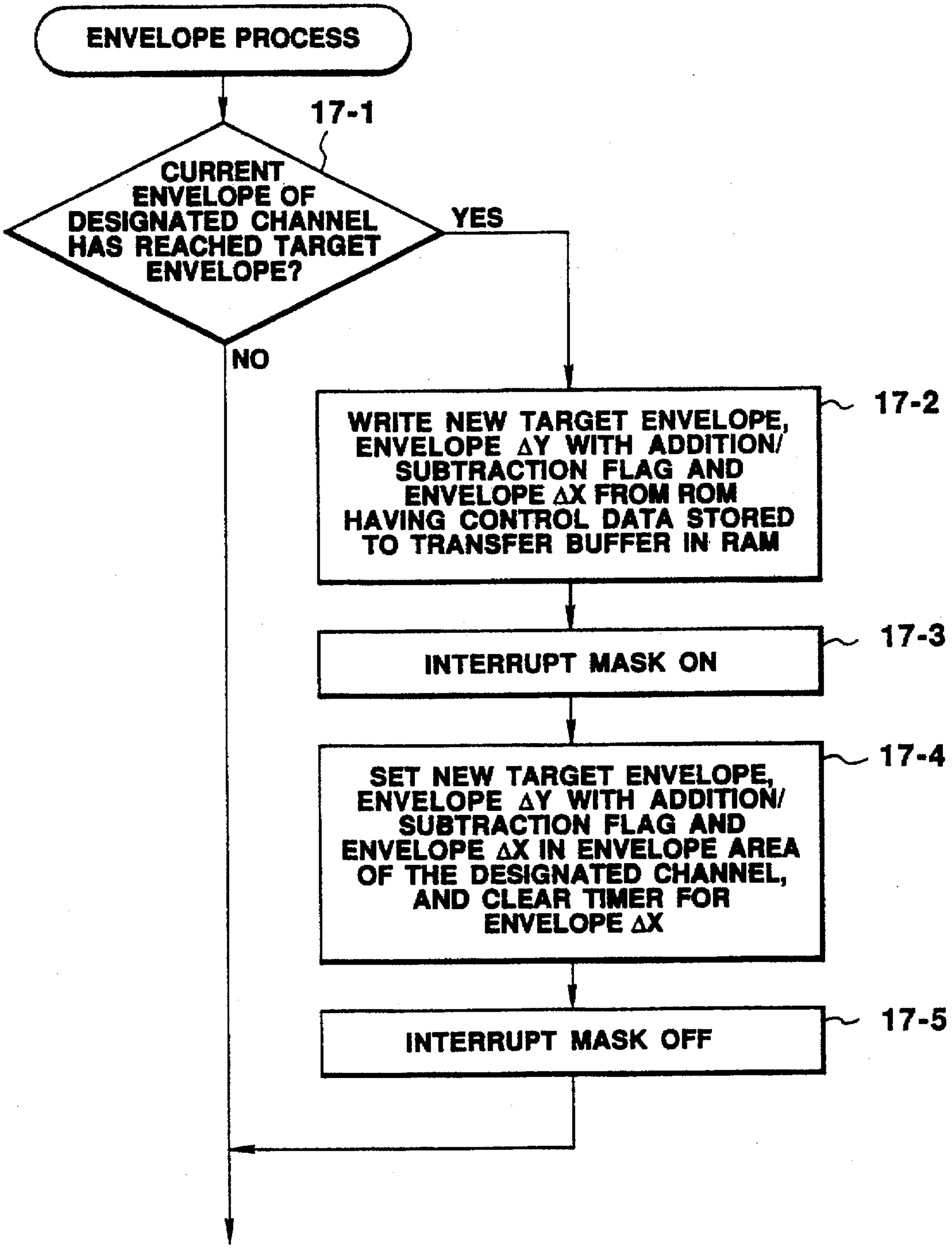
FIG. 17 is a flowchart of an envelope setting process in an interrupt mask system.

The third feature of this embodiment is concerned with updating (transfer) of data which is given from the main program to a timer interrupt routine. After the interrupt routine is executed, it is necessary to update multiple pieces of data to be referred to in the interrupt routine (for example, envelope parameters, such as an envelope target value and an envelope rate). Commands for updating these pieces of data are included in the main program. In other words, these pieces of data are to be updated by the main program, and to be referred to by the timer interrupt routine. Since such multiple pieces of data generally constitute significant information, the control should not be shifted to the interrupt routine before all the multiple pieces of data are updated in the main program. To prevent such a control shift, there are two systems disclosed. The first system hinders the control shift to the interrupt routine by masking an interrupt until the data renewal is completed (FIGS. 16 and 17). The second system executes the renewal (transfer) of multiple pieces of data by a single command in the main program (FIGS. 18 to 21). Consequently, the result of the interrupt routine (the sample of a tone signal) indicates the correct value, thus ensuring the correct operation.

Figure 22:
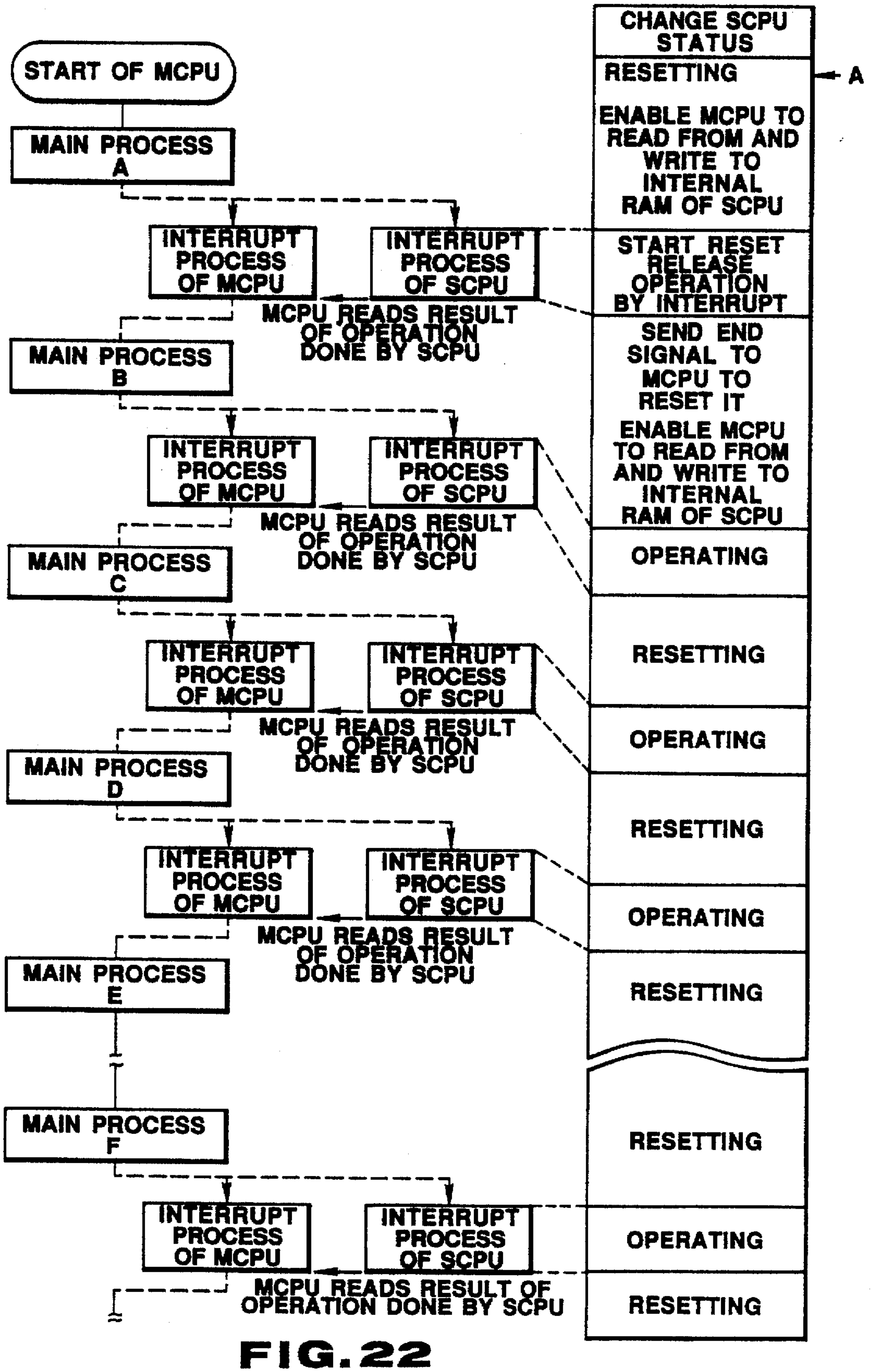
FIG. 22 is a flowchart for explaining a function of the MCPU to access the SCPU using a stop mode of the SCPU.
Figure 23:
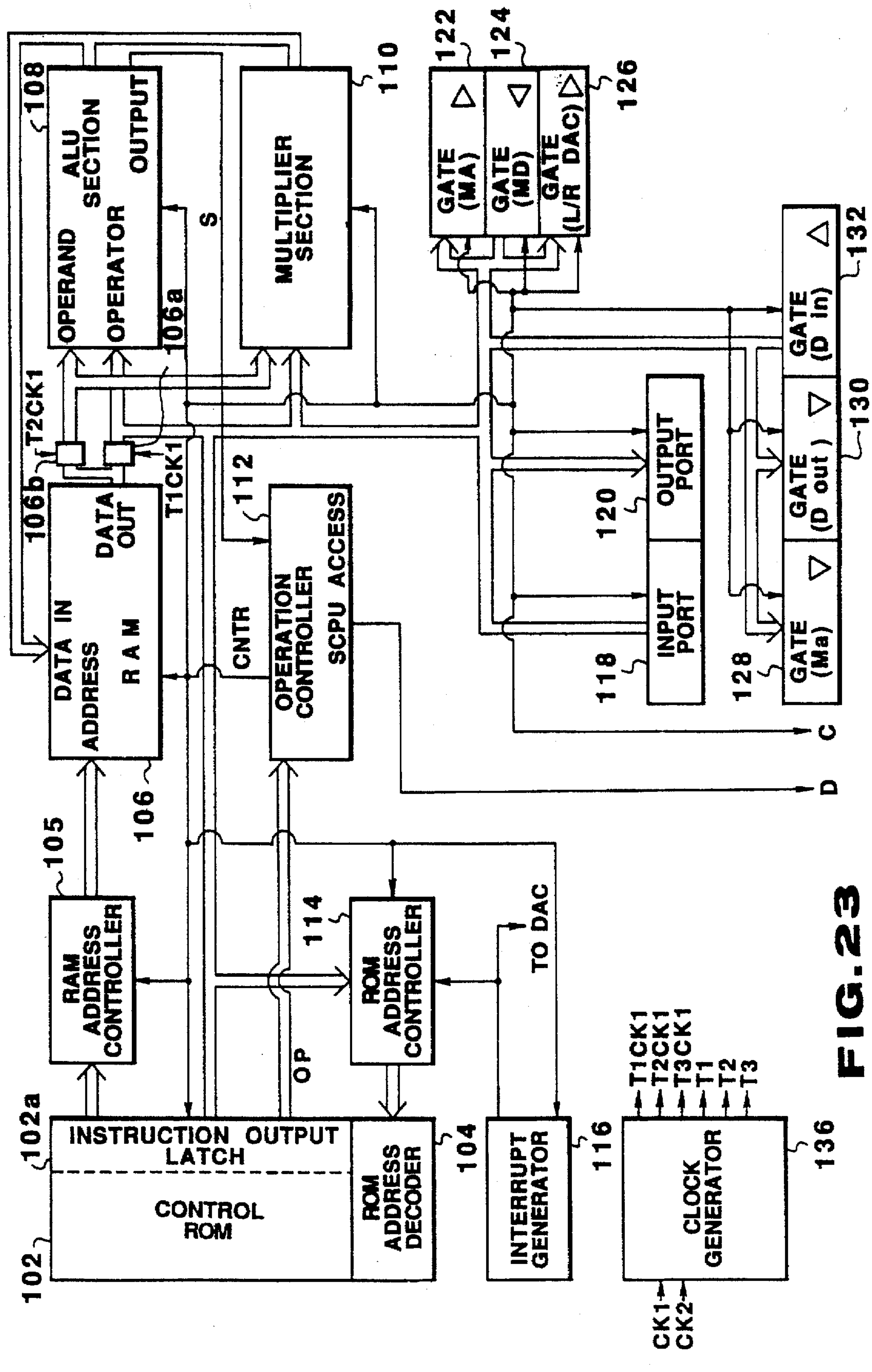
FIG. 23 is a block diagram of the MCPU which functions an instantaneous forced access to the SCPU.
Figure 24:
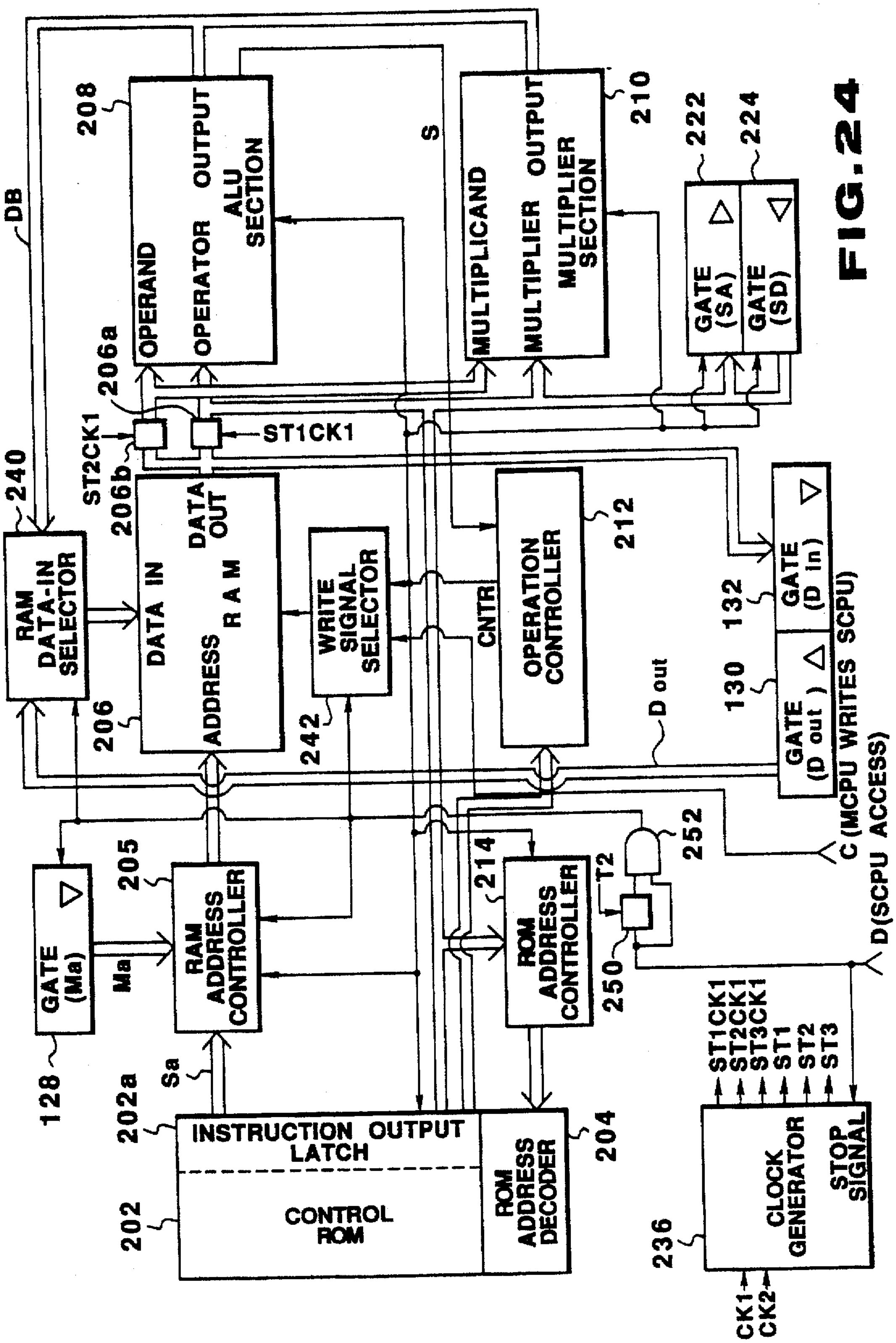
FIG. 24 is a block diagram illustrating the SCPU which is suitable for the instantaneous forced access to the SCPU.
Figure 25:
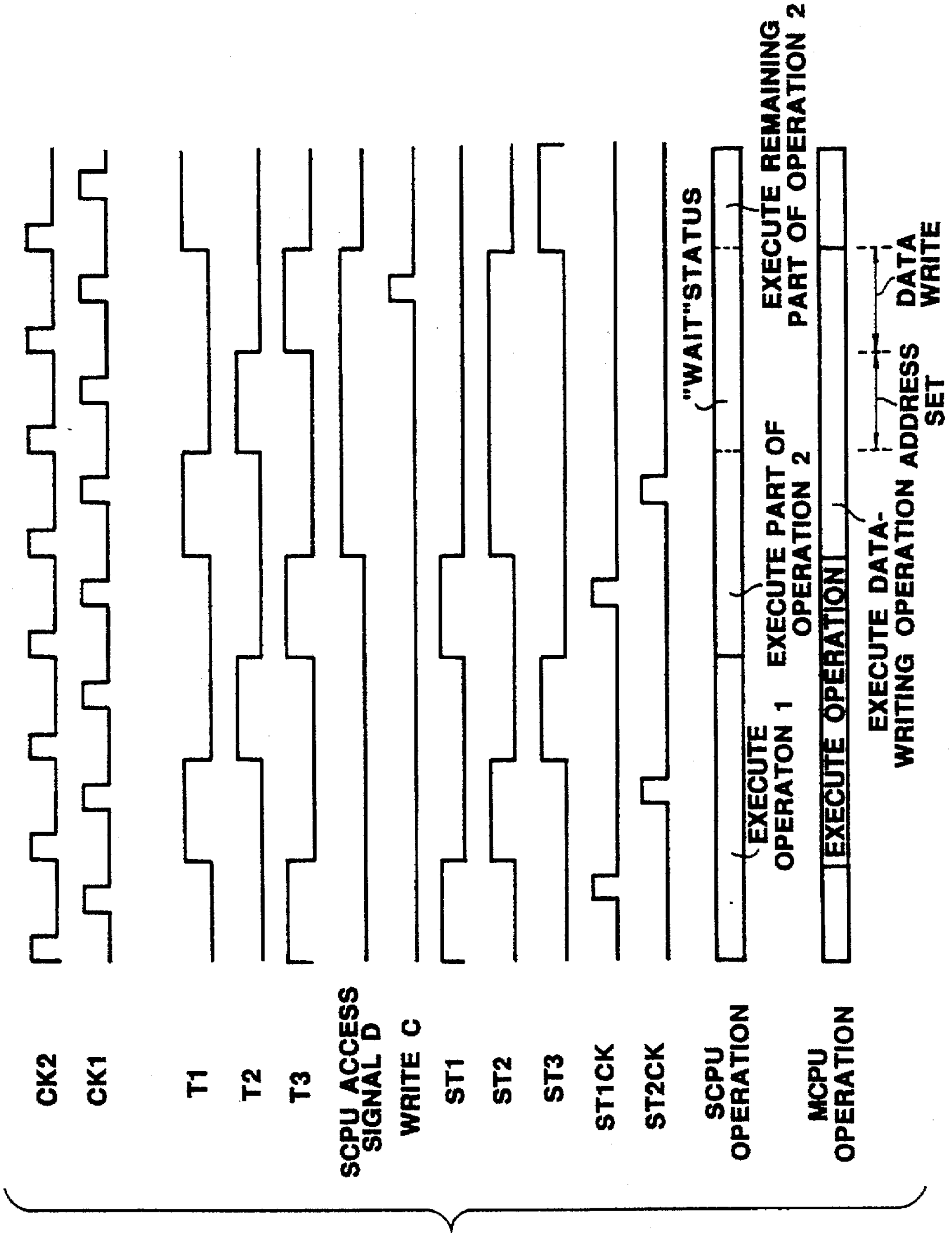
FIG. 25 is a time chart of the operation in a case where the MCPU writes data into an internal RAM of the SCPU.

The fourth feature of the embodiment is concerned with data access from the master CPU to the slave CPU. In a conventional multiple CPU microcomputer system, data transfer between CPUs is usually done through a series of sequences, and takes considerable time. Generally, an access request signal is sent from a CPU, which requests data access, to a CPU which is requested such an access. In response to the access request signal, the access-requested CPU sends an acknowledge signal to the other CPU after completing an operation in progress, and is then disabled. After sending the access request signal, the access-requesting CPU enters a wait status until reception of an acknowledge signal. In response to the acknowledge signal, the access-requesting CPU performs the actual data access to the internal memory of the requested CPU. As the conventional system of data access between CPUs requires time, it is therefore inadequate for an application, such as an electronic musical instrument which needs a high-speed process. To overcome this problem, according to this embodiment the first data access system is a stop mode control system in which, utilizing the second feature, the master CPU reads or writes (or accesses) data from or into the internal memory of the sub CPU while the sub CPU is disabled (FIG. 22), and the second data access system is a momentary data access system in which the master CPU performs data access to the sub CPU without any wait (the sub CPU is forcibly disabled only during data accessing) (FIGS. 23 to 25).

The fifth feature of this embodiment is concerned with a contention (conflict) of accesses from multiple CPUs in a case that the multiple CPUs share an external memory, located outside the CPUs, as a data source. According to this embodiment, a memory contention preventing circuit (50), to be described later, is provided to avoid any access contention to the common memory, and permit data acquisition from the common memory after a given wait period.

The sixth feature of this embodiment is concerned with fast data conversion, such as shift, inversion and partial fetching. In the prior art, to obtain converted data on an internal memory (arithmetic operation memory) of a CPU from data in a data memory like the above external memory, the data in the external memory is transferred to the arithmetic operation memory by a transfer (read access) command, and is then converted through an ALU section by a conversion command. Multiple conversion commands often have to be executed to perform the desired data conversion. The conventional system therefore needs time for data conversion, which will be a big problem for an application which involves high-speed processing, such as tone generation. To overcome this problem, according to this embodiment, data address conversion hardware (60 and 70) is provided so that when a special transfer command (a conversion-involved transfer command) is executed, the desired data conversion is performed by data address conversion hardware which responds to the command transfers data and the converted data is fetched into arithmetic operation memories (106 and 206). Therefore, a single command, not multiple commands, has only to be executed to acquire the necessary converted data, thereby improving the processing speed.

<General Structure (FIG. 1)>

Figure 1:
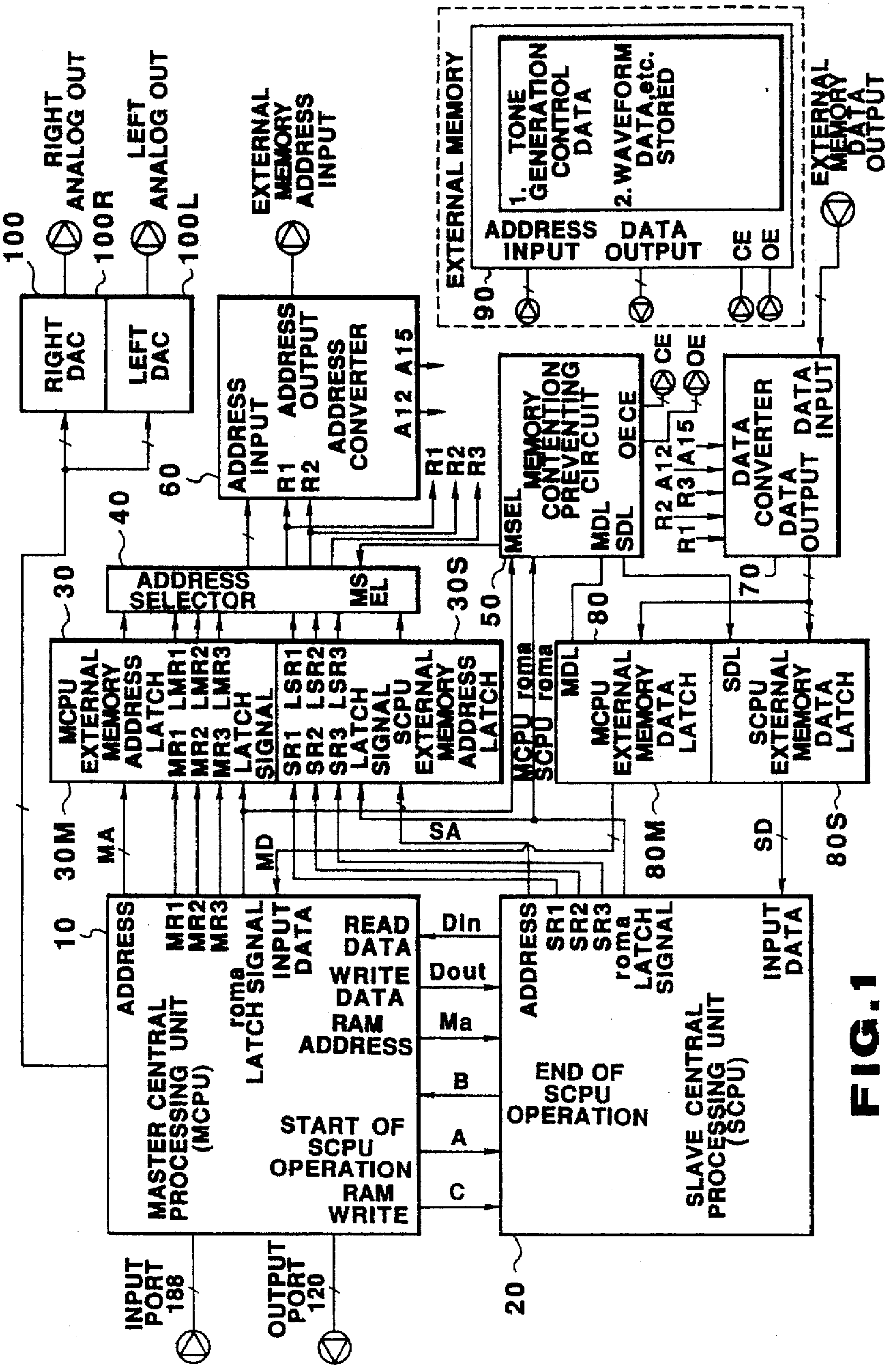
FIG. 1 is a diagram illustrating the general structure of a digital information processing apparatus for an electronic musical instrument according to the first embodiment of the present invention.
Figure 4:
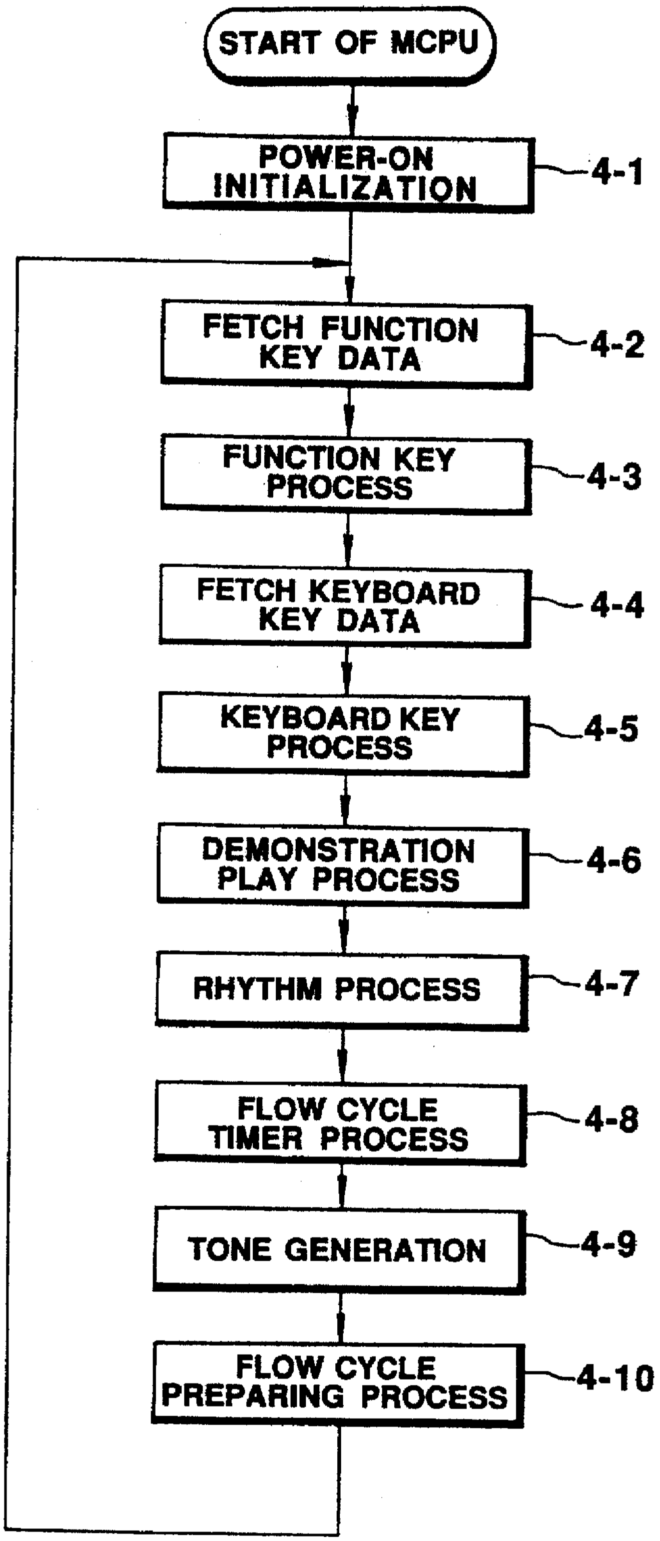
FIG. 4 is a flowchart representing a main program to be executed by the MCPU in FIG. 1.
Figure 5:
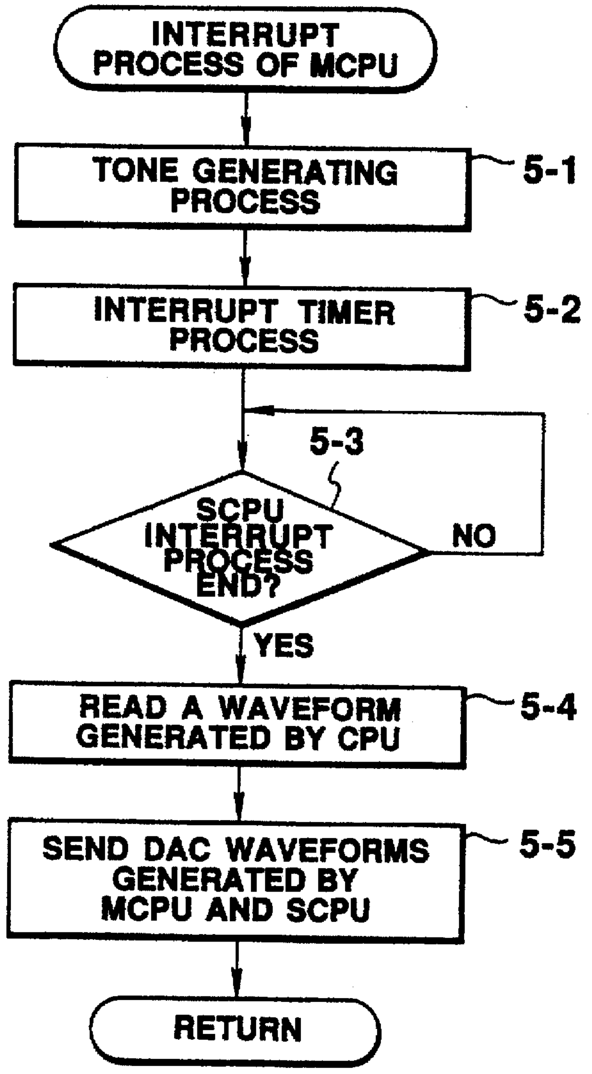
FIG. 5 is a flowchart showing an interrupt routine to be executed by the MCPU.
Figure 6:
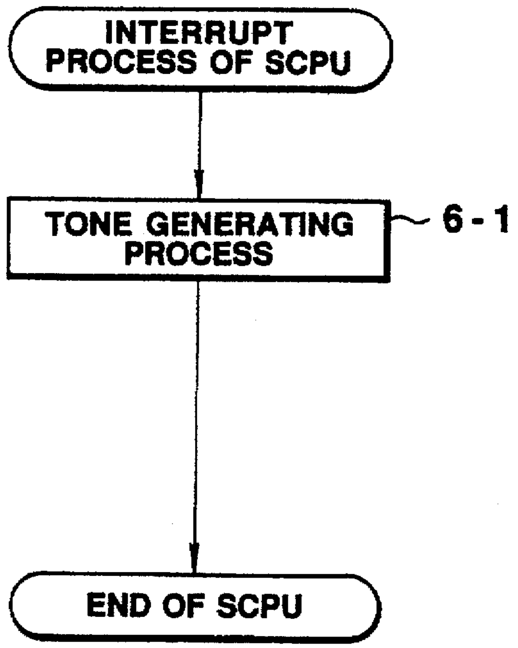
FIG. 6 is a flowchart showing a program to be executed by the SCPU.

FIG. 1 is a block diagram illustrating the general structure of this embodiment as a digital information processing apparatus of an electronic musical instrument. This system comprises two central processing units on a single LSI chip (one of the CPUs is referred to as "MCPU 10" and the other as "SCPU 20"). The CPUs 10 and 20 incorporate programs, and operate according to their own programs. The MCPU 10 generates musical tones (FIG. 5), performs the general control of the system; for example, processes input information from input units (a keyboard, function keys, etc.) to be connected to an input port 188 and an output port 120, and controls a DAC 100 which converts a digital musical tone signal to an analog musical tone signal (FIG. 4). The SCPU 20 is exclusively used for the tone generating process (FIG. 6).

Reference numeral "90" denotes a memory as a source of data such as tone generating control data and waveform data. The data memory 90 includes a ROM located outside of an LSI chip on which the remaining devices shown in FIG. 1 are mounted. With higher integration, it is possible to mount the data memory 90 as an internal memory on a single LSI chip. The external data memory 90 is used by both the MCPU 10 and the SCPU 20. The MCPU 10 supplies address information to the address input terminal of the external data memory 90 via an address bus MA connected to the MCPU 10, an MCPU external memory address latch 30M of an external memory address latch 30, an address selector 40 and an address converter 60. The SCPU 20 supplies address information to the address input terminal of the external data memory 90 via an address bus SA connected to the SCPU 20, an SCPU external memory address latch 30S, the address selector 40 and the address converter 60. A data transfer path from the external data memory 90 to the MCPU 10 is formed by the data output of the external data memory 90, a data converter 70, an MCPU external memory data latch 80M of an external memory data latch 80, and a data bus MD connected to the MCPU 10. A data transfer path from the external data memory 90 to the SCPU 20 is along a data output from the external data memory 90, the data converter 70, the SCPU external memory data latch 80S, and a data bus SD connected to the SCPU 20.

The memory contention preventing circuit 50 controls the MCPU 10 and SCPU 20, which access the external memory 90, to avoid any contention. In response to a signal roma from the MCPU 10 and a signal roma from the SCPU 20, both requesting access to the external memory 90, the circuit 50 allows the address selector 40 to select one of addresses from the MCPU 10 and the SCPU 20 as an address to the external memory 90. According to a select signal MSEL from the circuit 50, the address selector 40 performs selection. When an address to the external memory 90 is determined, the circuit 50 then sets a chip select signal CE and an output enable signal OE active with respect to the external memory 90. Data is sent from the external memory 90 through the data converter 70 to the input bus of the external memory latch 80. At this time, the circuit 50 enables either the MCPU external memory data latch 80M or the SCPU external memory data latch 80S to latch data in order to send data to the CPU requesting data access. Accordingly, the MCPU external memory data latch 80M performs a latch operation in response to a latch signal MDL from the circuit 50, while the SCPU latch 80S performs a latch operation in response to a latch signal SDL from the circuit 50.

The address converter 60 and the data converter 70 are conversion devices to fetch data of the external data memory 90 after conversion to the CPUs 10 and 20. The address converter 60 selectively alters an address sent through the address selector 40, i.e., an address (logical address) from one of the CPUs (the MCPU 10 or the SCPU 20), forming an address to be actually sent to the external data memory 90. A control signal is used to designate a conversion mode of the converters 60 and 70. The CPUs 10 and 20 execute a transfer command to access data to the external data memory 90. Control signals which are generated in the CPUs based on a transfer command are expressed by MR1, MR2 and MR3 (of the MCPU 10) and SR1, SR2 and SR3 (of the SCPU 20). These signals are referred to as signals R1, R2 and R3 after passing through the address selector 40 (MRi→LMRi→Ri or SRi→LSRi→Ri). The control signals R1 and R2 are sent to the address converter 60 to designate a conversion mode. Further, to determine a conversion mode of the data converter 70, the control signals R1, R2 and R3 and a signal A12 of address bit 12 and a signal A15 of address bit 15 are sent to the data converter 70. The address converter 60 and the data converter 70 will be described in detail later.

Multiple signals are exchanged between the MCPU 10 and SCPU 20 to determine the interface between both CPUs. A signal A, which is sent from the MCPU 10 to the SCPU 20, indicates the start of the operation of the SCPU 20; a signal B indicates the end of the operation of the SCPU 20; Ma is address information of the internal memory of the SCPU 20 (see reference numeral "206" in FIG. 3), which is sent from the MCPU 10 to the SCPU 20; a signal C is a read/write control signal for the internal memory of the SCPU 20, which is sent from the MCPU 10 to the SCPU 20; Din is data which is read from the internal memory of the SCPU 20, and is sent from the SCPU 20 to the MCPU 10; and Dour is data which is to be written in the internal memory of the SCPU 20, and is sent from the SCPU 20 to the MCPU 10. The interface between the CPUs will be described in detail later.

As described above, a digital musical tone signal is generated by the MCPU 10 and SCPU 20 in a tone generating process. The generated signal is sent from the MCPU 10 to a digital/analog converter (DAC) 100 comprising a right DAC 100R and a left DAC 100L, where it is converted into an analog musical tone signal, and is output outside.

<Structures of MCPU and SCPU (FIGS. 2 and 3)>

Figure 2:
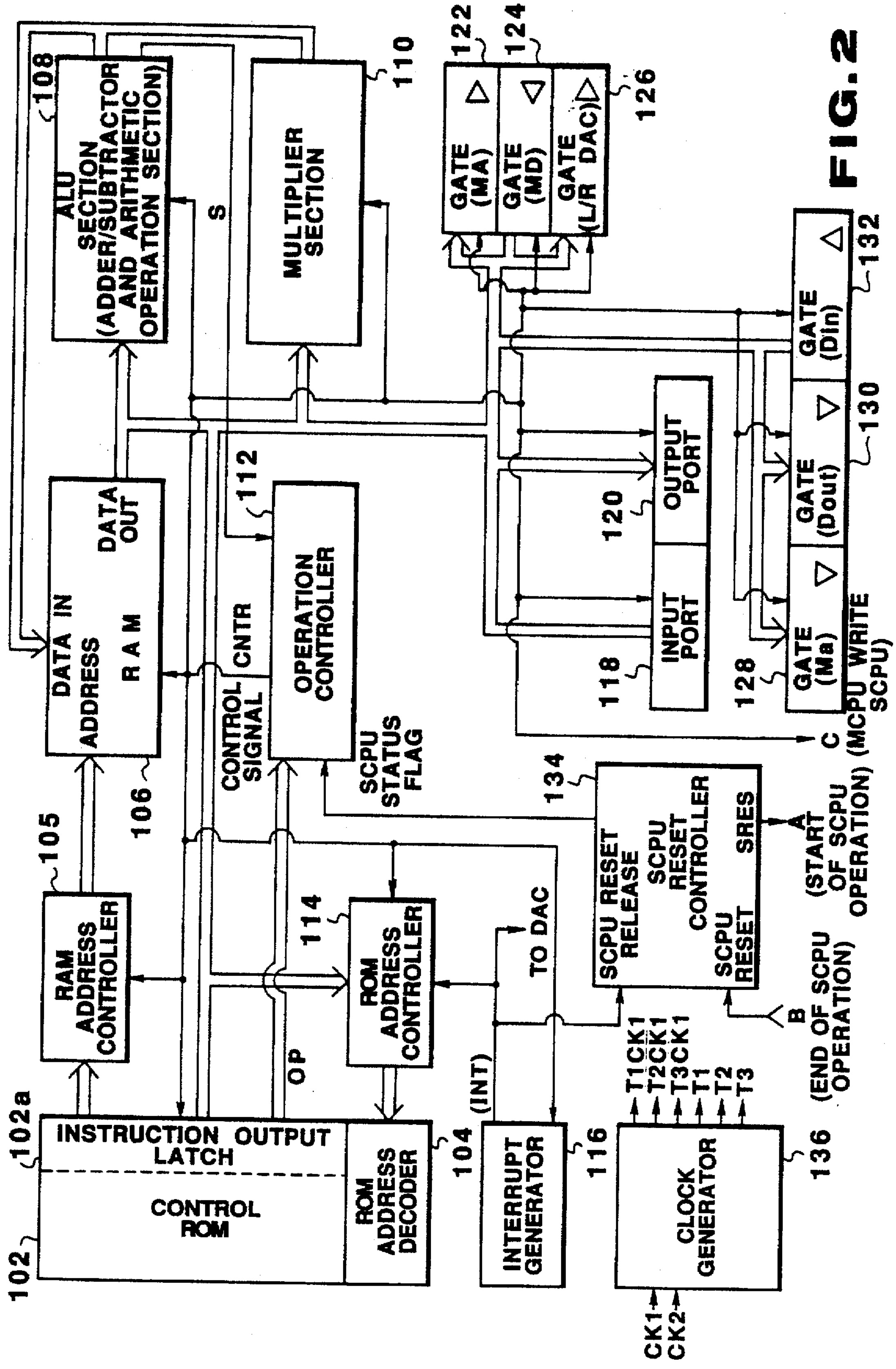
FIG. 2 is a block diagram of an MCPU in FIG. 1.
Figure 3:
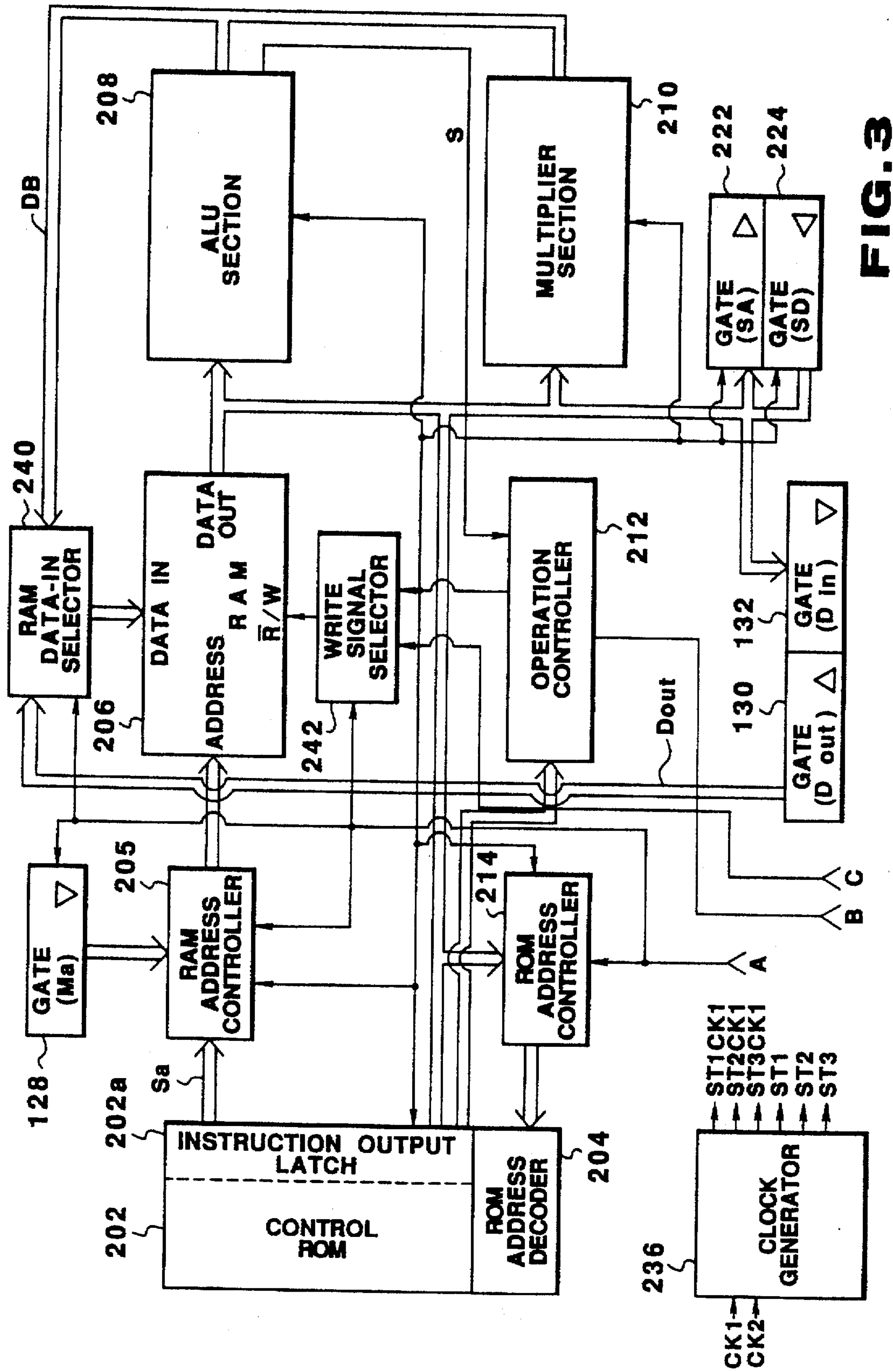
FIG. 3 is a block diagram of an SCPU in FIG. 1.

FIGS. 2 and 3 respectively illustrate the internal structures of the MCPU 10 and SCPU 20.

In FIG. 2, a control ROM 102 stores a main program to process various control inputs to a musical instrument, and an interrupt program for generating musical tones. The ROM 102 sequentially outputs program words (commands), which are at an address designated via a ROM address decoder 104 by a ROM address controller 114, through an instruction output latch 102*a*. In a specific embodiment, a program word has a 28-bit length, and a next address system is used where part of a program word is sent as a lower address (an address in a page) for storing a program word to be read next, but this system may be replaced with a program counter system. While a register is designated by the operand of a command from the control ROM 102, a RAM controller 114 designates the address of a corresponding register in a RAM 106. The RAM 106 comprises a group of registers constituting an operation memory, and is used for general computation, flag computation, musical-tone computation, etc. An ALU section (an adder/subtracter and an arithmetic operation section) 108 and a multiplier section 110 are operated when the control ROM 102 sends a calculation command. Particularly, the multiplier section 110 is used for calculating the waveform of a musical tone, and for the optical calculation, it multiplies the first data input by the second data input (both 16-bit data) and output the resultant data with the same length as the input data (16-bit long). The RAM 106, the adder/subtracter 108 and the multiplier section 110 constitute an arithmetic operation circuit. An operation controller 112 decodes the operation code of a command from the control ROM 102, and sends a control signal (generally referred to as "CNTR") to the individual section of the circuit to execute the indicated operation. In executing a conditional branch command, the operation controller 112 determines, according to a status signal S from the ALU section 108, if branch conditions are satisfied, and allows the address to jump to the destination address through the ROM address controller 114.

A timer interrupt is used in this embodiment to execute a musical tone generation program of the control ROM 102 every predetermined period of time. A control signal INT (interrupt request signal) is sent from an interrupt generator 116 having a timer (a hardware counter) to the ROM address controller 114 every predetermined period. In accordance with this control signal, the ROM address controller 114 saves or holds the address of a command in the main program to be executed next, and instead, sets a head address of an interrupt program (subroutine) where a musical tone is to be generated. Accordingly, the interrupt program is started. Since the interrupt program has a return command at the end, when the return command is decoded in the operation controller 112, the ROM address controller 114 sets again the address which has been held, returning to the main program. The control signal INT from the interrupt generator 116 is supplied to the DAC 100 to determine a sampling speed of the DAC 100 for digital/analog conversion of a musical tone signal. The interrupt generator 116 is illustrated as an internal element of the MCPU 10 in the drawings, but is theoretically an external element (a peripheral device) of the MCPU 10, which stops a task in operation by the MCPU 10 and requests the MCPU 10 to execute a special process.

A clock generator 136 receives master clocks of two phases, CK1 and CK2 from a master clock generator (not shown), and generates various timing signals, such as T1, T2, T3, T1CK1, T2CK2 and T3CK3, which are supplied to the sections of the circuits, such as an operation controller 112.

Remaining elements in FIG. 2 are associated with the interface of the external device of the MCPU 20. Reference numeral "122" denotes a gate as a bus interface for connecting the internal bus of the MCPU to an external memory access address bus MA shown in FIG. 1; "124" is a gate for connecting the MCPU's internal bus to the external memory data bus MD; and "126" denotes a gate for connecting the MCPU's internal bus to a DAC data transfer bus. An input port 118 and an output port 120 are interfaces for connecting the MCPU's internal bus to an external input device. Reference numeral "128" denotes a gate for connecting the MCPU's internal bus to an internal RAM address designation bus of the SCPU; "130" denotes a gate for connecting the MCPU's internal bus to a bus for writing data in the SCPU's internal RAM; and "132" denotes a gate for connecting an internal RAM read data bus of the SCPU to the MCPU's internal bus.

An SCPU reset controller 134 controls the operational period of the SCPU 20. According to this embodiment, in respond to an interrupt signal INT from the interrupt generator 116, the SCPU reset controller 134 generates the signal A indicating the beginning of the operation of the SCPU 20. This signal A is supplied to a ROM address controller 214 in the SCPU 20, shown in FIG. 3. Then, the ROM address controller 214 starts updating an address, and the SCPU 20 therefore starts its operations involving a tone generating process. When the SCPU 20 terminates its operations, an operation controller 212 of the SCPU 20 generates the signal B, indicating the end of the operation, and sends the signal B to the SCPU reset controller 134. Upon reception of this signal, the SCPU reset controller 134 inverts the signal A to stop the SCPU 20. The reset controller stops the ROM address controller 214 of the SCPU 20 accordingly, and sends an SCPU status flag signal, which indicates that the SCPU 20 is not activated, to the operation controller 112. When executing a command from the control ROM 102 to check the status of the SCPU, the operation controller 112 reads the SCPU status flag signal, detecting the status of the SCPU 20.

In the block diagram of the SCPU 20 in FIG. 3, elements 202, 202*a*, 204, 205, 206, 208, 212, 214, 222, 224 and 236 correspond to the elements 102, 102*a*, 104, 105, 106, 108, 110, 112, 114, 122, 124 and 136 in the block diagram of the MCPU 10 in FIG. 2. The control ROM 202 of the SCPU 20 has only a program for tone generation stored inside, so that the SCPU 20 serves only as a digital information processing apparatus for tone generation.

Reference numeral "240" denotes a RAM data-in selector, which selects data to be sent to a RAM 206 as an operation memory of the SCPU 20 among data from the MCPU 10 (data sent from the MCPU 10 through the gate 130 and the data bus Dout) and data generated (computed) by the SCPU 20 (data on the data bus DB from the ALU section 108 or the multiplier section 210).

The RAM data-in selector 240 selects a selection mode according to the signal A. When the signal A indicates that the SCPU 20 is in operation, the selector 240 selects data generated by the SCPU 20; when the signal A indicates that the SCPU 20 is not in operation, the selector 240 selects data from the MCPU 10.

A RAM address controller 205 also selects its mode controlled according to the signal A. When the signal A indicates that the SCPU 20 is in operation, the controller 205 selects information on the bus SA from the instruction output latch 202*a* of the control ROM 202 as the address of the RAM 206; when the signal A indicates that the SCPU 20 is not in operation, the controller 205 selects information on the bus Ma from the MCPU 10 through the bus gate 128 (opened by the signal A) as the address of the RAM 206.

Likewise, a write signal selector 242 selects a mode according to the signal A. When the signal A indicates that the SCPU 20 is in operation, the selector 242 selects a RAM read/write signal from the operation controller 212 of the SCPU 20, and connects the signal to the read/write input terminal $\overline{R}$/W of the RAM 206; when the signal A indicates that the SCPU 20 is not in operation, the selector 242 selects a SCPU RAM read/write signal from the operation controller 112 of the MCPU 10, not of the SCPU 20, to connect to the read/write input terminal $\overline{R}$/W of the RAM 206.

The features of this embodiment will be described further in detail.

<Multiple-CPU Tone Generating Function (FIGS. 1–7 and 9–11)>

Figure 7:
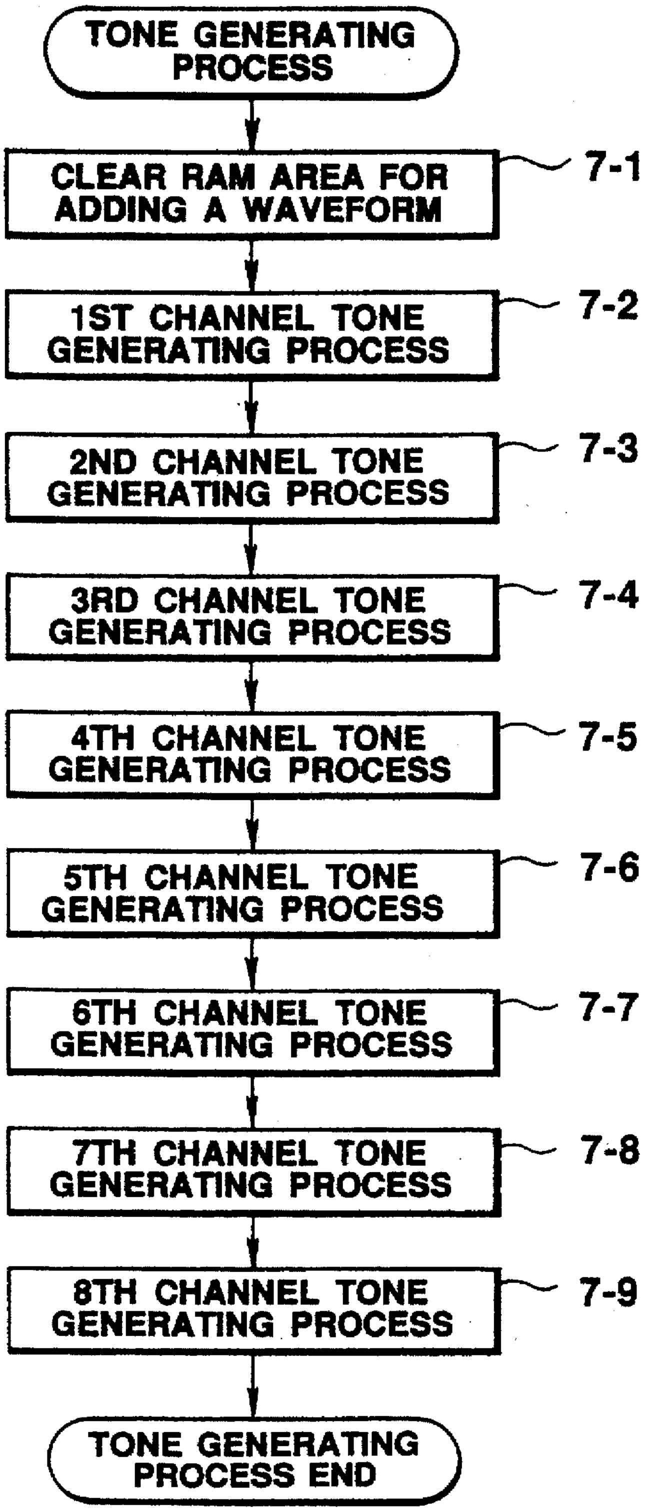
FIG. 7 is a flowchart representing a tone generating process.

FIG. 4 is a flowchart representing the operation of the MCPU 10 according to the main program (a background program) of the MCPU 10: FIG. 5 is a flowchart showing the operation of the MCPU 10 according to the interrupt routine of the MCPU 10, which is invoked by a timer interrupt signal INT: FIG. 6 is a flowchart showing the operation of the SCPU 20 according to the program of the SCPU 20, which is invoked by the timer interrupt signal INT: and FIG. 7 is a flowchart representing tone generating processes to be executed by both the MCPU 10 and SCPU 20.

As described above referring to FIGS. 1 to 3, the electronic musical instrument system according to this embodiment comprises CPUs, i.e., the MCPU 10 and the SCPU 20. These CPUs cooperate to execute processes for the electronic musical instrument. The MCPU 10 performs the interrupt routine shown in FIG. 5 for a tone generation process, while the SCPU 20 performs the program illustrated in FIG. 6 to generate musical tones. Further, the MCPU 10 executes various tasks for controlling the entire system according to the main program shown in FIG. 4.

In step 4-1 of the main program shown in FIG. 4, the system is initialized when the power is given; the MCPU 10 clears the RAMS 106 and 206, sets an initial value of a rhythm tempo, or the like. In step 4-2, the MCPU 10 outputs a signal for scanning keys from its output port 120, and fetches the statuses of input devices, such as a keyboard and function switches from an input port 118, storing the statuses of function keys and the keys of a keyboard in the key buffer area of the RAM 106. In step 4-3, the MCPU 10 discriminates a function key whose status has changed, from the new status acquired in step 4-2 and the previous status, and executes the indicated task (such as setting musical tone numbers, envelope numbers and rhythm numbers). In step 4—4, comparing the updated status of the keyboard in step 4-2 with the previous status, the MCPU 10 discriminates a key whose status has changed (key depression or key release), from the latest status and the previous one. As a result of the processing done in step 4—4, a key assign process is executed in step 4-5 for tone generation to be carried out in step 4-9. When a DEMONSTRATE key, one of the function keys, is pressed, demonstration data (sequencer data) is read piece by piece from the external memory 90 in step 4-6 for performing the key assign process in advance to the tone generating process in step 4-9. When a START RHYTHM key is pressed, rhythm data is sequentially read from the external memory 90 in step 4-7 for executing the key assign process directed to step 4-9. In step 4-8, a flow cycle timer process, the timings of necessary events in the main flow are calculated based on one flow cycle to acquire a envelope timer (a cycle of calculating an envelope) and a rhythm reference value. (The flow cycle is obtained by counting the numbers of timer interrupts executed during one flow cycle. This will be performed in step 5-2 for an interrupt timer process to be described later.) Various arithmetic operations for actually releasing musical tones are executed in step 4-9, based on data set in steps 4-5, 4-6 and 4-7, and the results of the operations are set in tone generation registers (shown in FIG. 11) in the RAMs 106 and 206. Step 4-10 prepares for a pass of the next main flow, and alters the status "NEW ON", acquired through the current pass and indicating a status change to the key-pressed status, to an "ON" status, and the status "NEW OFF" indicating a status change to the key-released status to an "OFF" status.

When an interrupt signal INT is generated by the interrupt generator 116, the MCPU 10 interrupts the main program in action, and executes the interrupt routine shown in FIG. 5, instead, while the SCPU 20 executes the program shown in FIG. 6. The MCPU 10 generates a musical tone signal through the processing given in the flowchart in FIG. 5, and the SCPU 20 generates a musical tone signal according to the flowchart in FIG. 6.

More specifically, the MCPU 10, generates musical tone waveform data for each channel, and accumulates and stores them. Conventionally, a hardware-based tone generating circuit executes this process. Utilizing that an interrupt is made every predetermined cycle, the MCPU 10 increments a timer register (in the RAM 106) for timing the flow cycle by "1" in an interrupt timer process in step 5-2 each time the interrupt passes through the register. The MCPU 10 checks in step 5-3 whether the SCPU 20 has terminated a tone generation process (6-1). When the SCPU 20 has terminated the process, the MCPU 20 advances to step 5-4 to read musical tone waveform data on the RAM 206, which the SCPU 20 has generated, into the RAM 106. Then, in step 5—5, the MCPU 10 sends the DAC 100 musical tone waveform data both generated by the MCPU 10 and SCPU 20.

The details of the tone generation processes in steps 5-1 and 6-1 will be shown in FIG. 7. According to this example, both CPUs, the MCPU 10 and the SCPU 20, are designed to generate musical tone waveform data of eight channels, i.e., the entire system can generate musical tone waveform data of 16 channels. RAM areas (in the RAM 106 and 206) for adding a waveform are cleared in step 7-1, and tone generating processes for individual channels from the first to the eighth channels are sequentially executed in step 7-2 to 7-9. At the end of each channel tone generating process, the value of the musical tone waveform of the channel is added to data in the RAM area for adding a waveform.

Figure 9:
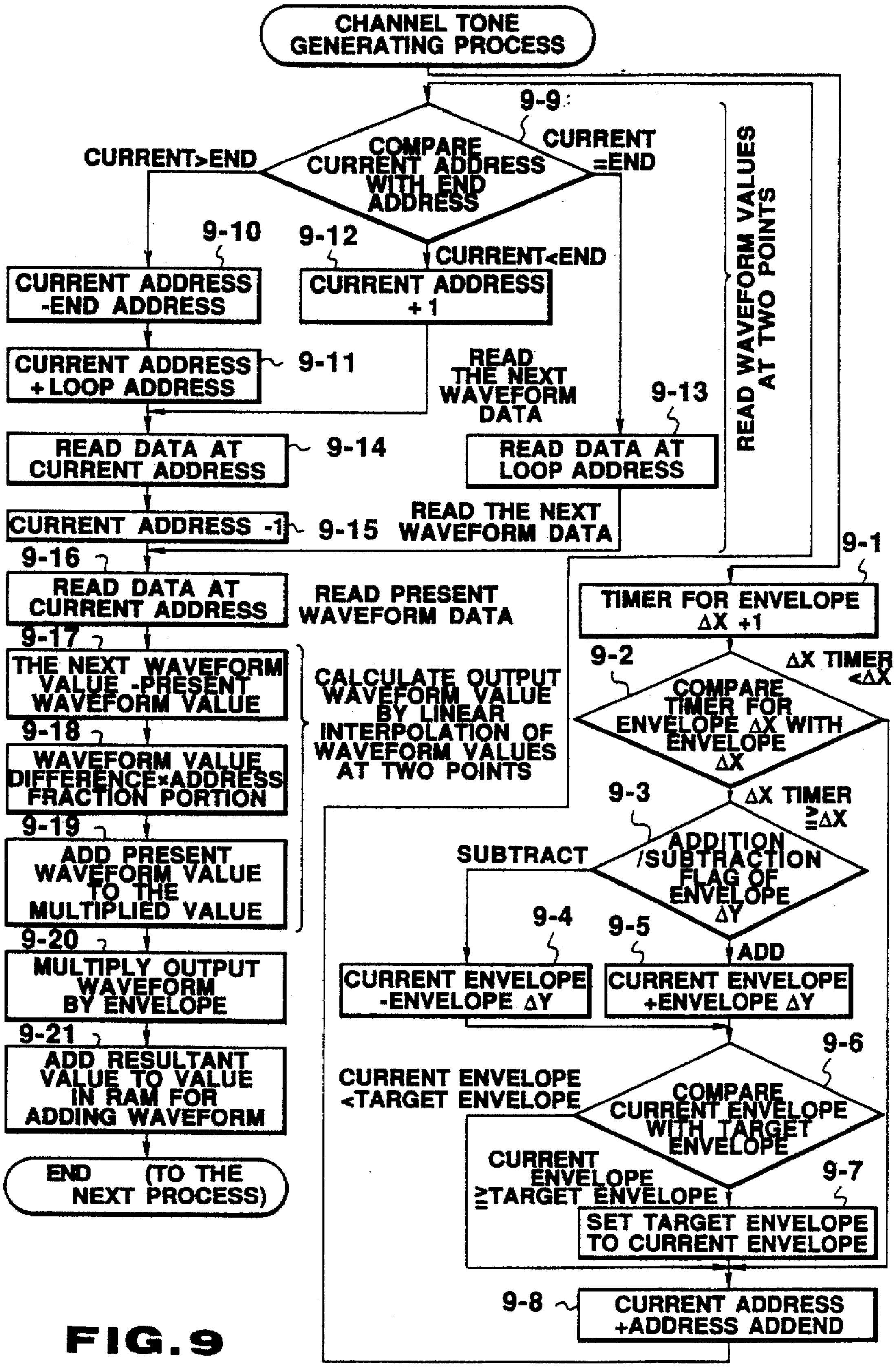
FIG. 9 is a flowchart of a channel tone generating process.

An example of the channel tone generation process will now be explained referring to FIGS. 9 to 11. A waveform reading system (PCM) for synthesizing musical tones is employed in this example. (Other tone synthesizing systems, such as an FM synthesizing system, can also be used; the present invention is not limited to a particular tone synthesizing system.) The channel tone generating process is largely classified into an envelope process (step 9-1 to 9-7) and a waveform process including envelope addition (step 9-8 to 9-21). In executing each channel tone generating process, the individual CPUs, the MCPU 10 and the SCPU 20, refer to a group of registers for tone generation which are associated with the channel in question, i.e., an envelope Δ x timer, a target timer, an envelope Δ x, an envelope Δ y having an addition/subtraction flag, a current envelope, an address addend, a loop address, an end address and a start/current address as shown in FIG. 11. The envelope, which is to be added to a basic waveform for amplitude modulation, consists of several segments (steps). The envelope Δ x timer, the target envelope, the envelope Δ x and the envelope Δ y with an addition/subtraction flag are envelope parameters defining an envelope segment in progress. The envelope parameters are information which is updated each time the envelope value reaches the target value of the segment in the tone generating process 4-9 of the main program of the MCPU 10 (FIG. 4). These envelope parameters, except for the envelope Δ x timer, are simply referred to in the interrupt routine (FIGS. 5 and 6). The envelope Δ x represents the operation cycle of an envelope; the target envelope is the target value of the envelope in a current segment; the envelope Δ y having an addition/subtraction flag expresses a change in an envelope for each operation cycle; and the current envelope is a current envelope value. The address addend, the loop address, the end address and the start/current address are address information with respect to a basic waveform held in the external memory 90. The start address represents a start address for a basic waveform memory in the external memory 90. The loop address is a return address in the case of repetitively reading out the basic waveform (identical to the start address in FIG. 10). The end address represents the end address of the basic waveform. The current address indicates the current phase of the basic waveform, with its integer portion representing a real storage position present in the basic waveform memory, and its decimal fraction portion expressing a shift from this storage position. The address addend is a value to be added to the current address for every time interval of the timer interrupt routine, and it is to be proportional to the pitch of a musical tone to be generated.

This operation will be described in detail as follows. In step 9-1, the timer register to be compared with the operation cycle Δ x of the envelope is increased for each interrupt. When the timer register coincides with Δ x in step 9-2, it is determined in step 9-3 whether the envelope is rising or falling by checking the addition/subtraction flag (a symbol bit) of the data Δ y which indicates a change in the envelope. The subtraction or addition of the current envelope is performed in step 9-4 or 9-5. It is determined in step 9-6 whether or not the value of the current envelope has reached the target envelope value. When it has reached that value, the current level is set to the target level so that data in the next envelope step will be set in the tone generating process 4-9 of the main program. When no current envelope is read in step 4-9, it is considered the end of the tone generation and is processed accordingly.

The waveform process (steps 9-8 to 9-21) will now be described. In this process, wave data at two adjoining addresses are read from the basic waveform memory using the integer portion of the current address, and a waveform value, which is estimated with respect to the current address indicated by (integer portion+fraction portion), is acquired by interpolation. The reason why the interpolation is necessary is that a waveform sampling cycle according to the timer interrupt is constant, and that the address addend (pitch data) lies over a certain range in consideration of the application of the present invention to a musical instrument. (If waveform data is prepared for each scale note in a musical instrument which outputs only scale notes, interpolation will not be required, but this will result in an unallowable increase in memory capacity.) Since a timbre in a high range is more deteriorated and distorted by interpolation, it is preferable to reproduce the original musical tone in a cycle shorter than a record sampling cycle of the original tone. In this embodiment, the cycle for reproducing the original tone (4—4) is doubled (FIG. 10). Therefore, when the address addend is 0.5, the tone of A4 is obtained. The address addend will be 0.529 at A#4, and 1 at A3. These values are stored as pitch data in the control data/waveform external memory 90. In the tone generating process 4-9, with a key pressed, pitch data corresponding to the key and the waveform start address of the selected timbre, and the waveform end address and the waveform loop address are set in corresponding registers in the RAM 106 and the RAM 206, i.e., an address addend register, a start/current address register, an end address register and a loop address register.

Figure 10:
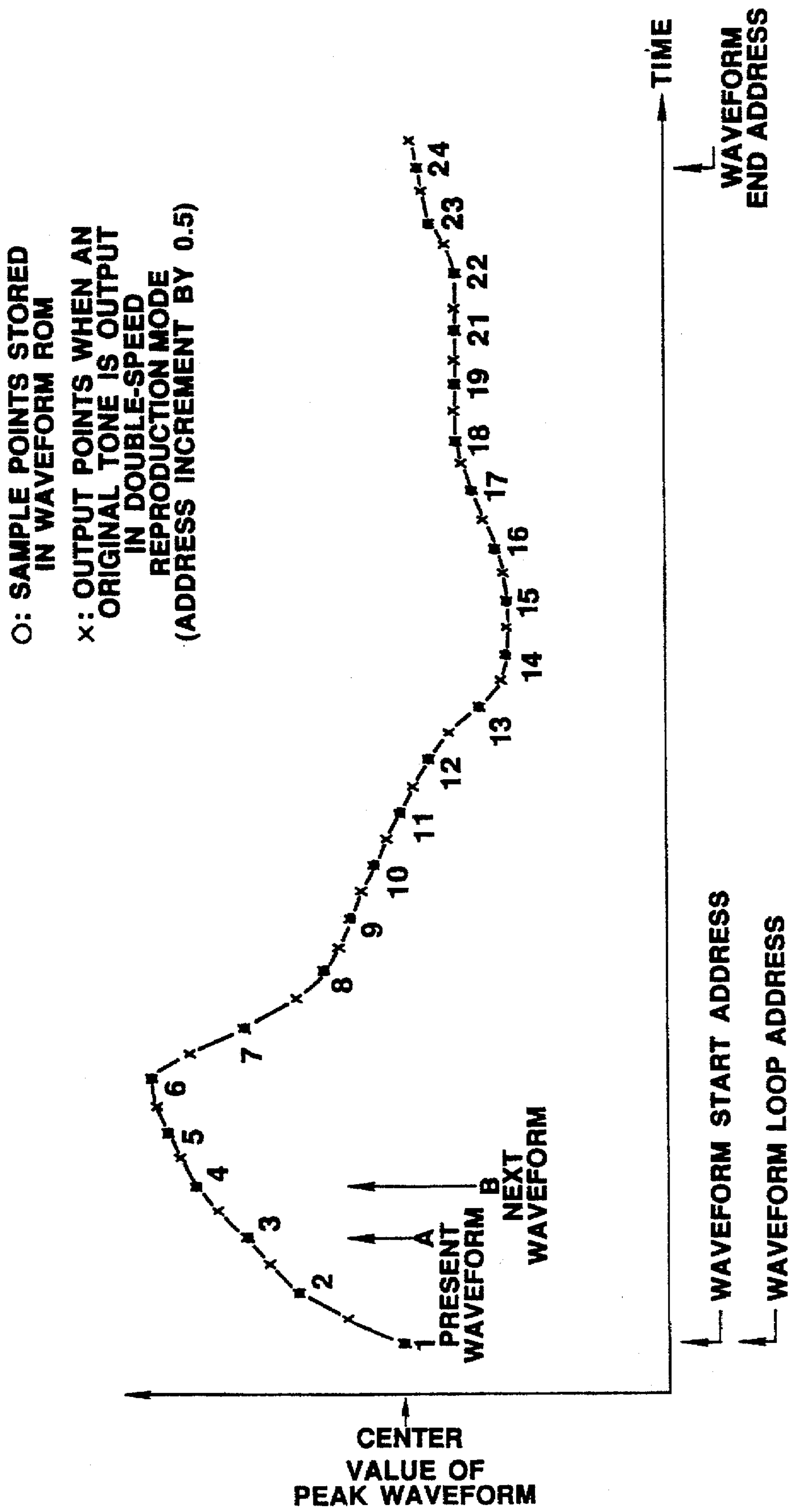
FIG. 10 is a diagram illustrating waveform data.
Figure 11:
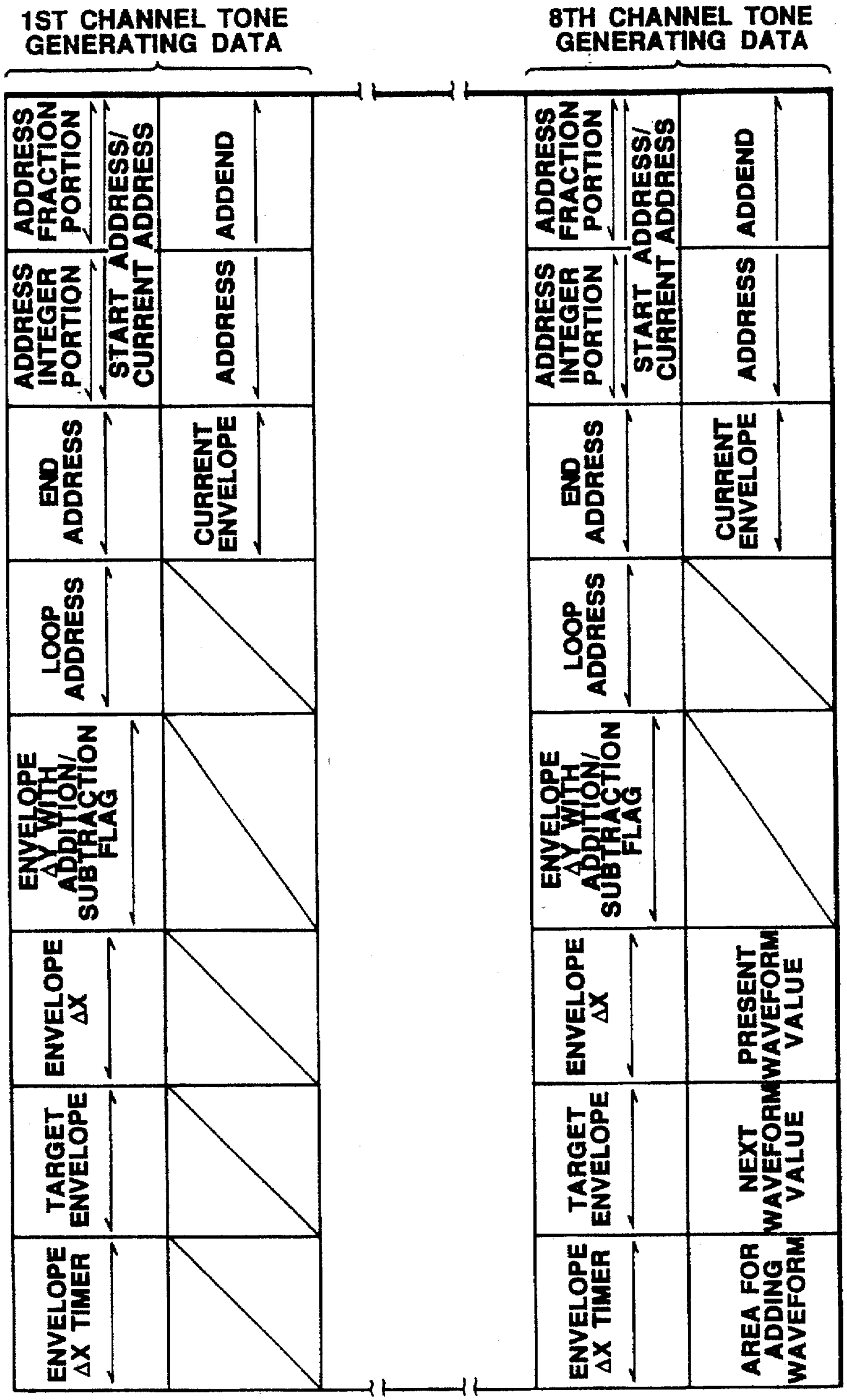
FIG. 11 is a diagram showing a RAM table for a tone generating process.

In FIG. 10, interpolated waveform data is illustrated as a reference with respect to time; "○" indicates a waveform data value at a storage position in the basic waveform memory, and "x" denotes an output sample including an interpolated value.

Among various interpolation methods, a linear interpolation method is employed in this embodiment. More specifically, the address addend is added to the current address in step 9-8 to acquire a new current address. The current address is compared to the end address in step 9—9. The next physical (real) or theoretical (operational) address is calculated in steps 9-10 and 9-11 if the current address>the end address, or in step 9-12 if the current address<the end address. In step 9-14, the basic waveform memory is accessed at the integer portion of the acquired address to obtain the next waveform data. The loop address comes after the end address according to the operation. In other words, the waveform shown in FIG. 10 is repetitively read out. When the current address equals the end address, therefore, the waveform data for the loop address is read as the next address in step 9-13. The basic waveform memory is accessed at the integer portion of the current address in steps 9-15 and 9-16 to read updated waveform data. Then, the updated waveform value is subtracted from the next waveform value in step 9-17, the difference is multiplied by the fraction portion of the current address in step 9-18, and the resultant value is added to the updated waveform value in step 9-19, thereby acquiring a linearly-interpolated waveform value. This linearly-interpolated data is multiplied by the current envelope value, yielding the value of the musical tone data of a channel (9-20). This value is added to the content of the waveform adding register, accumulating musical tone data (9-21). Digital musical data accumulated in this register is sent to the DAC 100 in the timer interrupt routine 5—5 in FIG. 5. With regard to this processing, the DAC 100 in FIG. 1 comprises the right DAC 100R and the left DAC 100L to provide a stereophonic output. In this case, a decision has only to be made as to which one of the tone generating channels to be operated by the MCPU 10 and the SCPU 20 should be assigned to the left or right DAC. More specifically, selected DAC direction data is stored as tone generation data for an individual channel in the internal RAMs 106 and 206, and two areas for adding a waveform, i.e., a waveform-adding area for the right DAC and a waveform-adding area for the left DAC are provided in the RAMs. The waveform-adding areas for the left and right DACs are cleared in step 7-1. After the process in step 9-10 is performed, the DAC assigned to the channel to be processed is discriminated according to the selected-DAC indicating data, and the musical tone waveform data of that channel is added to the corresponding a waveform-adding area. In step 5-4 of the interrupt routine of the MCPU 10 in FIG. 5, musical tone waveform data for the left DAC and for the right DAC, both generated by the SCPU 20, are added respectively to musical tone waveform data for the left DAC and for the right DAC, both generated by the MCPU 10. Resultant musical tone waveform data for the left and right DACs are sent respectively to the left DAC 100L and the right DAC 100R in step 5—5.

As described above, a digital information processing apparatus for an electronic musical instrument according to this embodiment comprises multiple CPUs, the MCPU 10 and the SCPU 20, each of which can execute tone generation according to the incorporated program. Although a single SCPU is used in this embodiment, multiple SCPUs for tone generation may be provided as well.

<Operation Start and End Functions of SCPU (FIGS. 12 to 15, FIGS. 2 to 6 and FIG. 8)>

According to this embodiment, the MCPU 10 has functions for controlling and grasping the operational period of the SCPU 20. For this purpose, therefore, (A) When the interrupt signal is generated from the timer interrupt generator 116, the MCPU 10 starts the operation of the SCPU 20, and sets the SCPU status flag, to which the operation controller 112 of the MCPU 10 refers, in the "SCPU in operation" status.

(B) The SCPU 20, when having completed the operation (tone generation), moves to the "stop" status accordingly, and sends an operation completion signal to the MCPU 10. The SCPU status flag referred to by the operation controller 112 of the MCPU 10 is set to the "SCPU stop" status.

Referring to FIGS. 2 to 6, when the MCPU 10 receives an interrupt signal from the interrupt generator 116 (FIG. 2) while the main program is being executed, the MCPU 10 interrupts the main program through the ROM address controller 114, and executes the timer interrupt routine shown in FIG. 5 to generate musical tones. Further, in response to the interrupt signal, the MCPU 10 supplies an SCPU operation start signal A to the SCPU 20 through the SCPU reset controller 134. The SCPU 20 in turn executes a program for tone generation shown in FIG. 6 through the ROM address controller 214. (The bus gate 128, the RAM address controller 204, the RAM data-in selector 240 and the write signal selector 242 are also set by this signal A for the operation of the SCPU 20 itself.) Upon completion of the program, the SCPU 20 generates an operation end signal B from its operation controller 212. This signal B is sent to the SCPU reset controller 134, which in turn inverts the signals B and A to stop the operation of the SCPU 20. Upon reception of the inverted signal A, the ROM address controller 214 of the SCPU 20 stops the address updating and the SCPU 20 stops its operation. The signal B is also sent as a signal indicating "SCPU being disabled" to the operation controller 112 of the MCPU 10. In executing a command for checking the SCPU status in step 5-3 of the interrupt routine (FIG. 5) of the MCPU 10, the operation controller 112 of the MCPU 10 reads the SCPU status flag B. When the flag B indicates the status "SCPU being disabled" and the tone generation (FIG. 6) is completed in the SCPU 20, the MCPU 10 advances to step 5-4 to read musical tone waveform data generated by the SCPU 20. The MCPU 10, when terminating the interrupt routine shown in FIG. 5, sends a return-to-main-program command signal from its operation controller 112 to its RIM address controller 114, thus returning the control to the interrupted main program.

Figure 8:
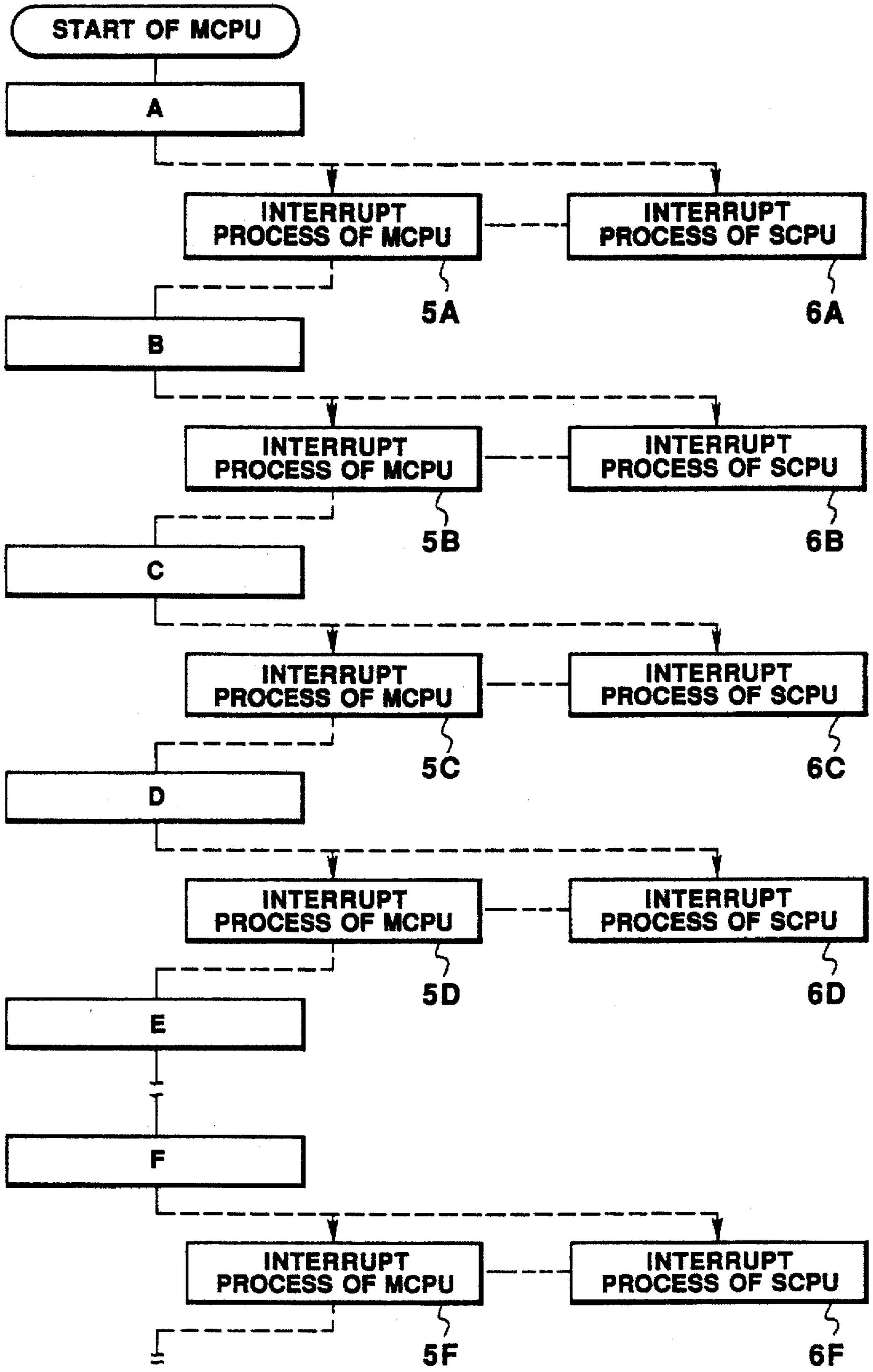
FIG. 8 is a flowchart showing a time-sequential operation of the embodiment.

FIG. 8 illustrates the time-sequential operational flow of this embodiment. "A" to "F" represent pieces of the main program. 5A to 5F indicate the MCPU interrupt routines shown in FIG. 5, while 6A to 6F are SCPU interrupt routines shown in FIG. 6. When an interrupt signal INT is generated as shown in FIG. 8, the MCPU 10 interrupts a running program, and both CPUs 10 and 20 start their interrupt routines, executing parallel tone generation.

Figure 12:
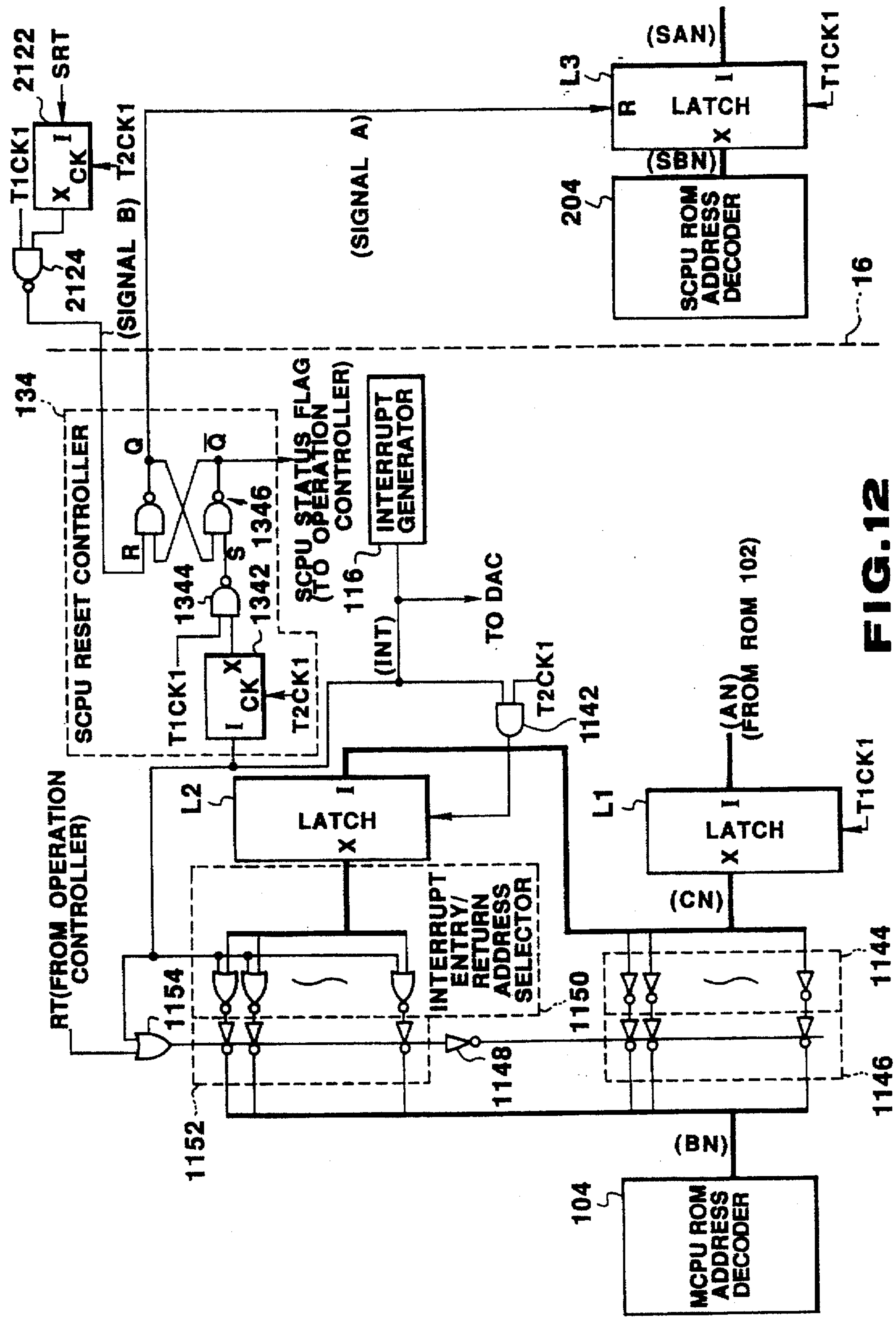
FIG. 12 is a block diagram illustrating a circuit associated with the function of starting and ending the operation of the SCPU.
Figure 13:
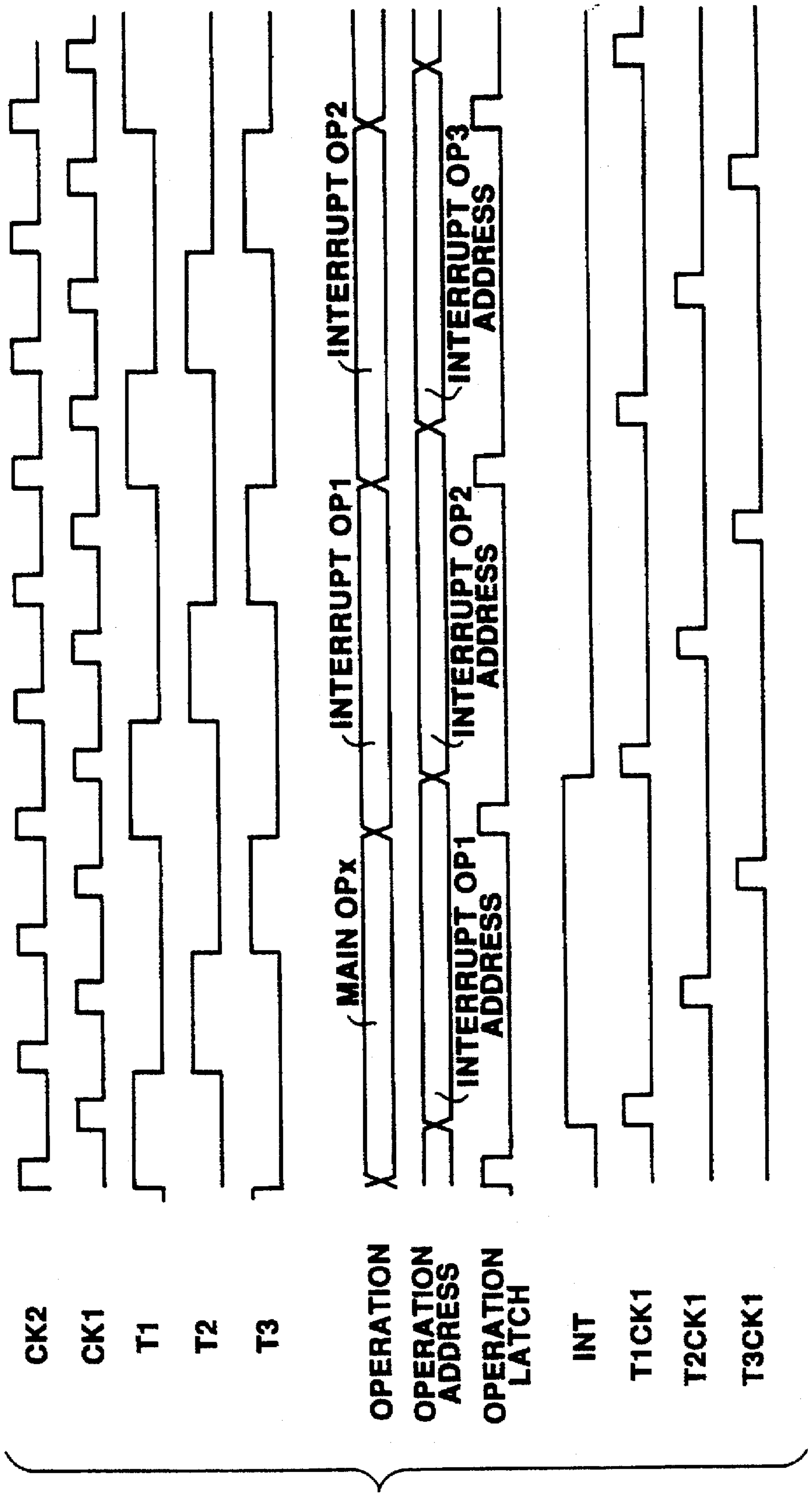
FIGS. 13, 14 and 15 are time charts representing the operation of the circuit shown in FIG. 12.
Figure 14:
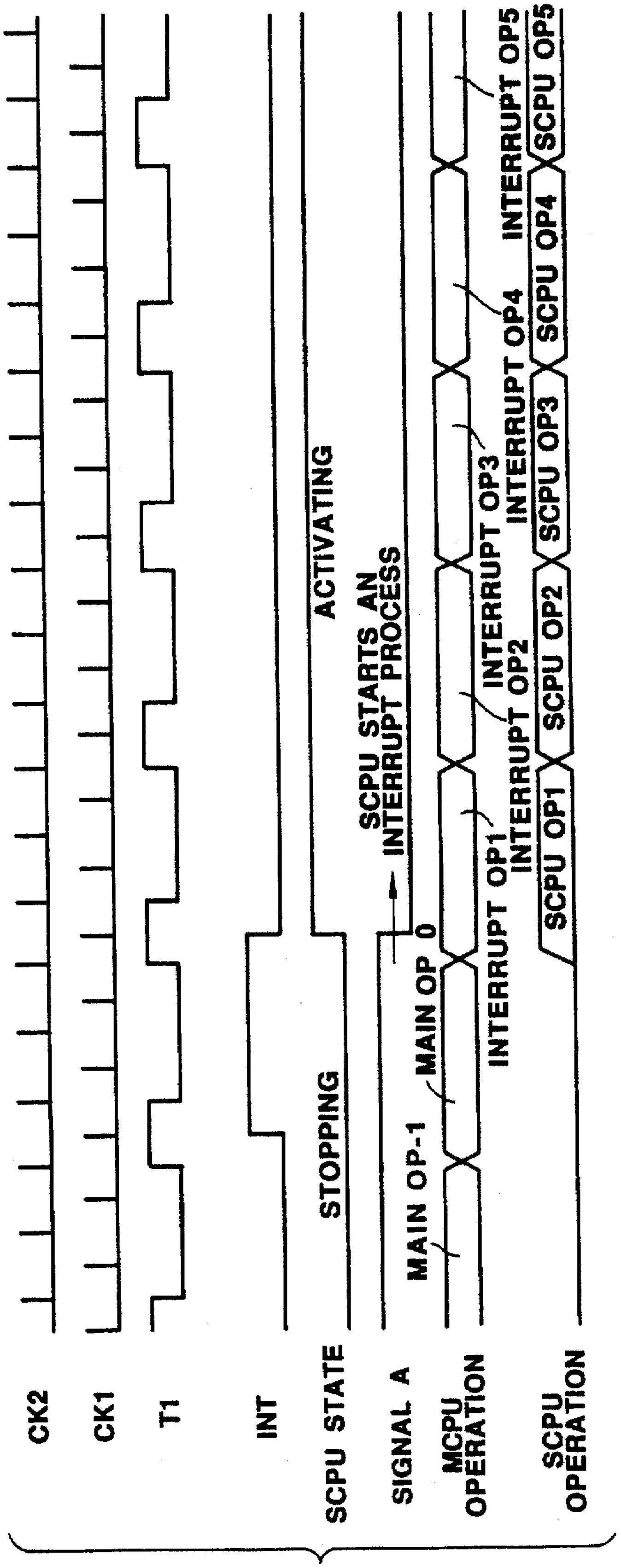
Figure 15:
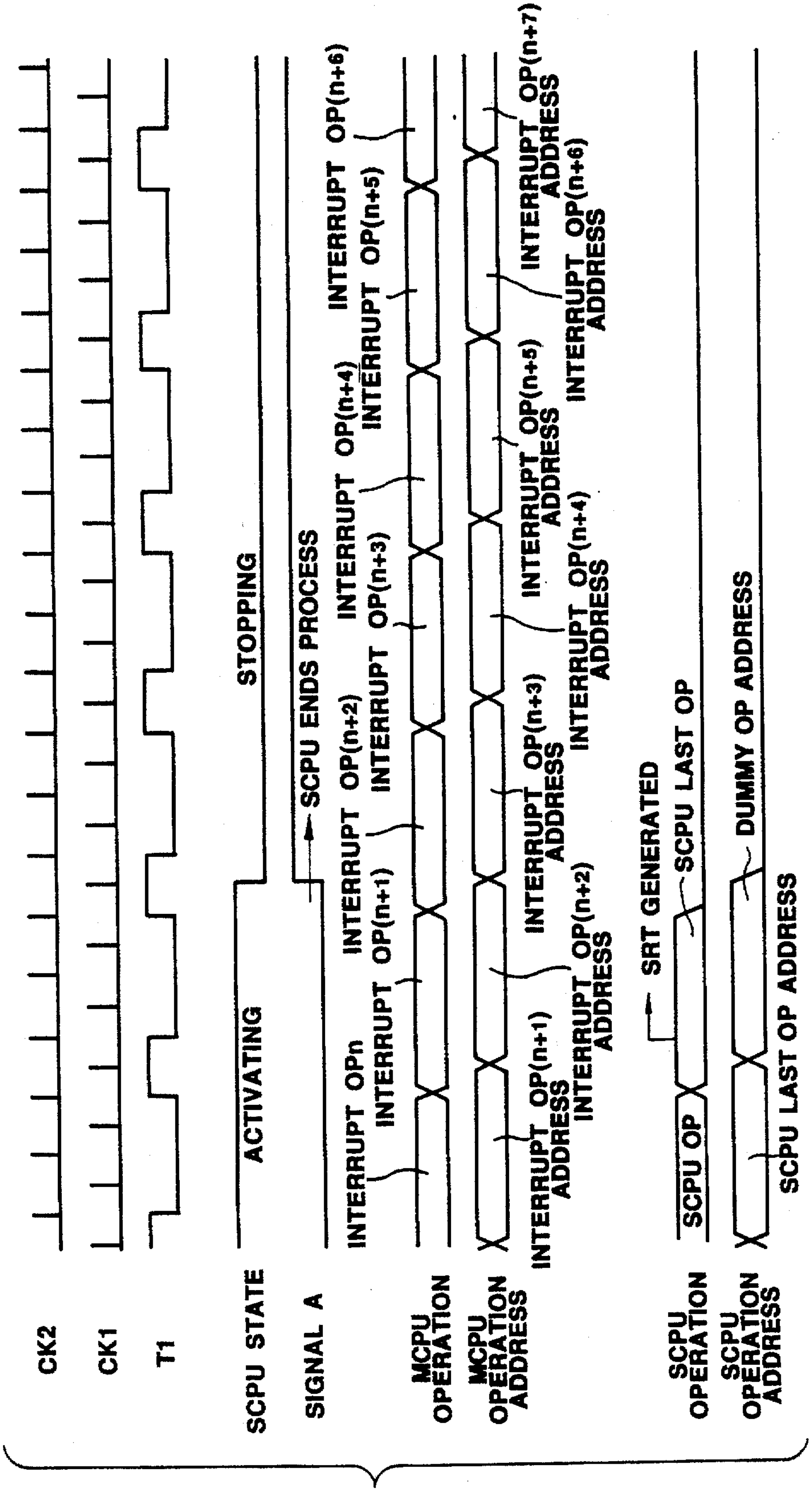

FIG. 12 illustrates the detailed structure for realizing the above-described functions for starting and ending operation of the SCPU, and FIGS. 13 to 15 show the time chart of the operation. In the time chart in FIG. 13, CK1 and CK2 are two-phase master clocks which are both sent to the clock generators 136 and 236 of the MCPU 10 and the SCPU 20. Upon reception of the master clocks CK1 and CK2, the clock generator 136 generates three-phase clocks T1, T2 and T3, all providing a basic operational timing for the MCPU 10. The repeat cycle of these three clocks will determine a machine cycle (shortest time for executing a command). Clocks T1CK1, T2CK2 and T3CK3 are signals representing the logical products of T1 and CK1, T2 and CK2, and T3 and CK3, respectively. An operation latch signal is a signal for allowing the instruction output latch 102*a* of the control ROM 102 of the MCPU 10 to latch an instruction from the ROM 102. Though not shown in FIG. 13, the clock circuit 236 of the SCPU 20 generates clock signals of the same type (see FIGS. 3 and 25). A clock generating circuit common to the MCPU 10 and the SCPU 20 may be used instead.

In FIG. 12, the right side of the broken line 16 belongs to the SCPU 20 and the left side belongs to the MCPU 10. Of the elements of the left side, latches L1 and L2 and gates 1142 to 1154 are circuit elements included in the ROM address controller 114 of the MCPU 10 (FIG. 2). By the clock T1CK1, the latch L1 latches ROM 102 address information AN (information included in a current command from the ROM 102) in the next command to be executed by the MCPU 10. While the main program (FIG. 4) is running, the output of the latch L1 is sent as the next address BN to the ROM address decoder 104 of the MCPU 10. In other words, the output of the latch L1 is sent as address input BN to the ROM address decoder 104 through an inverter 1144 and three-state inverter gate 1146 (already enabled). When the interrupt signal INT is generated from the interrupt generator 116, an OR gate 1154 which receives an signal INT outputs a signal to render the three-state inverter gate 1146 on the output side of the latch L1 OFF (high impedance) through the inverter 1148. According to this signal from the OR gate 1154, the three-state inverter gate 1152 on the output side of an interrupt entry/return address selecting gate 1150 passes the output of the gate 1150 to the address input BN of the ROM address decoder 104. The gate 1150 comprises a group of NOR gates which receive an interrupt signal INT and an output signal from the latch L2. With an "H"-level interrupt signal INT generated, the selecting gate 1150 outputs an all-"0" signal which indicates an entry point of the interrupt routine in FIG. 5. This signal is inverted by the three-state inverter gate 1152 and is sent as an all-"1" signal BN to the ROM address decoder 104 of the MCPU 10. When the next operation latch signal is generated, the first command of the interrupt routine is fetched from the control ROM 102 to the instruction output latch 102*a*. Therefore, the MCPU 10 now moves its control onto the interrupt routine.

The interrupt signal INT from the interrupt generator 116 is also sent through an AND gate 1142 at the timing of the clock T2CK2, and serves as a latch signal to activate the latch L2. Then, the latch L2 latches (or saves) the address of the next command of the main program on the bus AN, thus interrupting the main program.

Further, the interrupt signal INT from the interrupt generator 116 is supplied to the SCPU reset controller 134. The SCPU reset controller 134 comprises a D flip-flop 1342, a NAND gate 1344 and an R-S flip-flop 1346, connected to each other as illustrated. The R-S flip-flop 1346 is reset (Q="L") when the main program is running. Although not illustrated, the R-S flip-flop 1346 is to be initialized to the reset status at the time the system is given power. The interrupt signal INT is input to the D flip-flop 1342 at the timing of the clock T2CK1, and is inverted and output from the NAND gate 1344, setting the R-S flip-flop 1346. As a result, the $\overline{Q}$ output of the R-S flip-flop 1346, i.e., the signal A is switched from "H" to "L", and the Q output, i.e., the SCPU status flag is changed from "L" (indicating "SCPU being disabled") to "H" (indicating "SCPU in operation"). The signal A is sent as a reset release signal (the enable signal of a latch L3) to the latch L3 for latching the address SAN of the next command executed by the SCPU 20. Then, at the timing of the next clock T1CK1, the latch L3 sends the address of the first command of the SCPU program, carried by the bus SAN, to the ROM address decoder 204 of the SCPU 20. In the above-described manner, the SCPU 20 starts operating in response to the interrupt signal INT from the interrupt generator 116, and executes the tone generating process shown in FIG. 6.

At the time the SCPU 20 executes the last command for tone generation, an operation end signal (return command signal) SRT is generated in the operation controller 112 of the SCPU 20. This signal SRT, after fetched in a D flip-flop 2122 at the timing of the clock T2CK1, is inverted by a NAND gate 2124 which functions at the timing of the next T1CK1 (latch timing of the next dummy command), and serves as a low-pulse operation end signal B to reset the R-S flip-flop 1346 of the SCPU reset controller 134. As a result, the $\overline{Q}$ output of the R-S flip-flop 1346, i.e., the signal A is switched from "L" to "H," and the Q output, i.e., the SCPU status flag is changed from "H" indicating "SCPU in operation" to "L" indicating "SCPU being disabled." The "H"-level signal A (reset signal) inhibits the latch L3 from operating, and the output of the latch L3, i.e., the input to the address decoder 204 is fixed at the address of a dummy command (NOP command). On the input bus SAN of the latch L3 this time is address information of the first command (included in the NOP command language) of the tone generating program (FIG. 6) of the SCPU 20.

At the time of executing a command for checking the SCPU status in step 5-3, the MCPU 10 checks the level of the SCPU status flag through the operation controller 112. The MCPU 10 then acknowledges that the SCPU 20 is being disabled, i.e., that the SCPU 20 has completed the tone generating process, and reads musical tone waveform data, originating from the process executed by the SCPU 20, from the RAM 206 to the RAM 106 (step 5-4). Therefore, the MCPU 10 can efficiently obtain the correct result of the process done by the SCPU 20.

when the MCPU 10 executes the last command of the interrupt routine, the MCPU 10 generates a pulse of a return command, RT, from the operation controller 112. Through the OR gate 1654 and the inverter 1148, this signal pulse RT temporarily disables the address gate 1146 on the output side of the latch L1, and instead temporarily opens the address gate 1152 on the output side of the interrupt entry/return address selecting gate 1150 connected to the latch L2. At this time, the gate 1150 serves as an inverter that inverts and passes the address of the command in the interrupted main program which has been latched in the latch L2. The inverted output from the gate 1150 is inverted again by the signal pulse RT in the three-state gate 1152 which functions as an inverter. Therefore, the address of the command of the interrupted main program is input to the ROM address decoder 104 of the MCPU 10, and in response to the next operation latch signal, that command is read from the controller ROM 102 through the instruction output latch **102*a*. The MCPU 10** returns its control on the main program again in above manner.

As described above, in the digital information processing apparatus of an electronic musical instrument according to this embodiment, providing a simple control interface structure, such as the SCPU reset controller 134, enables the MCPU 10 to efficiently control the operational period of the SCPU 20.

<Multiple Data Transfer>

In some applications using a CPU, the CPU updates multiple pieces of data in executing the main program (first program), while the CPU refers to these multiple pieces of data in the interrupt routine (second program) according to the purposes of the latter routine. This data transfer from the main program to the interrupt routine. These multiple pieces of data all have to be updated by the main program before the program is interrupted by the interrupt routine. If the main program is interrupted when the multiple pieces of data are only partially updated by the program, and the CPU moves its control to the interrupt routine, an inaccurate result will come out after the interrupt routine is over.

In the digital information processing apparatus of an electronic musical instrument according to this embodiment, there are multiple pieces of data to be transferred from the main program (FIG. 4) of the MCPU 10 to the timer interrupt routine (FIG. 5) of the MCPU 10 (and the timer interrupt routine of the SCPU shown in FIG. 6). An example of such data is an envelope parameter comprising envelope Δ x (envelope operation cycle), an envelope Δ y having an addition/subtraction flag (change in an envelope) and a target envelope. The external data memory 90, as a data source, stores envelope parameters for each segment of the envelope, such as an attack segment, a decay segment or a sustain segment. The main program of the MCPU 10 has to update an envelope parameter comprising multiple pieces of data in the tone generating process 4-9. That is, when a key is pressed (note on) or an envelope has reached the target value (see steps 9-6 and 9-7) in the channel tone generating process of the interrupt routine (FIG. 9), an envelope parameter for a predetermined segment (new target envelope, an envelope Δ x and an envelope Δ y with an addition/subtraction flag) is read out from the external data memory 90, and is set in an associated channel tone generation register in the MCPU internal RAM 106 (or the SCPU internal RAM 206). The multiple pieces of data have to be completely updated by the main program before a interrupt signal INT from the interrupt generator 116 interrupts the main program.

In this embodiment, two means will be disclosed to solve such a problem in transferring (updating) multiple data. The first means is an interrupt mask system such that, with an interrupt masked while data are updated, the execution of data updating commands of the main program will not be interrupted. The second means is a single command system utilizing a function of transferring multiple pieces of data by a single command.

<Interrupt Mask System (FIGS. 16, 17 and 2 to 7)>

According to this system, an interrupt from the interrupt generator 116 is masked while data is set in the channel tone generation registers of the internal RAM by the main program, particularly the data updating commands in the tone generating process 4-9. Thus, the MCPU 10 is inhibited from moving its control from the main program (FIG. 4) to the interrupt routine (FIG. 5).

FIG. 17 shows the flowchart of an envelope process including multiple data transfer (involved in the tone generating process 4-9 of the main program). FIG. 16 illustrates hardware associated with an interrupt mask. In FIG. 17, the MCPU 10 checks in step 17-1 whether the current envelope of a designated tone generation channel has reached a target envelope. When it has reached, the MCPU 10 moves to step 17-2, reads an envelope parameter concerning the next envelope segment, i.e., a new target envelope, an envelope Δ y with an addition/subtraction flag and an envelope Δ x from the external data memory 90 (FIG. 1), and sets them in a transfer buffer in the internal RAM 106. Since the transfer buffer is an intermediate storage section between the data source and a data destination, and is a RAM area which is not referred to by the interrupt routine (FIG. 9), masking an interrupt is not necessary at this point of time. The reason why the transfer buffer is provided is that the memory 90, the data source, is an external memory common to the MCPU 10 and the SCPU 20 and that the data accessing to the memory takes longer time than the data transfer between the internal RAMs. A process in step 17-2 is done by sequentially executing multiple commands for data transfer from the external data memory 90 to the internal RAM 100.

Data transfer from the transfer buffer to the channel tone generation registers (referred to in the interrupt routine) is performed in step 17-4. To prevent the MCPU 10 from moving its control to the timer interrupt routine (FIG. 5) (or to prevent the SCPU 20 from moving its control to the program shown in FIG. 6) while data is being transferred, the MCPU 10 executes a command for masking an interrupt in step 17-3 prior to step 17-4. In execution of the interrupt mask command, a low active mask signal MASK is generated from the operation controller 112 of the MCPU 10. This mask signal MASK serves to mask an interrupt signal INT from the interrupt generator 116 so as to inhibit the MCPU 10 from moving its control onto the interrupt routine (shown in FIGS. 5 and 6). For this purpose, a mask-release wait section 150 which is connected to the interrupt generator 116 is provided in FIG. 16. The mask-release alerting section 150 includes an R-S flip-flop 1502, an AND gate 1504 and a D flip-flop 1506, connected to one another as illustrated.

When the mask signal MASK has an "H" level indicating a mask release, the R-S flip-flop 1502 is set by the interrupt signal INT from the interrupt generator 116. Then, the output from the flip-flop 1502 is fetched into the D flip-flop 1506 through the AND gate 1504 enabled by the "H"-level signal MASK at the timing of T1CK1. Further, the output of the D flip-flop 1506 is sent as an actual interrupt signal A-INT to the ROM address controller 114 of the MCPU 10. Therefore, as described in the section of the functions of starting and ending the operation of the SCPU, the address of an entry point in the interrupt routine (FIG. 5) is sent from the gate 1152 of the ROM address controller 114 to the ROM address decoder 104. At the same time, the address of the next main program command is latched from the bus An to the latch L2, and the MCPU 10 moves its control to the interrupt routine, thus interrupting the main program. The signal A-INT is sent to the SCPU reset controller 134 to start operating the program of the SCPU 20 (FIG. 7) as described in the section of the functions for starting and ending the operation of the SCPU. The H-level output of the D flip-flop 1506 resets the R-S flip-flop 1502, switching the output of the D flip-flop to an "L" level at the timing of the next T1CK1.

On the other hand, when an interrupt mask command is executed as shown in step 17-3 in FIG. 17 to send a low active mask signal MASK from the operation controller 112 to the mask-release wait section 150, an interrupt signal from the interrupt generator 116 is masked by the AND gate 1504. As a result, the mask-release wait section 150 renders the level of the output A-INT to an "L" level or an interrupt inhibiting level, while the mask signal MASK is in the low-active status, allows the ROM address controller 114 to keep the normal operation, continuing the control of the main program with respect to the MCPU 10.

Therefore, data transfer commands in step 17-4 (and a command for clearing an envelope Δ x timer) will not be interrupted even if the interrupt signal INT is generated from the interrupt generator 116 during execution of such commands. Thus, the interrupt routine (FIGS. 5 and 6) can refer to an envelope parameter which has been updated correctly, and acquire the correct operational result (musical tone waveform data).

Then, the MCPU 10 executes an interrupt mask-release command shown in step 17-5. The signal MASK supplied from the operation controller 112 to the mask-release wait section 150 is switched to an "H" level indicating a mask release. If then interrupt signal is generated by the interrupt generator 116 while the operation in step 17-4, including transfer of multiple data, is being executed, a request for an interrupt is accepted by the output of the R-S flip-flop 1502 of the mask-release wait section 150 after the mask-release command has been executed. The main program therefore is interrupted as described above, and the MCPU 10 moves its control to the interrupt routine.

<Single Command System (FIGS. 18 to 21)>

This system utilizes a single command called a "long command" for transferring multiple data at a time, to set the multiple data to an internal RAM area which the interrupt routine refers to in the main program (FIG. 4), preventing the MCPU 10 from performing an interrupt routine until the operation according to the long command is completed.

A CPU which can transfer multiple data by a single command (long command) is disclosed in, for example, Published Examined Japanese Patent Application No. Sho 60-47612, and this technology can be applied to this embodiment. According to this publication, a long command can be used for transferring data between multiple registers (for example, between registers A0–A3 and the registers B0–B3) located at a consecutive addresses ("register" in this case means one storage location in the RAM). "A" and "B" represent upper addresses of the RAM, i.e., row addresses, and "0" and "3" represent lower addresses, i.e., column addresses). The long command from a control ROM corresponding to the element 102 of this embodiment includes information about the row address of a source register ("A" in the above case), the row address of a destination register ("B"), the column address of a register relating to the first data transfer (0), and the column address of a register concerning the last data transfer (3). A RAM address controller (corresponding to the element 105 of this embodiment), properly designed so as to execute a long command, comprises a counter and a coincidence circuit. The counter increments the first to last column addresses by "1" each time data is transferred (the output of the counter is sequentially added to column address input to the RAM). The coincidence circuit compares the counter output with the value of the column address of the last data transfer to detect that all data has been transferred, and generates a long command execution complete signal when both coincide with each other.

In the following description, the main program of the control ROM 102 according to this embodiment has a long command as described above, and the RAM address controller 105 and 205 are properly designed to execute the long command.

Figure 18:
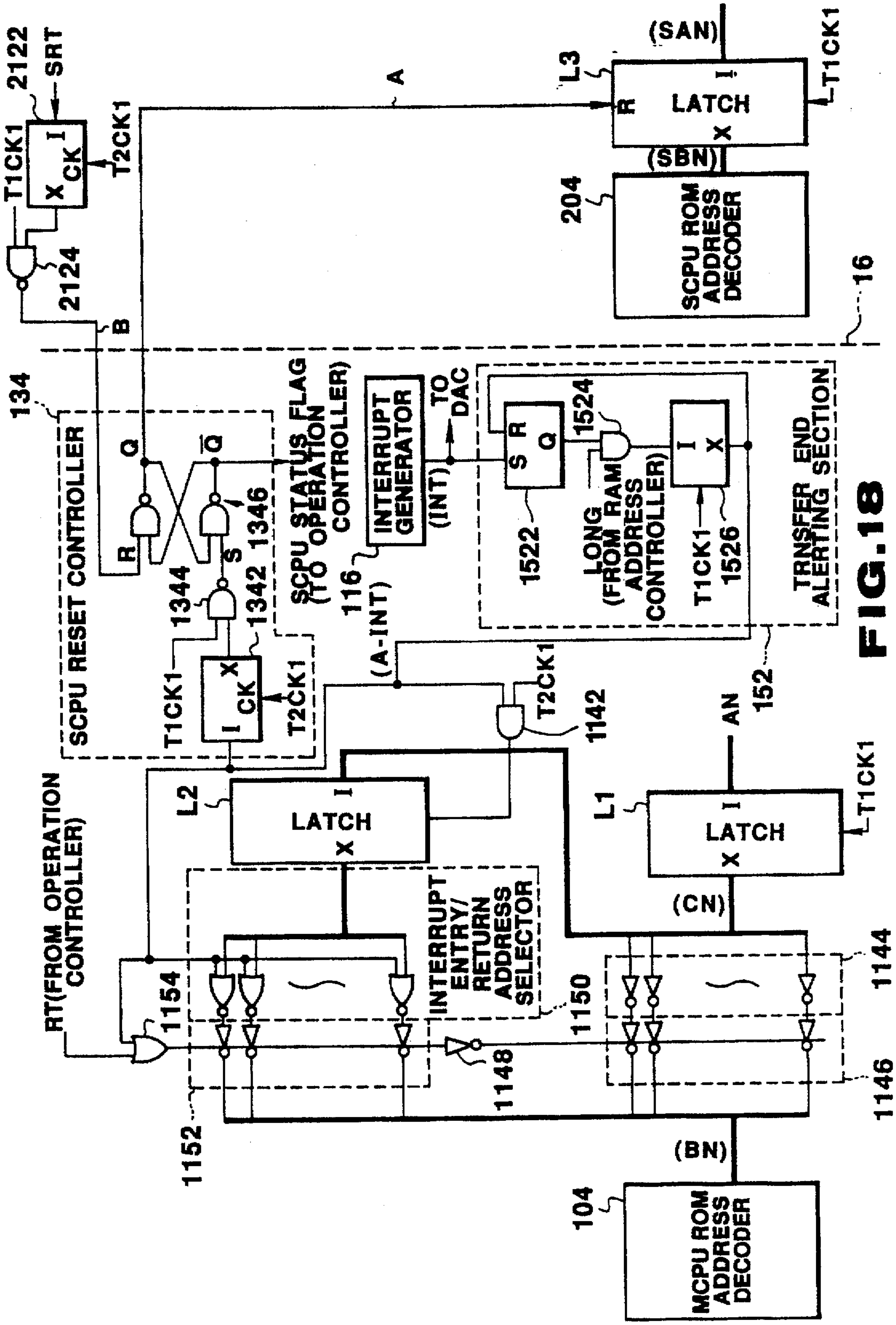
FIG. 18 is a block diagram illustrating a circuit which prohibits an interrupt signal the main program from being interrupted by an interrupt signal while multiple pieces of data are being transferred by a single command.

FIG. 18 illustrates a block diagram of hardware including a circuit which inhibits the main program from being interrupted by an interrupt signal INT during execution of the long command. FIG. 19 illustrates a memory map of the RAM in the case where the long command is used to transfer envelope parameters. FIG. 20 shows comparison between the long command (single transfer command) and multiple transfer commands. FIG. 21 represents a flowchart concerning the transfer of envelope parameters using a long command.

In FIG. 18, a transfer end wait section 152 is connected to the interrupt generator 116. This circuit 152 inhibits the main program from being interrupted by an interrupt signal while a long command is being executed. The transfer end wait section 152 comprises an R-S flip-flop 1522, an AND gate 1524 and D flip-flop 1526, connected to together as illustrated. The output of the D flip-flop 1526 (the output of the transfer end wait section 152) is sent as an interrupt signal A-INT to the ROM address controller 214 and the SCPU reset controller 134 which are actually influenced by that signal. Even if the interrupt signal INT is generated from the interrupt generator 116, the output of the D flip-flop 1526 is kept at an "L" level, and the ROM address controller 214 and the SCPU reset controller 134 are not affected by the interrupt signal INT as long as a signal~LONG sent to the AND gate 1524 has an "L" level. The signal~A LONG, which becomes an "L" level while the long command is being executed, is rendered to have an "H" level in response to a long command execution complete signal, which is generated from the coincidence circuit of the RAM address controller 104 upon completion of execution of the long command. When the signal~LONG signal has an "H" level, the interrupt signal INT from the interrupt generator 116 is sent through the transfer end alerting section 152 to affect the ROM address controller 214 and the SCPU reset controller 134. Therefore, the control of the MCPU 10 is moved from the main program (FIG. 4) to the interrupt routine (FIG. 5), starting running the program (FIG. 6) of the SCPU 20.

In the case of applying a single command system to renewal of envelope parameters, the parameters, which are referred to by the channel tone generation subroutine (FIG. 9) of the interrupt routine (FIGS. 5 and 6) and are set (updated) by the envelope subroutine (FIG. 21) of the main program, are an envelope Δ x timer, a new target envelope, a new envelope Δ x, an envelope Δ y with an addition/subtraction flag. The data source for these envelope parameters is located in the external memory 90 (FIG. 1) according to this embodiment. At the time of updating an envelope parameter (step 21-1), since it is not preferable to transfer the parameter directly from the external data memory 90 to the channel tone generating data areas of the respective internal RAMs 106 and 206, the parameter from the external memory 90 is moved temporarily to a transfer buffer area in the internal RAM 106 (step 21-2), then to a channel tone generating data area (step 21-3).

Figure 19A:
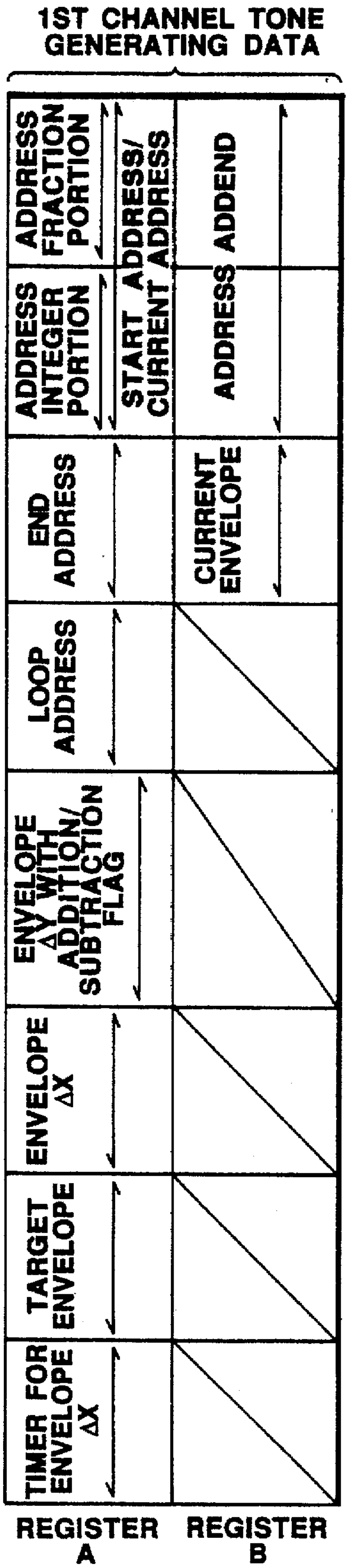
FIGS. 19A and 19B show diagrams exemplifying a memory map of a RAM which is suitable for transferring multiple pieces of data by a single command.
Figure 19B:
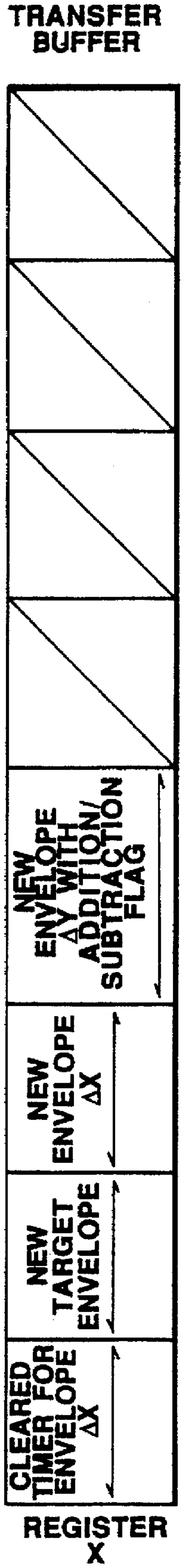

The above-described long command is to be used in the process 21-3 for transferring data from the transfer buffer area to the channel tone generating data area. To use the long command, the transfer buffer area should extend consecutively on the RAM and the channel tone generating data area of envelope parameters should likewise be consecutive. FIGS. 19A and 19B exemplify these areas. The transfer buffer area for envelope parameters is mapped on sequential areas, registers X4 to X7, while the tone generating data area for the first channel for the envelope parameters is mapped on sequential areas, registers A4 to A7. If the envelope parameters need to be updated in the first channel, a long command for transferring the registers X4 to X7 to the registers A4 to A7 has only to be executed in step 21-3. During execution of this command, even if the interrupt signal INT is generated from the interrupt generator 116 as described above, due to the function of a transfer end wait section 152 to wait for end of the execution of the long command, the signal INT does not affect the ROM address controller 114 and the SCPU reset controller 134 until the execution of the long command is completed (see FIG. 20B). As a result, the interrupt routine starts after the envelope parameters in the channel tone generating data area are all updated, so that the calculation result (tone waveform data) indicates the correct value, and the accurate operation is assured.

Figures 20A, 20B:
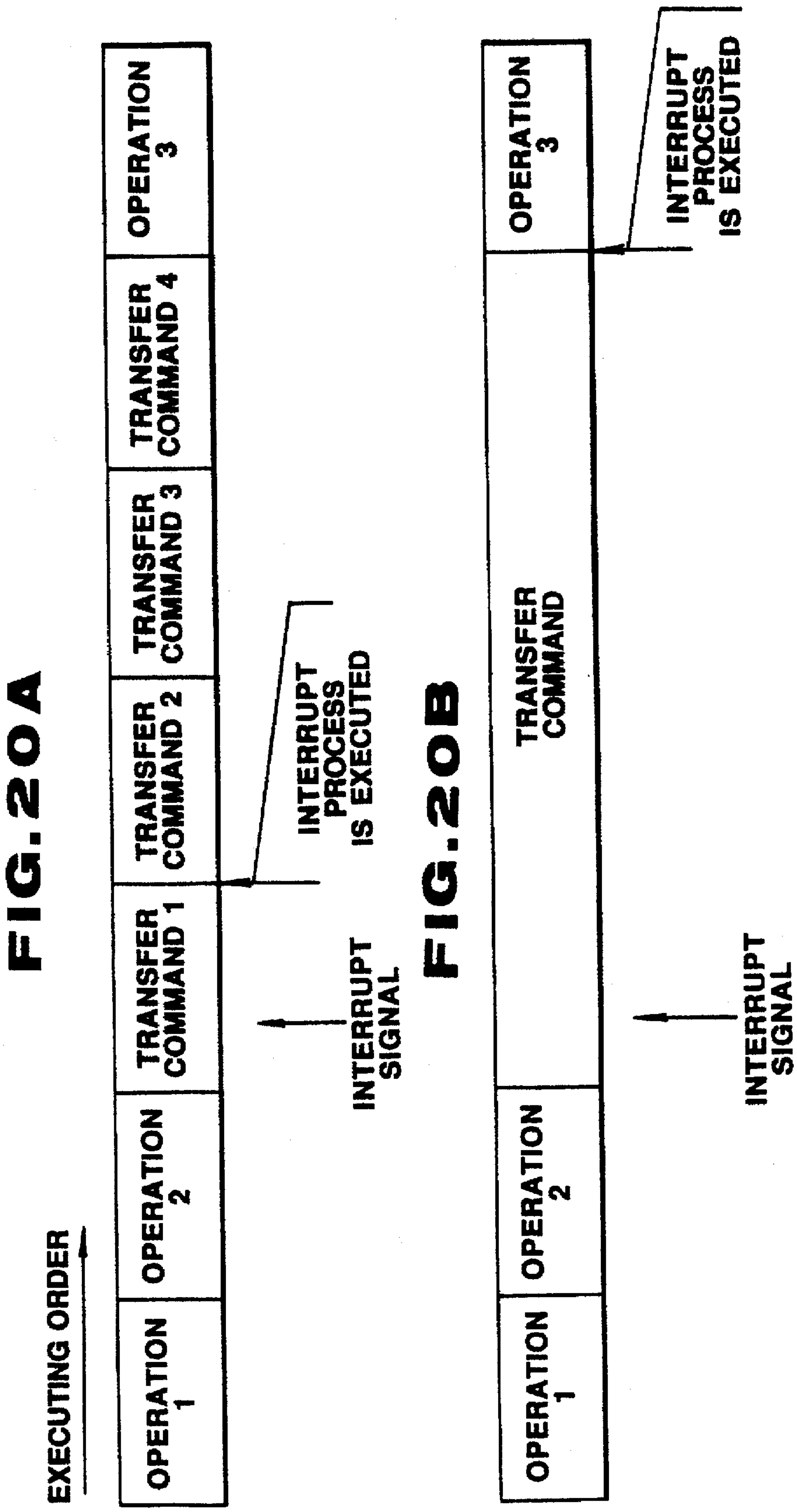
FIGS. 20A and 20B show diagrams illustrating the operation according to multiple transfer commands as compared with the operation according to a single transfer command.
Figure 21:
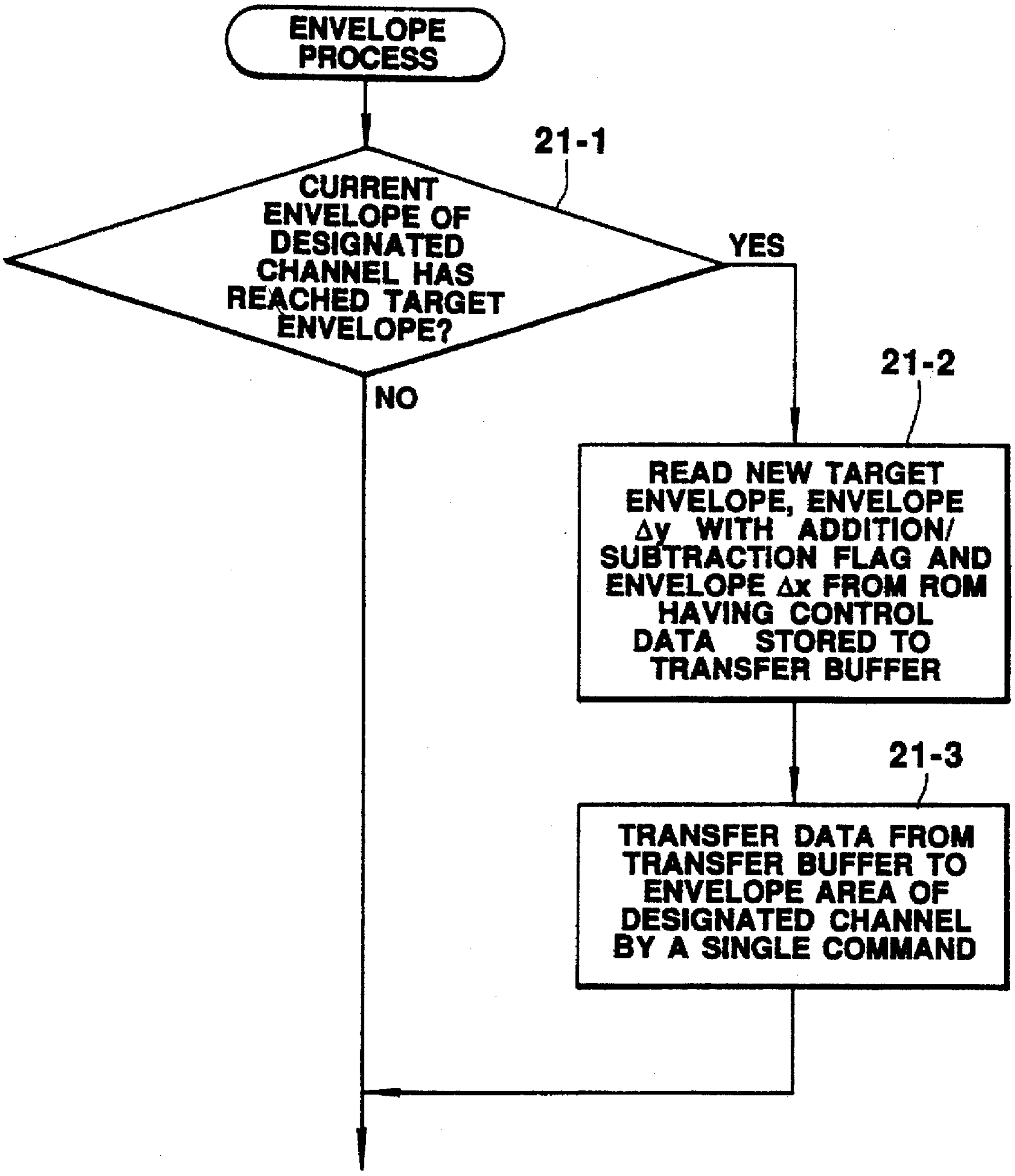
FIG. 21 is a flowchart showing an envelope setting process of a single transfer command system.

In the case that the transfer process in step 21-3 is to be performed according to multiple transfer commands (one envelope parameter is transferred for one command), with the interrupt signal INT generated during the transfer, for example, during execution of a transfer command 1 as illustrated in FIG. 20A, the first command of the interrupt routine will be executed instead of a transfer command 2 in the next machine cycle and the envelope transfer process will be interrupted. Accordingly, the result of the interrupt routine (tone waveform data) will be incorrect.

In the process of transferring (updating) multiple data according to the one command system, the interrupt mask command and the interrupt release command as indicated in steps 17-3 and 17-5 need not be executed, and the data transfer can be performed in the shortest period of time without an overhead.

As a modification, the transfer end wait section 152 as shown in FIG. 18 may be replaced with means for prohibiting the operation of the instruction output latch 102a which fetches commands from the control ROMs 102 and 202 while the long command is being executed. A circuit which prohibits the generation of an operation latch signal to be applied to the instruction output latches 102a and 202a according to a mode signal included in a long command word sent via the latch 102a from the control ROM 102 (the mode signal indicating that a command is long), and which generates an operation latch signal in the next machine cycle in response to a long command end signal, may be provided in the operation controller 112. Even when the interrupt signal INT is generated during the execution of the long command, the first command word of the interrupt routine will not be fetched from the control ROMs 102 and 202 into the instruction output latches 102a and 202a (and will not therefore be executed) until the execution of the long command is completed, thus providing the same effect as obtained in the above-described embodiment.

<Function To Access SCPU FROM MCPU>

The apparatus according to this embodiment has a function to carry out data access (read or write) fast to the internal RAM 206 of the SCPU 20 from the MCPU 10. This is generally considered as a problem in a data access between multiple CPUs. Conventionally, such inter-CPU data access between CPUs takes time. According to the prior art, a CPU requesting data access supplies a request signal to another CPU which is to be accessed. Even upon receiving the request signal, the latter access-requested CPU cannot immediately generate an acknowledge signal to allow the requesting CPU to access data, will delay the generation of the acknowledge signal until the operation being executed is completed. The conventional inter-CPU data access system, therefore, is one of obstructions to applications which require high-speed processing.

In this embodiment, two means of fast inter-CPU data access are provided to resolve the conventional problem; a system using an SCPU stop mode and an instantaneous forced accessing system.

<System Using SCPU Stop Mode (FIGS. 2, 3 and 22)>

This system employs the above-described function of starting and ending the SCPU operation. With this function, the program (FIG. 6) of the SCPU 20 starts at the same time as the interrupt routine (FIG. 5) of the MCPU 10 starts, and ends before completion of the interrupt routine ends. While the main program of the MCPU 10 is in operation, therefore, the SCPU 20 is in stop mode (in a reset status). In stop mode as shown in FIG. 2, a signal A from the reset controller 134 is at an H level indicating that the SCPU is disabled. In the SCPU 20 (FIG. 3), this signal A disables the RAM address controller 214, and connects the RAM address controller 205 to the RAM address bus Ma from the MCPU 10 via the bus gate 128, not to the RAM address bus SA from the control ROM 202 of the SCPU 20. Therefore, the RAM address controller 204 is set in operation mode to receive a designated address of the SCPU's internal RAM 206 from the MCPU 10. The RAM data-in selector 240 is set in operation mode to connect a data-in terminal of the RAM 206 to the data bus Dout which carries data from the MCPU 10, not to the data bus DB which brings an operation result from the SCPU 20 (output of the ALU section 208 or the multiplier section 210). The write signal selector 242 is set in operation mode to connect as read/write control signal C from the operation controller 112 to a read/write control input terminal of the RAM 206, instead of a read/write control signal from the operation controller 212 of the SCPU 20. As described above, the SCPU 20, when in stop mode, is prepared by the MCPU 10 to enable it to be accessed for data.

According to this embodiment, therefore, the MCPU 10 can freely access the internal RAM 206 of the SCPU 20 in the main program. FIG. 22 shows the accessing process. The acknowledgment of the "disabled" status of the SCPU 20, i.e., a check by the MCPU operation controller 112 on the SCPU status flag from the SCPU reset controller 134, has only to be performed once in the interrupt routine (FIG. 5) of the MCPU 10 (see step 5-3). Once the disabled status of the SCPU is acknowledged by executing a single command, the MCPU 10 can access the internal RAM 206 of the SCPU 20 without confirming the status until the next interrupt signal INT occurs. It is possible to significantly reduce the time for executing data access to the SCPU 20, as compared with the conventional required period of time.

<Instantaneously Forced Accessing System (FIGS. 23 to 25)>

In this system, the MCPU 10 accesses data in the internal RAM 206 of the SCPU 20 while the SCPU 20 is forced to temporarily stop at such a time. Unlike in the prior art system, the MCPU 10 and the SCPU 20 do not have to exchange a request for a data access and its acknowledgement. According to the above-described system, therefore, the MCPU 10 can access the SCPU 20 at a high speed at any time (in response to a single command) without checking the status of the SCPU 20.

FIGS. 23 and 24 present block diagrams of the MCPU 10 and the SCPU 20 with the above characteristic. The MCPU 10 and the SCPU 20 comprise elements concerning the aforementioned functions of starting and ending the SCPU operation (the SCPU reset controller 134 in FIG. 2, etc.), but those elements are not shown in FIGS. 23 and 24 in order to simplify the drawings. The SCPU start/stop signal A from the reset controller 134 has only to be supplied to the ROM address controller 214 in the SCPU 20 (FIG. 24). FIG. 25 shows the time chart of the operations of the MCPU 10 and the SCPU 20 relating to the instantaneously-forced accessing. The MCPU 10 and the SCPU 20 each need separate clock generators 136 and 236M in the instantaneous forced accessing system. The clock generator 236M of the SCPU 20 responds to a highly active SCPU access signal D which is sent from the operation controller 112M of the MCPU 10 in the execution of a data access command, and stops its own operation. In association with this process, the clock generator 136 of the MCPU 10 and the clock generator 236M of the SCPU 20 commonly receive the two-phase master clock signals CK1 and CK2, but output those clocks at separate timings. The machine cycle of the MCPU 10 (the shortest time for executing one command) is specified by one period of the three-phase clock signals, T1, T2 and T3 from the clock generator 136. One period of the three-phase clock signals ST1, ST2 and ST3 is specified as the machine cycle of the SCPU 20. In the period before the SCPU access signal D is generated in FIG. 25, the timing of the clock T1 to the MCPU 10 matches with the timing of the clock ST2 to the SCPU 20, not that of ST1. Other matched timings available between the CPUs are a pair of T1 and ST1 and a pair of T1 and ST3.

The SCPU access signal D, which is to be sent from the operation controller 112 while the MCPU 10 is executing the SCPU access command, serves to stop the clock generator 236M of the SCPU 20 to terminate the operation being executed by the SCPU 20. The signal D also serves to switch the operation modes of the bus gate 128 of the designated address in the internal RAM 206 by the MCPU 10, the address controller 204 to the SCPU internal RAM 206, the data-in selector 240 and the write signal selector 242, from the "SCPU side" to the "MCPU side", so that the MCPU 10 can access the internal RAM 206 of the SCPU 20 while the SCPU 20 is disabled. Accordingly, the SCPU access signal is carried via a delay circuit, including D flip-flop 250 and the AND gate 252, to the control input terminals of these elements 128, 204, 240 and 242 for selecting the individual operation modes. In such an accessible arrangement, the MCPU 10 addresses the SCPU internal RAM 206 through the bus gate 128 and the RAM address 204. In read-access mode, the MCPU 10 reads data output from the SCPU's internal RAM 206 into the MCPU's internal RAM 106 via the bus gate 132, while, in write-access mode, the MCPU 10 provides write data via the bus gate 130 to the data bus Dout, and sends a write signal C to the SCPU's internal RAM 206 to write the data in.

In the case that the operation of the SCPU 20 is interrupted by the SCPU access signal D from the MCPU 10, it is necessary for the SCPU 20 to hold the operation result at the time of the interrupt, and to resume the remaining part of the operation after the SCPU access signal D is released, using the intermediate result which is previously held. For this purpose, the SCPU 20 has latches *206a* and *206b* which temporarily store the data output of the SCPU internal RAM 206. The latch *206a* latches an operand from the RAM 206 (the first operand) at the timing of ST1CK1, while the latch *206b* latches an operator from the RAM 206 (the second operand) at the timing of ST2CK1.

An example of the operation of such a data access will be described below referring to FIG. 25. The MCPU 10 executes a write access to the internal RAM 206 of the SCPU 20 when the SCPU access signal D is at a high active level. The MCPU 10 fetches transfer data (data to be written to the RAM 206) out of the MCPU's internal RAM 106 during the first time slot T1 of the data-writing operation. Then, the MCPU 10 addresses the SCPU's internal RAM 206 in the next time slot T2. In the final time slot, T3, the MCPU 10 supplies the write signal C to the SCPU's internal RAM 206 to write data therein. The SCPU access signal D from the MCPU 10 is rendered active when the operation 2 of the SCPU 20 moves into the time slot T2. The operation 2 may be to execute such a command as to perform an arithmetic operation on an operator and an operand in the RAM 206 of the SCPU 20 by the ALU section 208 or the multiplier section 210. The SCPU 20 fetches the operator data from the RAM 106 in the first time slot ST1 of the operation 2, a time slot immediately before the time for the SCPU access from the MCPU 10, and then latches that data to the operand latch *106a* at the clock T1CK1. When the SCPU access signal D is not generated from the MCPU 10, the SCPU 20 fetches an operand from the RAM 106 in the next time slot ST2 to latch it in the operand latch *106b*. In the last time slot ST3, the ALU section 108 or the multiplier section 110 executes an arithmetic operation and writes the result into the operand register of the RAM 106. Actually, as illustrated, the SCPU access signal D from the MCPU 10 is generated following the first time slot ST1 of the operation 2. As one method to cope with this situation, the process to be executed in the remaining time slots ST2 and ST3 of the operation 2 should be terminated until the SCPU access signal D disappears, i.e., until the MCPU 10 ends the SCPU access operation. In this way, the MCPU 10 can also execute the operation for accessing the SCPU 20 within the shortest time (the same length as the time to access the internal RAM 106 of the MCPU 10). This way is, however, improper for the SCPU 20; whenever the SCPU access operation is made from the MCPU 10, the operation of the SCPU 20 is to be delayed by a period of the three time slots. Fortunately, the process of the SCPU access operation of the MCPU 10 to be executed in the first time slot T1 does not affect the SCPU 20. With this feature being utilized in this embodiment, the SCPU 20 continues its operation during the time slot T1 of the MCPU 10 even if the SCPU access signal D is sent from the MCPU 10, so as to shorten the operation delay of the SCPU 20. According to the example shown in FIG. 25, during the first time slot T1 of the SCPU data write operation, the SCPU 20 reads the operand data from the RAM, and sends the clock ST2CK1 to the latch 206*b*, allowing the latch 206*b* to latch the operand. Then, the SCPU clock generator 236 stops until the SCPU access signal D disappears, and the SCPU 20 is set in a wait status. During the wait status of the SCPU 20, the elements 128, 264, 240 and 242 in the SCPU 20 are switched to "the MCPU side" by the SCPU access signal D, the MCPU 10 executes a process with respect to the time slots T2 and T3 of the SCPU data writing operation, and data is written to the SCPU's internal RAM 206 from the MCPU 10.

At the end of the SCPU access signal D from the MCPU 10, the SCPU clock generator 236 resumes its operation, and changes the clock ST3 to be "H" level, and the components 128, 204, 240 and 242 of the SCPU 20 are switched back to "the SCPU side" so as to enable the operation of the SCPU 20. The SCPU 20 writes the operation output of the ALU section 208 or the multiplier section 210 into the RAM 206 to execute the remaining part of the operation 2.

As shown in the time chart in FIG. 25, the operation of the SCPU 20 is terminated by each SCPU access operation from the MCPU 10 in a period of only two time slots.

In the case of a read access operation in which the MCPU 10 reads data from the internal RAM 206 of the SCPU 20, the MCPU 10 addresses the SCPU's internal RAM 206 in the time slot T2, and the MCPU's internal RAM 106 in the time slot T3 to fetch data from the RAM 206 to the RAM 106 via bus gate 132.

As described above, using the instantaneous forced accessing system, the MCPU 10 can access the internal RAM 206 of the SCPU 20 within the shortest period of time as is achieved in accessing its own internal RAM 106, and does not have to issue a latency command. Further, in this system, even though the operation of the SCPU 20 is interrupted, the SCPU 20 can resume the operation from the interrupted point after the MCPU 10 has completed the SCPU access operation. The MCPU 10 therefore need not check the status of the SCPU 20 in advance to the access to the SCPU 20, and can freely access the SCPU 20 even in the interrupt routine (FIG. 5) being performed.

<Sharing Memory Access Contention Release Function (FIGS. 1, 26 and 27)>

The external memory 90 in FIG. 1 is a data memory that is shared by multiple CPUs, i.e., the MCPU 10 and the SCPU 20. Accordingly, means is necessary to support multiple accesses to the external data memory 90, i.e., accesses to the data memory 90 from the MCPU 10 and from the SCPU 20. To commonly use the external data memory 90, it is desirable to allow the MCPU 10 and SCPU 20 to try accessing the external data memory 90 at the same time. There needs a function that allows the MCPU 10 to exchange a right or a permission (token) to use the external data memory 90 with the SCPU 20 so as to prevent the MCPU 10 and the SCPU 20 from simultaneously accessing the external data memory 90. The procedures of the token, however, occupy the preparation period for accessing the external data memory. Accordingly, it will take more time as a whole to access the external data memory, which is not effective. In the case of permitting the MCPU 10 and the SCPU 20 to access the external data memory 90 at the same time, as the memory 90 is physically inaccessible by both CPUs at the same time, means is required which releases the contention caused by the simultaneous access.

To realize these means, external memory address information from the MCPU 10 is coupled, as shown in FIG. 1, to the address input terminal of the external memory 90 via the address bus MA, the MCPU external memory address latch 30M, the address selector 40 and the address converter 60. The data output from the external memory 90 is coupled to the MCPU 10 via the data converter 70, the MCPU external memory data latch 80M and the data bus MD. External memory address information from the SCPU 20 is coupled, as shown in FIG. 1, to the address input terminal of the external memory 90 via the address bus SA, the SCPU external memory address latch 30S, the address selector 40 and the address converter 60. The data output from the external memory 90 is coupled to the SCPU 20 via the data converter 70, the MCPU external memory data latch 80S and the data bus SD. The memory contention preventing circuit 50 receives signals MCPU-roma and SCPU-roma from the MCPU 10 and the SCPU 20, which indicate a request for access to the external data memory. This preventing circuit 50 is designed to control the address latch 30M, the address latch 30S, the address selector 40, the data latch 80M and the data latch 80S. The memory contention preventing circuit 50 has the aforementioned function for preventing access contention.

Figure 26:
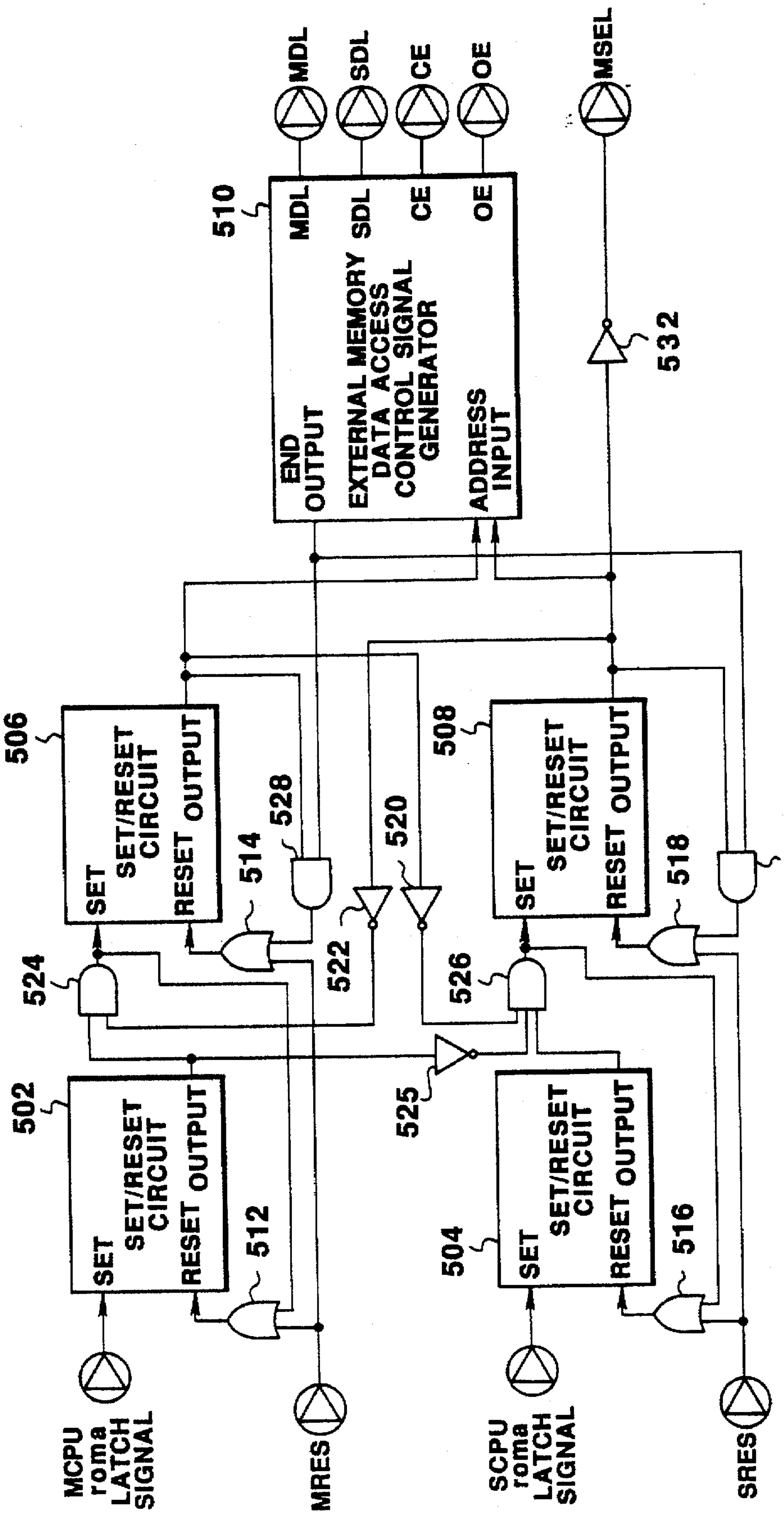
FIG. 26 is a block diagram illustrating a memory contention preventing circuit in FIG. 1.
Figure 27:
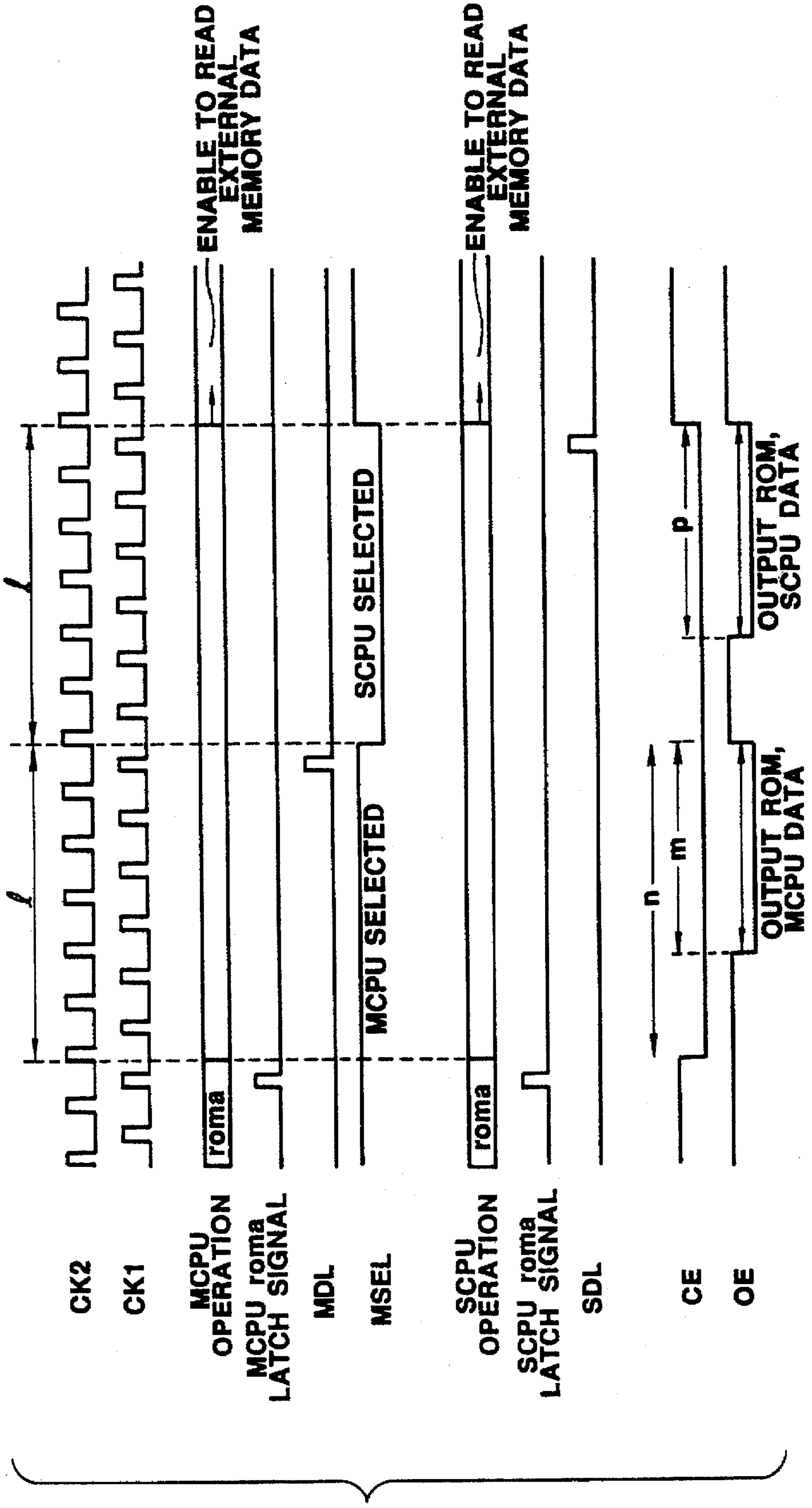
FIG. 27 is a time chart showing the operation of the circuit illustrated in FIG. 26.

FIG. 26 illustrates the block diagram of the memory contention preventing circuit 50, and FIG. 27 shows the time chart of the operation with respect to access contention.

In FIG. 26, the memory contention preventing circuit 50 receives, as inputs, the access request signals MCPU-roma and SCPU-roma respectively from the MCPU 10 and the SCPU 20, and further an MCPU reset signal MRES and an SCPU reset signal SRES (neither shown in FIG. 1). The MCPU reset signal MRES resets a set/reset circuit (R-S flip-flop) 502 and a set/reset circuit 506 which is connected to the output terminal of the circuit 502. The signal MCPU-roma sets the set/reset circuit 502, which temporarily stores the access request from the MCPU 10. The set/reset circuit 506 on the output side, when in the set status, indicates that the access request from the MCPU 10 has been acknowledged and the access operation is now in progress through an external memory data access control signal generator 510. Likewise, the SCPU reset signal SRES resets a set/reset circuit 504 and a set/reset circuit 508 which is connected to the output terminal of the circuit 504. The signal SCPU-roma sets the set/reset circuit 504, which temporarily stores the access request from the SCPU 20. The set/reset circuit 508 on the output side, when in the set status, indicates that the access request from the SCPU 20 has been acknowledged and the access operation is now in progress.

The above will be described below more specifically. The "H"-level output from the MCPU access request set/reset circuit 502 in the set status sets the MCPU access execution set/reset circuit 506 to the MCPU access execution status via an AND gate 524, on condition that the SCPU access execution set/reset circuit 508 is not in the set status, i.e., that the SCPU 20 is not executing the access operation. (The AND gate 524 has the other input terminal coupled to the inverted input coming through an inverter 522 from the set/reset circuit 508.) The MCPU access execution set/reset circuit 506 is reset via an OR gate 512 by a signal which sets the set/reset circuit 506. (The OR gate 512 has the other input terminal coupled to the reset signal MRES.) Likewise, the "H"-level output from the SCPU access request set/reset circuit 504 in the set status sets the set/reset circuit 508 to the SCPU access execution status via art AND gate 526, on condition that the set/reset circuit 506 is not in the set status, i.e., that the MCPU 10 is not executing the access operation. (The AND gate 526 has one of its input terminals coupled to the inverted input coming through an inverter 520 from the set/reset circuit 506.) The set/reset circuit 504 is reset via an OR gate 516 by a signal which sets the set/reset circuit 508. (The OR gate 516 has the other input terminal coupled to the reset signal SRES.) With the above-described structure, if one of the CPUs (SCPU 20, for example) makes an access request while the access operation concerning the other CPU (MCPU 10) is being performed, the access operation involving the access-requesting CPU (SCPU 20) will not be executed until the former access operation in progress is completed. Accordingly, access contention can be basically prevented.

Further, the MCPU 10 and the SCPU 20 sometimes request the access at the quite same time. To cope with this access contention, the access request from the MCPU 10 is acknowledged in prior, so that the access operation of the MCPU 10 is first executed and then the access operation of the SCPU 20 is performed. When the MCPU access request set/reset circuit 502 is in the set status, therefore, the output signal "H" from the circuit prohibits the AND gate 526 via the inverter 525. When the set/reset circuit 502 is being set and the SCPU access request set/reset circuit 504 is in the set status, the signal prohibits the SCPU's access execution set reset circuit 508 to be set.

The data access control signal generator 510 is coupled to the output terminals of the set/reset circuits 506 and 508. When the output level of either one of the set/reset circuits changes to the set status "H", the access to either CPU indicated by the set status is executed in a sequence of processes. The signals CE and OE sent from the control signal generator 510 are control signals to output data from the external memory 90. A signal MDL is a control signal to latch data from the external memory 90 into the external memory data latch 80M of the MCPU. A signal SDL is a control signal to latch data from the external memory 90 into the external memory data latch 80S of the SCPU. The external memory data access control signal generator 510 generates an END signal after the access operation is completed. The END signal resets the access execution set/reset circuit which has been in the set status. The END signal is coupled to the reset input terminal of the set/reset circuit 506 via an AND gate 528 and an OR gate 514. The AND gate 528 has the other input terminal coupled to the output terminal of the set/reset circuit 506, while the OR gate 514 has the other input terminal coupled to the MCPU reset signal MRES. Further, the END signal is coupled to the reset input terminal of the set/reset circuit 508 via an AND gate 530 and an OR gate 518. The AND gate 530 has the other input terminal coupled to the output terminal of the set/reset circuit 508, while the OR gate 518 has the other input terminal coupled to the SCPU reset signal SRES.

The output from the SCPU access execution set/reset circuit 508 becomes an address select signal MSEL to the address selector 40 via an inverter 532. The address selector 40 selects the address for the SCPU from the SCPU external memory access address latch 305 while the access of the SCPU 20 is in progress. Otherwise, the address selector 40 selects the address for the MCPU from the MCPU external memory access address latch 30M.

As apparent from FIG. 27, the MCPU 10 and the SCPU 20 simultaneously request the access to the external memory 90 as indicated in "roma in the operation of the MCPU" and "roma in the operation of the SCPU." In executing these roma commands, the MCPU 10 sends address information to the address bus MA, and outputs the signal MCPU-roma, allowing the MCPU external memory access address latch 30M to latch the address information. Like the MCPU 10, the SCPU 20 sends address information to the address bus SA, and outputs the signal SCPU-roma, allowing the SCPU external memory access address latch 30S to latch the address information. The signals simultaneously generated, MCPU-roma and SCPU-roma, set the MCPU access request set/reset circuit 502 and the SCPU access request set/reset circuit 504 in the memory contention preventing circuit 50. On the other hand, in accordance with the above-described MCPU-access priority logic, the status of the access execution set/reset circuit 506 of the MCPU immediately is changed to the set status. Accordingly, the external memory data access control signal generator 510 executes the access of the MCPU 10 to the external memory 90. The address selector 40 has selected address information from the MCPU 10 at this time. The period of the access operation of the MCPU 10 is represented as a period l shown on the left side in FIG. 27. (The circuit 510 is operated by the two-phase master clocks CK1 and CK2, not shown in FIG. 26.) The data access control signal generator 510 changes the chip enable signal CE low active in the period n, and the output enable signal OE low active in the period M, latter half of the period n. In this period m, therefore, data requested by the MCPU 10 is sent from the external memory 90, and is also latched into the MCPU external memory data latch 80M in response to the signal MDL which is generated by the data access request signal generator 510. The data access request signal generator 510 has completed the access operation for the MCPU 10, outputting the end signal END. Accordingly, the set/reset circuit 506 is reset, and the set/reset circuit 508 is now set. The signal MSEL changes to "L"-level indicating the address selection by the SCPU. The address selector 40 selects the address from the SCPU 20 to address the external memory 90. Further, in response to a set signal from the set/reset circuit 508 of the SCPU, the data access control signal generator 510 executes the access of the SCPU 20 to the external memory 90. The address selector 40 has selected address information from the MCPU 10 at this time. The period of the access operation is represented as l shown on the right side in FIG. 27. The data access control signal generator 510 renders the signal CE low active in this operation period, and the signal OE low active in the period p, the latter half of the operation period. In this period p, data requested by the SCPU 20 is sent from the external memory 90, while the signal SDL is generated so as to latch the required data by the SCPU 20 into the SCPU external memory data latch 80S. The data access request signal generator 510 has completed the access operation for the SCPU 20, outputting the end signal END. Accordingly, the set/reset circuit 508 is returned to the reset status.

After these process, the MCPU 10 and the SCPU 20 read data from the respective external memory data latches 80M and 80S carried on the data bus MD and SD, obtaining the required data.

As described above, after both CPUs 10 and 20 have executed the roma commands (external memory access request commands), the CPUs can obtain the required data when a predetermined period 2 l has passed in which the memory contention preventing circuit 50 executes the access operation of each CPU, thereby releasing the access contention. Further, since the latency time is constant (2 l), the CPUs 10 and 20 can assign this period to the execution of other commands, thus optimizing the efficiency of running program commands.

There is no illustration involving a different timing relation between the signals MCPU-roma and SCPU-roma. But, in any case, since the CPUs 10 and 20 are provided with the required data in their external data latches upon elapse of the predetermined period 2 1 after the roma commands has been issued, this data will be available.

<Address Data Conversion Hardware (FIGS. 1 and 28 to 32)>

In general, a microcomputer system including a CPU is often requested to prepare data in an arithmetic operation memory, which is converted from the original data in the data memory, i.e., to prepare desired information to be extracted from the original data. Especially, this kind of data conversion will be necessary as compensation when the storage capacity of the data memory is to be effectively used. For this purpose, conventionally, a command of data transfer from the data memory to the arithmetic operation memory is executed to send the original data of the data memory to the arithmetic operation memory, and then two or more conversion commands are executed to convert the data in the arithmetic operation memory via an ALU section. The conventional method, therefore, takes time for data conversion to obtain the desired data in the arithmetic operation memory, which is one obstruction in an application which requires high-speed processes.

According to this embodiment, both CPUs 10 and 20 only execute their individual commands (roma commands) for data transfer from the external memory 90 to the internal RAMs 106 and 206, as arithmetic operation memories, and allow the properly-converted data to be fetched into the RAMs 106 and 206 in order to improve the speed of the data conversion process. To realize this purpose, the address converter 60 is provided on the address path between the CPUs 10 and 20 and the external memory 90, while the data converter 70 is provided on the data path between the external memory 90 and the CPUs 10 and 20. The converters 60 and 70 respond to a control signal sent from the CPUs 10 and 20 at the time of executing the respective roma commands, and perform desired conversion.

FIG. 28 illustrates a list of the external memory access commands, roma. The first command roma0 is a transfer command for no conversion. Upon reception of this command, the address converter 60 supplies the address received from the CPUs 10 and 20 as an output address to the external data memory 90 without any conversion. The data converter 70 also supplies data from the external memory 90, without conversion, to the CPUs 10 and 20. In accordance with this non-converting transfer command roma0, conversion control signals R1, R2 and R3, which are sent to the converters 60 and 70 from the CPUs 10 and 20, are all rendered to an "L" level.

The second command roma1 is a command adequate for reading a special waveform. In response to this command, the address converter 60 passes the lower 12 bits of the addresses sent from the CPUs 10 and 20 without conversion when the 13th bit A12 is "0." When the 13th bit A12 is "1," the converter 60 inverts the lower 12 bits. The 13th bit in the output address from the address converter 60 is fixed to "0" whatever value the 13th bit A12 of the received address has. The data converter 70 converts the 13th bit A12 of the received address from the CPUs 10 and 20 to the 13th bit D12 of data to be supplied to the CPUs 10 and 20, while it converts the data from the external memory 90 in such a manner that the lower 12-bit data is to be inverted when A12 is "1." Suppose that there is special wave data (0000 to 0FFF) whose number of valid data bits is 12, as shown in FIG. 28, present in the address area of the external memory 90, 0000 to 0FFF. If the CPUs 10 and 20 repeatedly execute the command roma1 with respect to the range of the designated address 0000 to 1FFF, the external memory address output from the address converter 60 advances from 0000 to 0FFF temporarily, while the data converter 70 passes the data from the external memory 90. Then, the inverting operation of the address converter 60 causes the address to the external memory 90 goes backward from 0FFF to 0000. On the other hand, the data converter 70 inverts the lower 12 bits of the data sent from the external memory 90 to output converted data with the 13th data bit D12 being "1." In other words, when the CPUs 10 and 20 send the addresses to the address area, 0000 to 1FFF, and repeatedly execute the command roma1, both CPUs 10 and 20 actually receive a waveform as shown on the right side in the column of the roma1 in FIG. 28. This converted waveform is a repetitive waveform such that the original waveform in the external memory 90, shown on the left side, has been extended in a predetermined manner (or a waveform symmetrical about the address 0FFF and data 0FFF). As a result, the wave data memory capacity used in the above-described way is only a half of that used in a system for storing the data of converted waveform in the external data memory 90 in advance. In execution of the command roma1, only the control signal R1 out of the three signals R1, R2 and R3 becomes an "H" level.

The third command roma2 instructs to read part (half of a word) of the external memory data. In this case, only the signal R2 becomes an "H" level. The memory capacity per address (word) of the external data memory 90 is 16 bits. In execution of the command roma2, when the 16th bit A15 of the address sent from the CPUs 10 and 20 is "0", the data converter 70 masks the upper eight bits of the 16-bit data from the external data memory 90 to "0", leaving the lower eight bits intact. When A15 is "1", the data converter 70 shifts the upper eight bits of the 16-bit data from the external data memory 90 to the lower eight bits, with the remaining upper eight bits masked. Since the 16th bit A15 of the input address serves as a control signal in the data converter 70, the address converter 60 masks the 16th bit of the output address to a predetermined value, "0," whatever value A15 is. The upper eight bits and the lower eight bits of the 16-bit information from the external data memory 90 in this case may be the upper data portion (for example, an integer portion) and the lower data portion, (for example, a fraction portion) of one piece of data, such as phase data, or can be two different and separate kinds of 8-bit data, such as rate data and level data.

The fourth command roma3 is for shifting the external memory data to read part of it. Only the control signal R3 becomes an "H" level in the execution of this command. With this command received, the data converter 70 shifts the upper 12 bits, 15 to 4, of the 16-bit data from the external memory 90 to bits 14 to 3, while leaving the bit 15. The converter 70 masks the lower three bits, 2 to 0, to "0." The upper 12 bits in the 16-bit data of the external memory 90 indicate wave data with the bit 15 as a sign bit, while the lower four bits indicate another data. Because of the above-described conversion, the CPUs 10 and 20 can read, at a high speed, the wave data in a format proper for being used in the internal RAMs 106 and 206.

Figure 29:
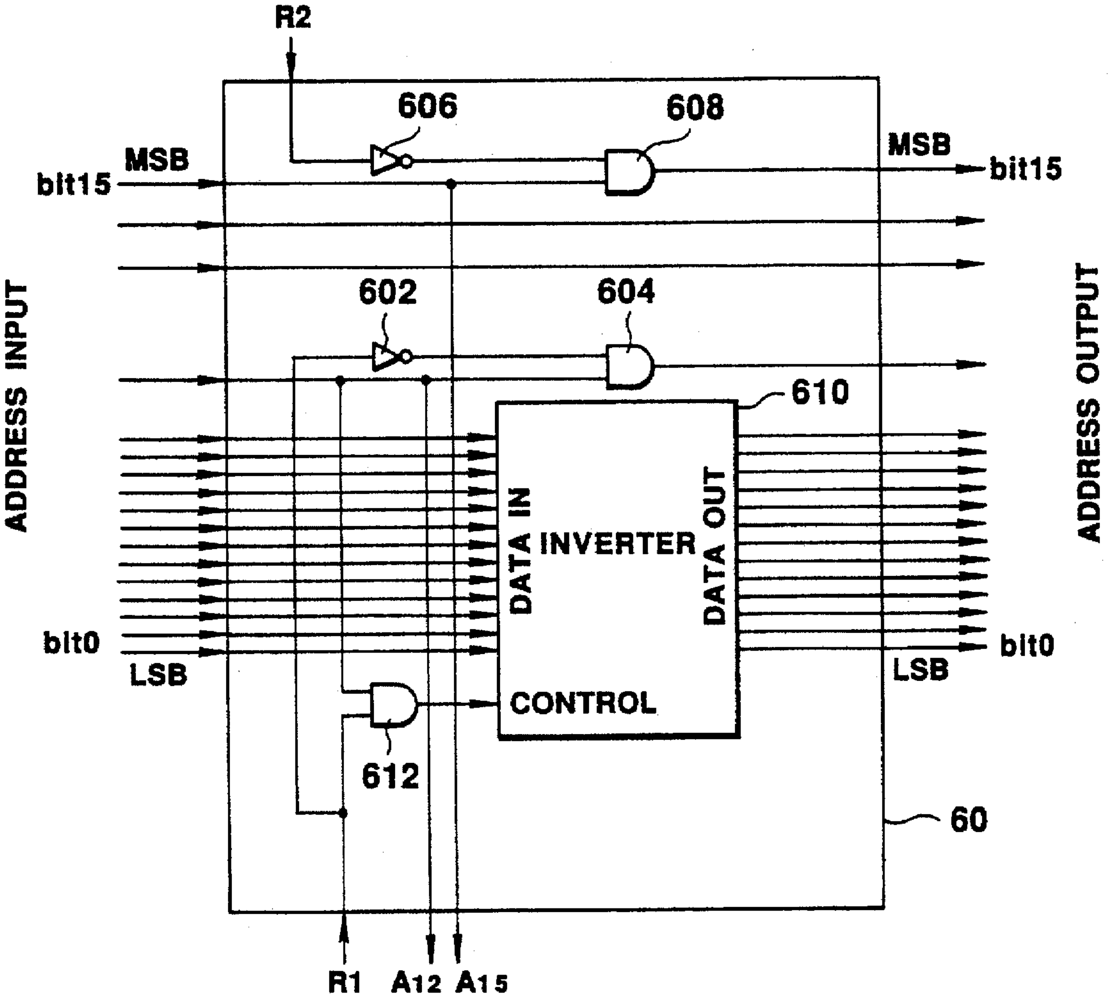
FIG. 29 is a block diagram showing an address converter in FIG. 1.
Figure 30:
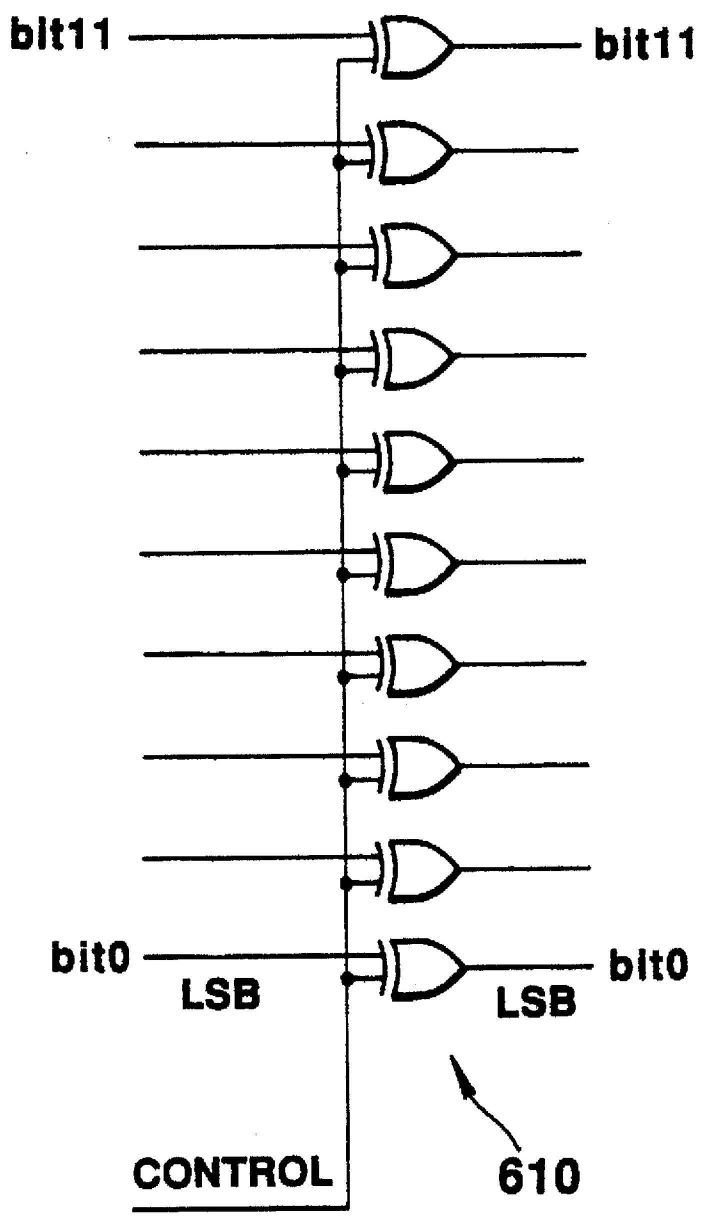
FIG. 30 is a circuit diagram illustrating an inverter shown in FIG. 29.

FIG. 29 shows the block diagram of the address converter 60. An inverter 610 in the address converter 60 receives the lower 12 bits, 0 to 11, out of the 16-bit address sent from the MCPU 10 or the SCPU 20 via the address latches 30M and 30S and the address selector 40. The inverter 610 will be illustrated in detail in FIG. 30. When the control signal R1 is "1" indicating the command roma1 and A12 of the address is "1," the inverter 610 inverts the lower 12 bits of the input address in accordance with a signal from an AND gate 612. The signal R1, having a value "1" in the execution of the command roma1, prohibits an AND gate 604 via an inverter 602, and sets a corresponding bit 12 of the output address, whichever value A12 of the input address has. A13 and A14 of the received address are sent as corresponding bits bit 13 and bit 14 of the output address. A15 (MSB) of the input address is changed to a corresponding bit 15 of the output address through an AND gate 608. While the signal R2 of "1" which indicates that the command roma2 is being executed, is generated, this signal disables the AND gate 608 through an inverter 606 to mask the bit 15 (MSB) of the output address to "0."

Since R1="0" and R2="0" for the non-converting command roma0 and the shift reading command roma3, therefore, the address converter 60 passes the input address directly as an output address. Because R1="1" for the special waveform reading command roma1, the address converter 60 masks the bit 12 of the output address to "0", and inverts the lower 12 bits (bit 0 to bit 11) of the input address in the inverter 610 as an output address while A12="1." In this manner, the function of the address converter explained by referring to FIG. 28 can be realized.

Figure 31:
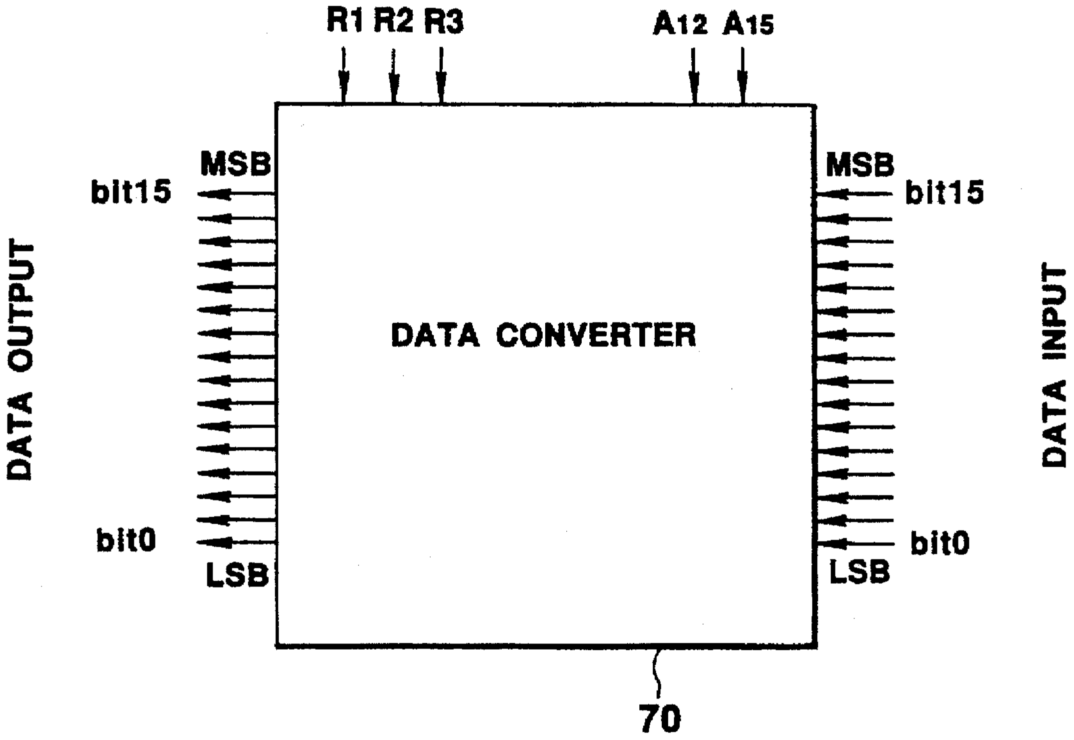
FIG. 31 is a block diagram showing a data converter in FIG. 1.
Figure 32:
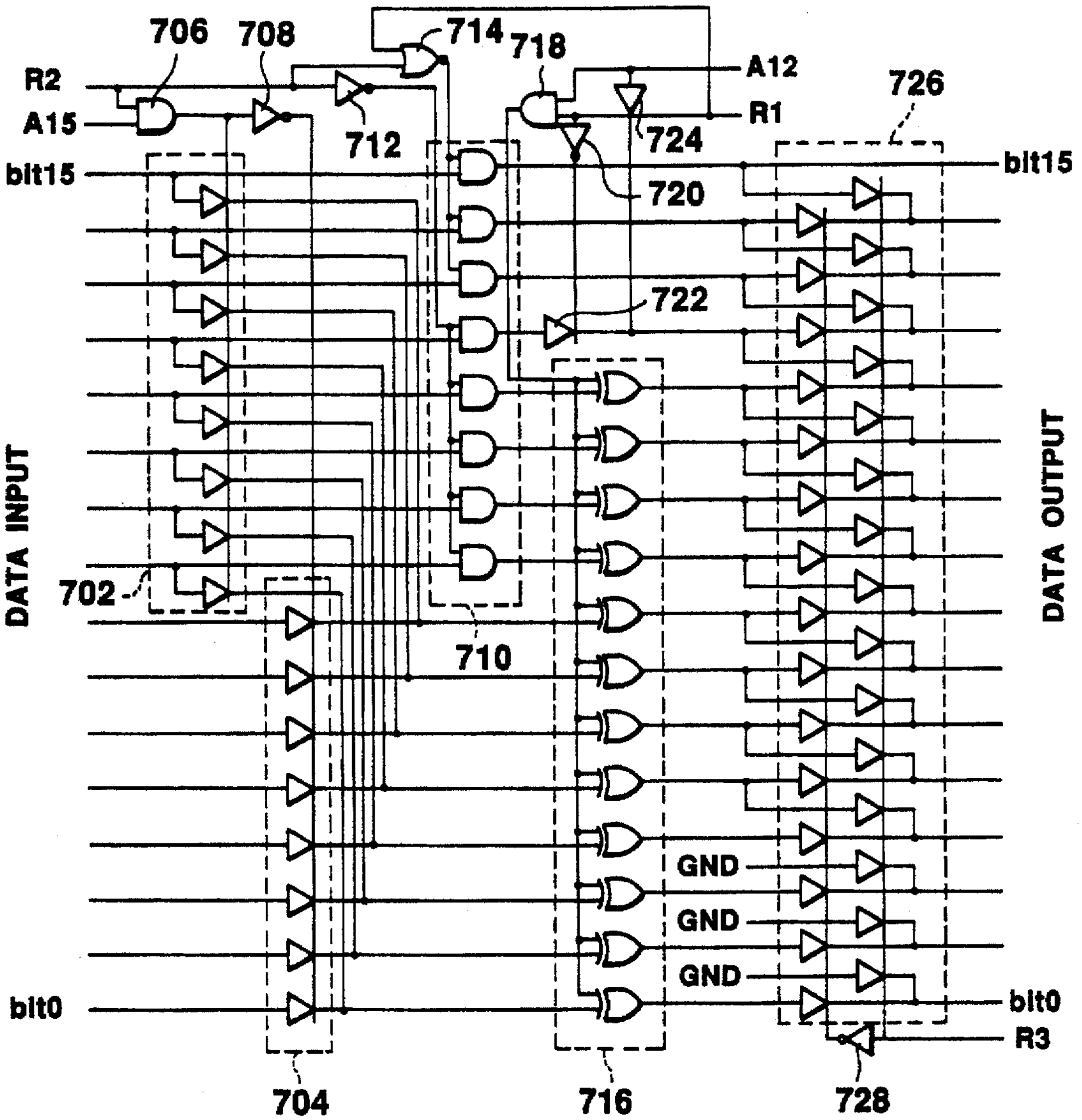
FIG. 32 is a circuit diagram illustrating the data converter.

FIG. 31 is a block diagram of the data converter 70, and FIG. 32 illustrates the detailed structure of the converter 70. Data input indicated in the drawings what is supplied from the external memory 90 shown in FIG. 1. In FIG. 32, a three-state gate circuit 702, to be coupled to the upper eight bits of the input data, and a three-state gate circuit 704, to be coupled to the lower eight bits, serve to determine whether the upper eight bits or the lower eight bits of the received data should be selected as the lower eight bits of data to be output. When R2 is "1" (roma2 command) and A15 is "1", in response to the output signal "1" of an AND gate 706 and an inverted signal, i.e., the output signal "0" of an inverter 708, the gate circuit 702 is enabled, setting the gate circuit 704 off. The upper eight bits of received data therefore is selected as the lower eight bits of output data. Otherwise, the gate circuit 702 is set off, enabling the gate circuit 704, so that the lower eight bits of the received data is output as the lower eight bits of the output data. Further, when R2 is "1" (roma2 command), an AND gate 710 is prohibited, which is coupled to the upper eight bits of received data, and the upper eight bits of output data are masked to "0." In other words, when R2 is "1", a disable signal is sent to the AND gate circuit 710 via an inverter 712 and an NOR gate 714 to prevent the upper eight bits of the received data from passing through the AND gate circuit 710. When R1 is "1" (roma1 command), the AND gate element of the AND gate circuit 710, which is coupled to the upper three bits of received data, is disabled via the NOR gate 714. Accordingly, the upper three bits of output data are masked to "0."

An EX-OR gate circuit 716 selectively inverts the lower 12 bits of received data. When R1 is "1" (roma1 command) and A12 is "1," the EX-OR gate circuit 715 inverts the lower 12-bit data in accordance with an invert signal "1" from an AND gate 718, and otherwise it sends the lower 12-bit data through. A status gate 722 is to be coupled to the bit 12 of input data via the AND gate element of the circuit 710. When the signal R1 is "1" (roma1 command), the status 722 is rendered OFF by a signal "0" supplied from an inverter 720 to be coupled to R1, and a three-state gate 724 to be connected to A12 becomes enabled to generate the bit 12 of output data. A shift mask circuit 726 shifts the bits 15 to 4 of selectively received data to the bits 14 to 3 of output data, and masks the bits 2 to 0 of the output data to "0." With the signal R3 as "1" (roma3 command), the shift mask circuit 726 performs such a conversion in response to an signal "1" from an inverter 728 to be coupled to R3.

The data converter 70 therefore passes the received 16-bit data as it is, in response to the non-conversion command roma0 (R1=R2=R3="0"). When the data converter 70 receives the special waveform reading command roma1 (R1="1") the converter 70 performs the data conversion converts in such a way that the lower 12 bits of output data becomes directly the lower 12 bits of received data (A12=0) or the 12 bits of the input data inverted (A12=1), depending on that the upper four bits, bit 15 to bit 12, of the received address is "0000" (A12=0) or "0001" (A12=1). In response to the command roma2 (R2="1") for reading part of data, the converter 70 performs the data conversion in such a manner that the upper eight bits of the output data become all "0" and the lower eight bits become the upper eight bits of the received data (A15=1). When the shift reading command roma3 (R3="1") is executed, the converter 70 converts the data in such a way that the lower three bits, bit 0 to bit 2, of the output data become all "0," the bits 3 to 14 of the output data become the bits 4 to 15 of the input data, and the bit 15 (MSB) of the output data becomes the bit 15 (MSB) of the input data. In the aforementioned manner, the data conversion function described referring to FIG. 28 can be accomplished.

It is apparent from the above description what advantages will be expected by providing the address converter 60 and the data converter 70. The CPUs can obtain data subjected to the desired conversion with the help of the converting functions of the circuits 60 and 70, by simply executing the command roma to access the external memory 90 as a data memory. Also, unlike the prior art, it is unnecessary to fetch data from the external memory 90 into the internal RAMs 106 and 206 as arithmetic operation memories and convert the data via an ALU, such as the ALU sections 108 and 208, thus improving the processing speed.

The list of the access commands roma shown in FIG. 28 is given just as an example, and may easily be extended or altered.

<DAC Sampling (FIGS. 33A, 33B, 34A and 34B)>

According to this embodiment, the DAC 100 converts a digital tone signal generated by the MCPU 10 and the SCPU 20 to an analog tone signal. As shown in step 5—5 in FIG. 5, the MCPU 10 sets the sample of a digital tone signal generated by the MCPU 10 and the SCPU 20 in the DAC 100 during the execution of the timer interrupt routine. On average, an interval for executing this process 5—5 is equal to that of the timer interrupt generator 116 generating an interrupt signal INT; however, the actual interval varies depending on the operation of a program. If D/A conversion is performed with the execution interval of the process 5—5 regarded as a D/A conversion cycle, great distortion will be occur on an analog tone signal.

Figure 33A:
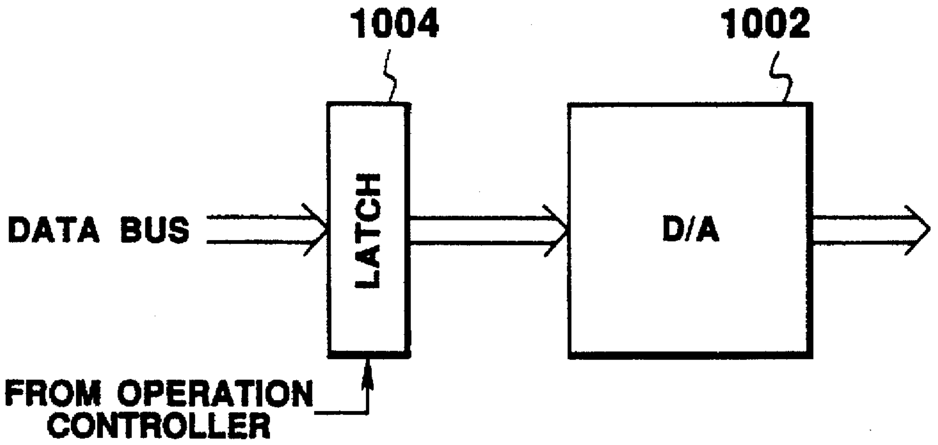
FIGS. 33A and 33B show diagrams illustrating a structure where the sampling period of a DAC in FIG. 1 becomes unstable as compared to a structure where the sampling period becomes stable.
Figure 33B:
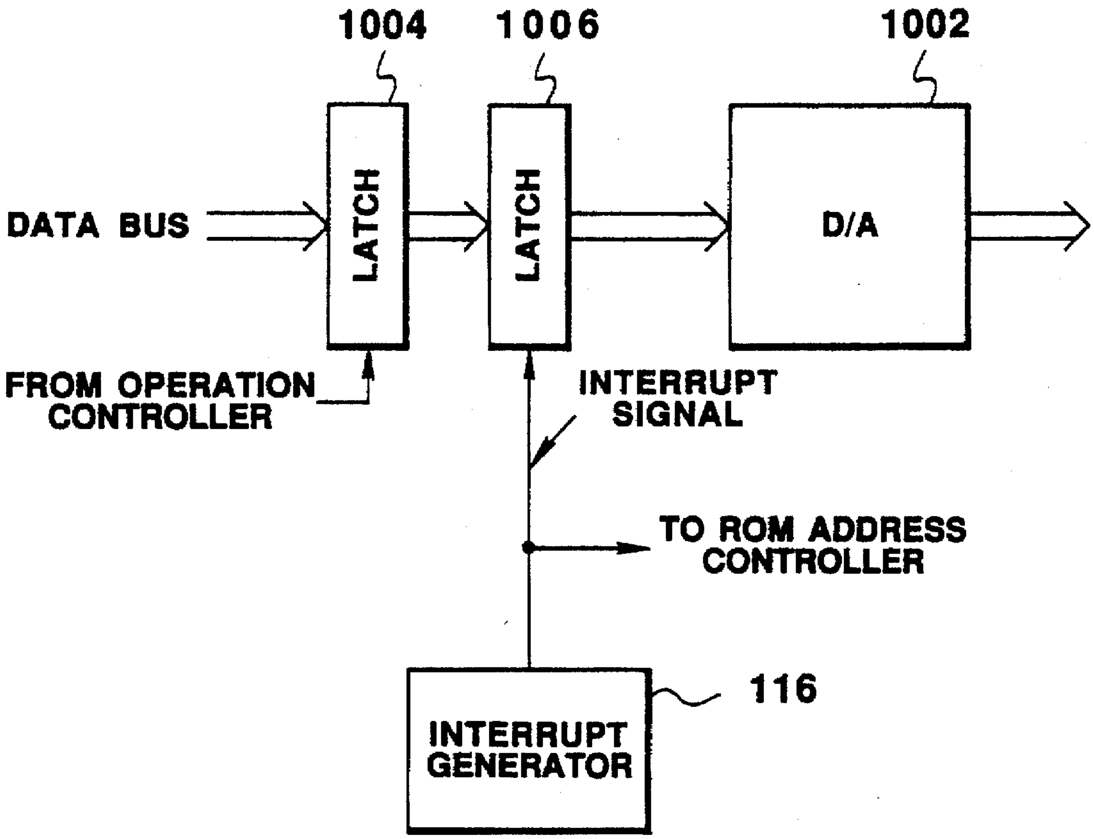
Figure 34A:
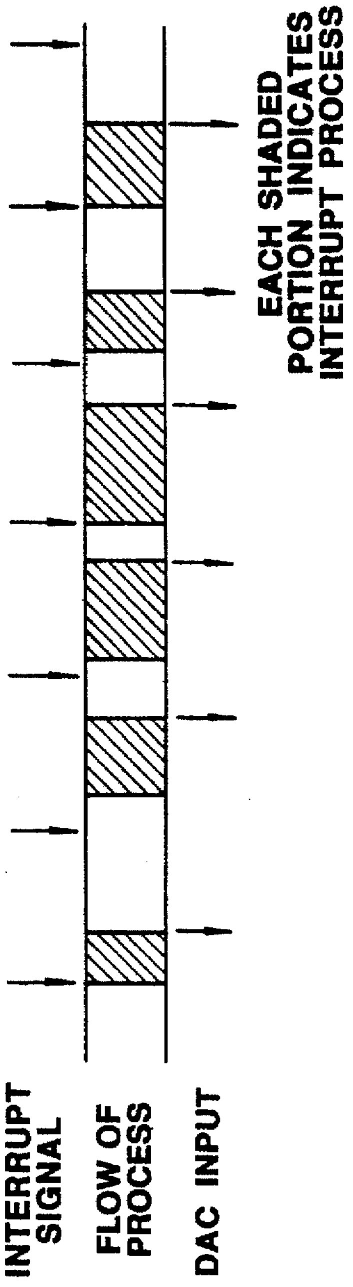
FIGS. 34A and 34B show time charts illustrating a time chart where the sampling period of the DAC becomes unstable as compared with a time chart where the sampling period becomes stable.

FIGS. 33A and 33B exemplify the structure of the right DAC 100R or the left DAC 100L. According to the structure shown in FIG. 33A, at the time that the process 5—5 is executed, a wave-addend register in the internal RAM 106 is designated, and the latest digital tone data stored in the register is read out and carried on the data bus, under the control of the operation controller 112 of the MCPU 10. At the timing where the digital tone data is carried on the data bus, a program control signal for strove is sent to the clock input terminal of a latch 1004 from the operation controller 112. The data on the data bus is set into the latch 1004, which then sends new digital tone data to a D/A converter 1002. As shown in FIG. 34A, therefore, the digital tone data sent to the D/A converter 1002 is to be converted in an unsteady cycle to control the program. Unless the D/A converter 1002 keeps a very stable conversion cycle (sampling cycle), significant distortion will be expected in conversion.

Figure 34B:
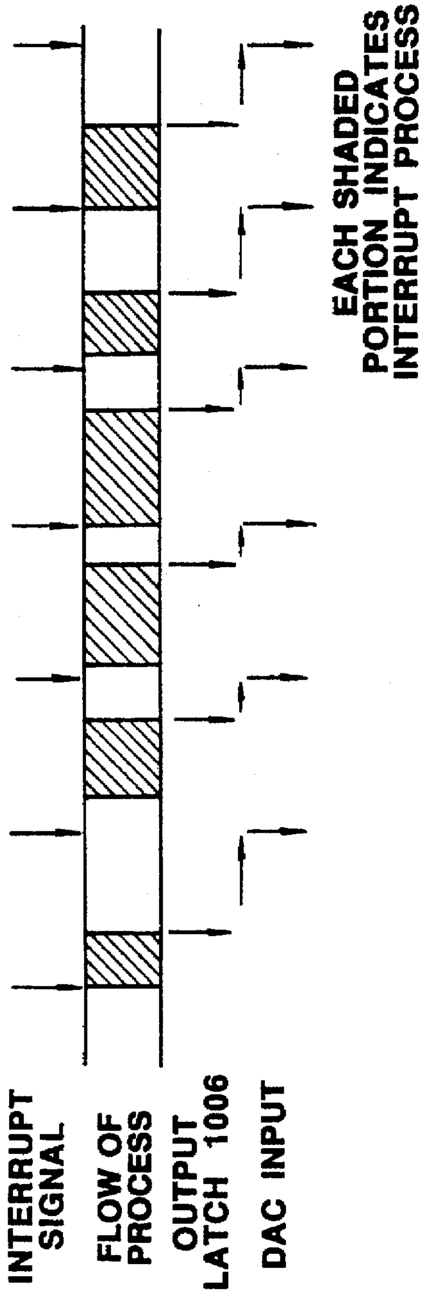

Such a problem will be overcome by providing the structure as shown in FIG. 33B. An interrupt control latch 1006 is provided between the soft control latch 1004, controlled according to the program control signal from the operation controller 112, and the D/A converter 1002, which converts a digital tone signal to an analog tone signal. The interrupt control latch 1006 is controlled according to an interrupt signal INT which is an accurate timing signal from the interrupt generator 116. A cycle for generating an interrupt signal is highly stable because it relies on the stability of a clock generator. The output from the latch 1006 is selected in synchronism with the timing of the interrupt signal. In other words, the generation cycle of the interrupt signal is equivalent to the conversion (sampling) cycle of the D/A converter 1002. FIG. 34B shows the time chart of the DAC with the structure shown in FIG. 33B. Referring to the drawing, a timing when the output of the latch 1004 is switched is changed according to the lag of the timing when the interrupt process is moved, and time required for the interrupt process (length of each shaded section). Because of the presence of the latch 1006 which operates in response to the interrupt signal, however, the input data to the D/A converter 1002 will be switched in synchronism with the interrupt signal. Thus, the distortion problem in the case of the structure shown in FIG. 33A can be overcome.

<Modification and Advantage>

The first embodiment, which has been described above, may be modified or altered in various manners within the scope of the present invention.

For example, the main program may be given to two or more CPUs, not a single CPU, allowing each CPU to share the system control of an electronic musical instrument. In this case, the main programs to be incorporated in the individual CPUs will differ in accordance with where the CPUs bear the share of the system control. For example, the main program of the first CPU may process the input coming from the function keys, and the main program of the second CPU handles the input made through keys on a keyboard.

As described above, according to the present invention, since multiple CPUs function according to their own programs to cooperatively generate tone signals, it is possible to provide a digital information processing apparatus for an electronic musical instrument, which, unlike the prior art apparatus, can perform the tone generating performance without depending on any specially-designed, hardware-based tone generator. Addition or alteration of functions of the apparatus can be made basically by changing the programs which CPUs execute, requiring no significant circuit alteration.

As the advantages of this embodiment, the amount of access between multiple CPUs (resulting in deterioration of the operation efficiency in the system) can be reduced to the minimum; the use of a single main CPU facilitates the system control; and not only the hardware of the individual CPUs can be realized by the same circuit structure, but also the CPUs can incorporate as common a program as possible. All of the above advantages facilitate the realization of the system structure of a digital information processing apparatus for an electronic musical instrument.

<SECOND EMBODIMENT>

A description will now be given of the second embodiment according to which the present invention is also applied to an electronic musical instrument.

This embodiment (FIGS. 35 to 49) has the same features as the first embodiment. One different feature concerns a mechanism by which a sub CPU starts and ends its operation; the sub CPU starts functioning upon receiving data for tone generation from a master CPU in response to a timer interrupt requesting the master CPU to execute tone generation, so that the master CPU and the sub CPU bear their share of tone generation.

<General Structure>

Figure 35:
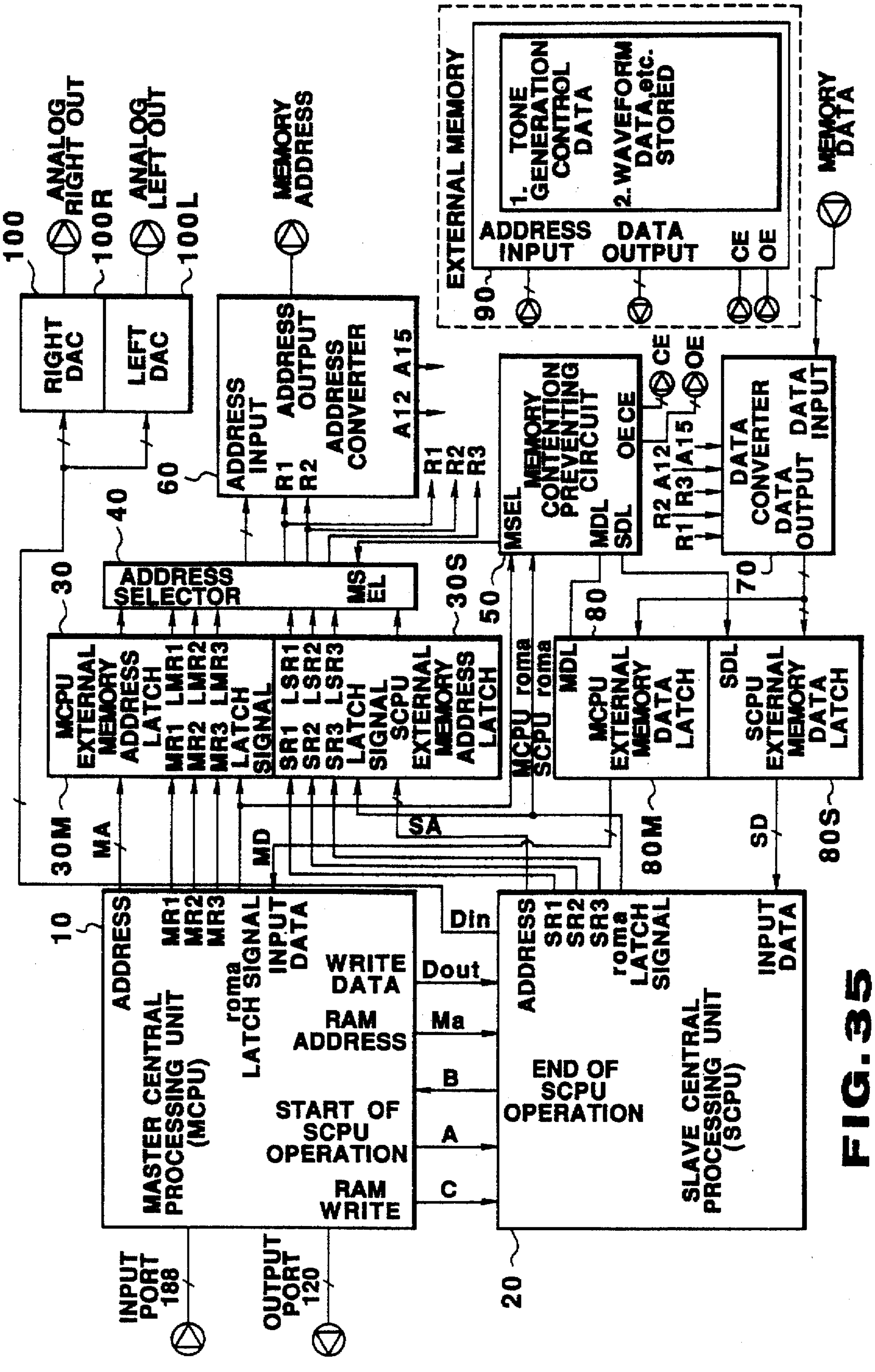
FIG. 35 is a diagram illustrating the general structure of a digital information processing apparatus for an electronic musical instrument according to the second embodiment of the present invention.

FIG. 35 illustrates a block diagram of the entire structure of this embodiment as the digital information processing apparatus of an electronic musical instrument. This structure is almost identical to the one explained in association with the first embodiment referring to FIG. 1. Like or same reference numerals as used to denote the elements in FIG. 1 specify corresponding or identical elements shown in FIG. 35 to avoid their otherwise redundant description.

Figure 41:
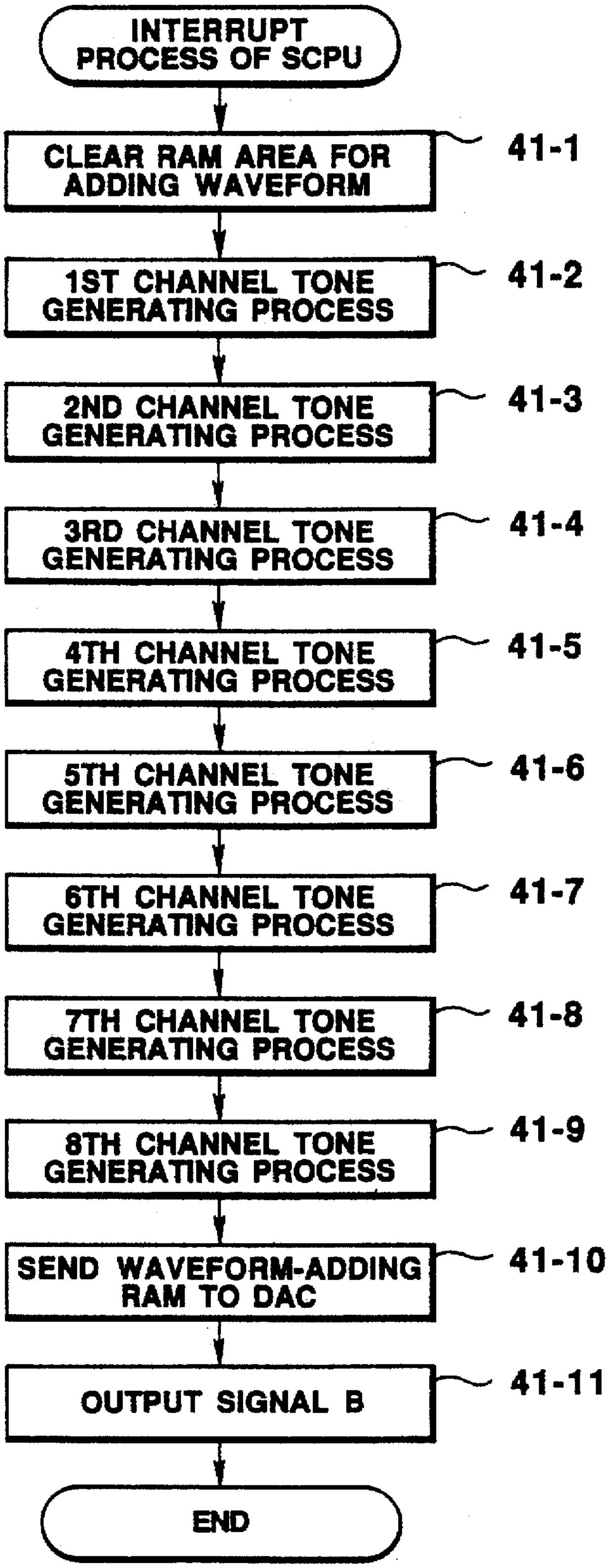
FIG. 41 is a flowchart showing a routine the SCPU executes.
Figure 42:
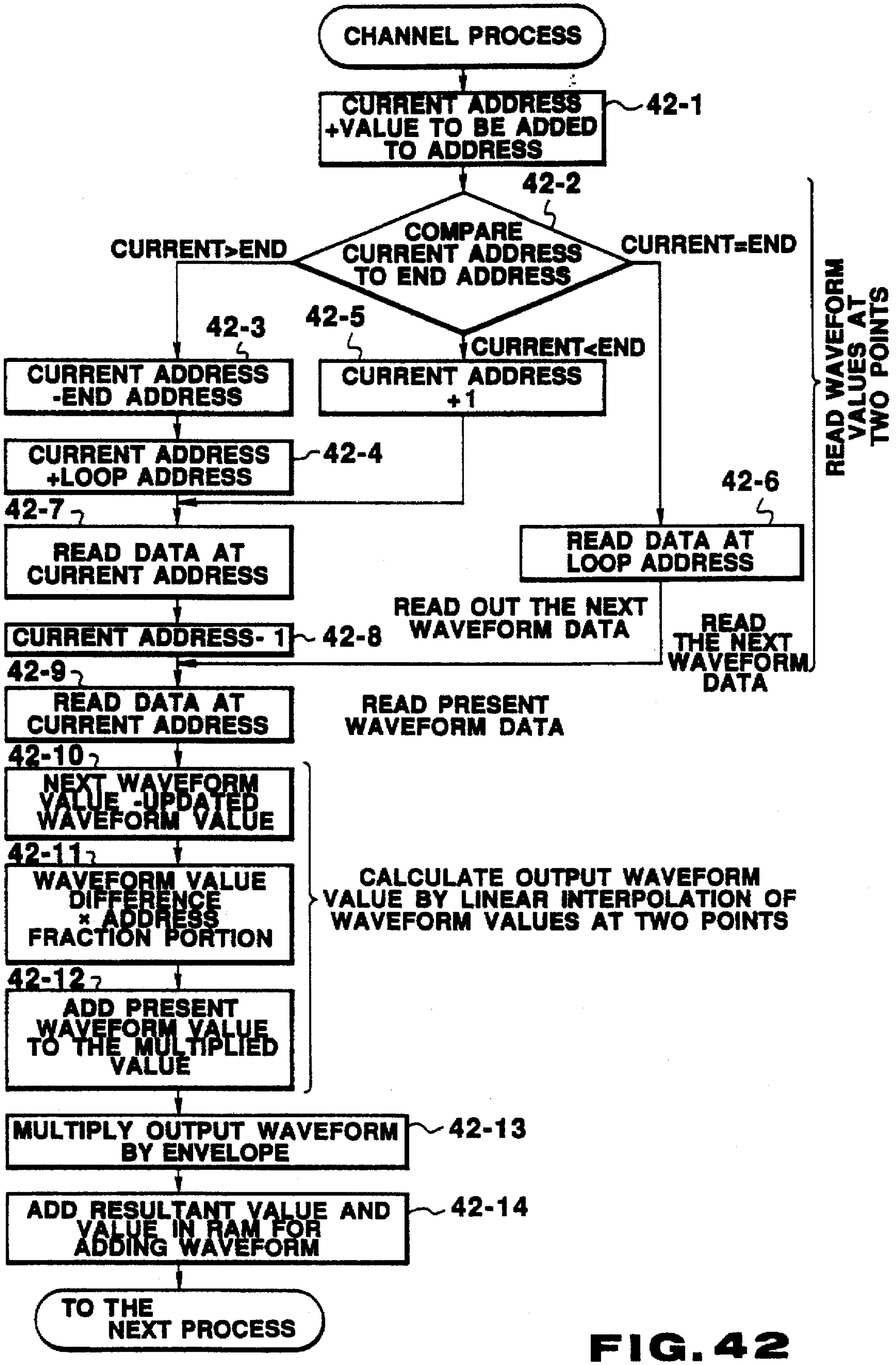
FIG. 42 is a detailed flowchart showing each channel process in FIG. 41.

The CPUs 10 and 20 incorporate programs, and operate according to their own programs. The MCPU 10 executes part of tone generation (FIGS. 38 and 39), performs the general control of the system; for example, processes input information from input units (a keyboard, function keys, etc.) to be connected to an input port 118 and an output port 120. (This is the same as shown in FIG. 4.) The SCPU 20 is exclusively used for the remaining tone generating process and for the DAC 100 which converts a digital tone signal to an analog tone signal (FIGS. 41 and 42).

A digital tone signal is generated by the SCPU 20 in a tone generating process. The generated signal is sent from the SCPU 20 to the digital/analog converter (DAC) 100 comprising the right DAC 100R and the left DAC 100L, where it is converted into an analog musical tone signal, and is output outside.

<Structures of MCPU and SCPU (FIGS. 36 and 37)>

Figure 36:
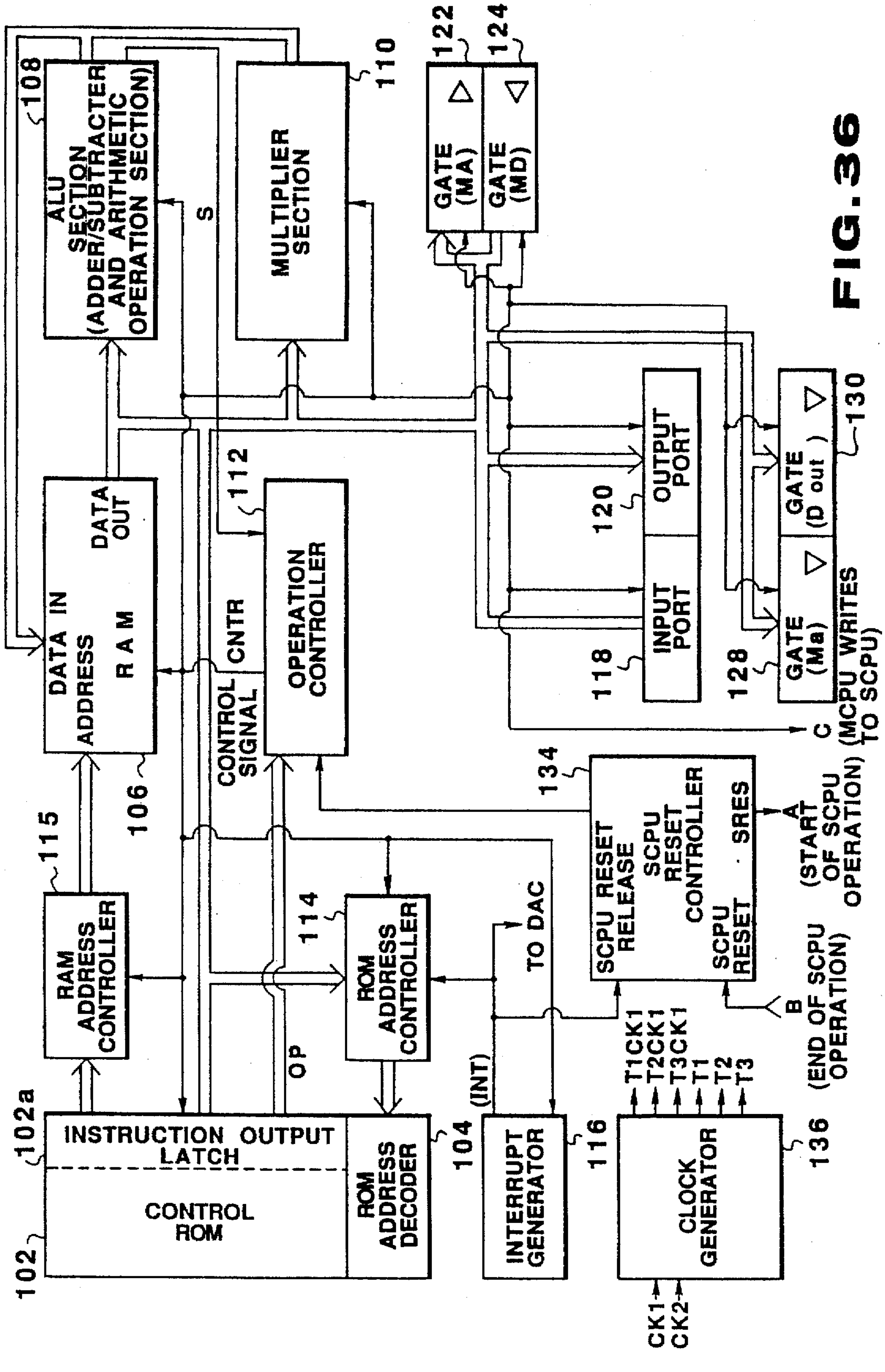
FIG. 36 is a block diagram illustrating the MCPU in FIG. 35.
Figure 37:
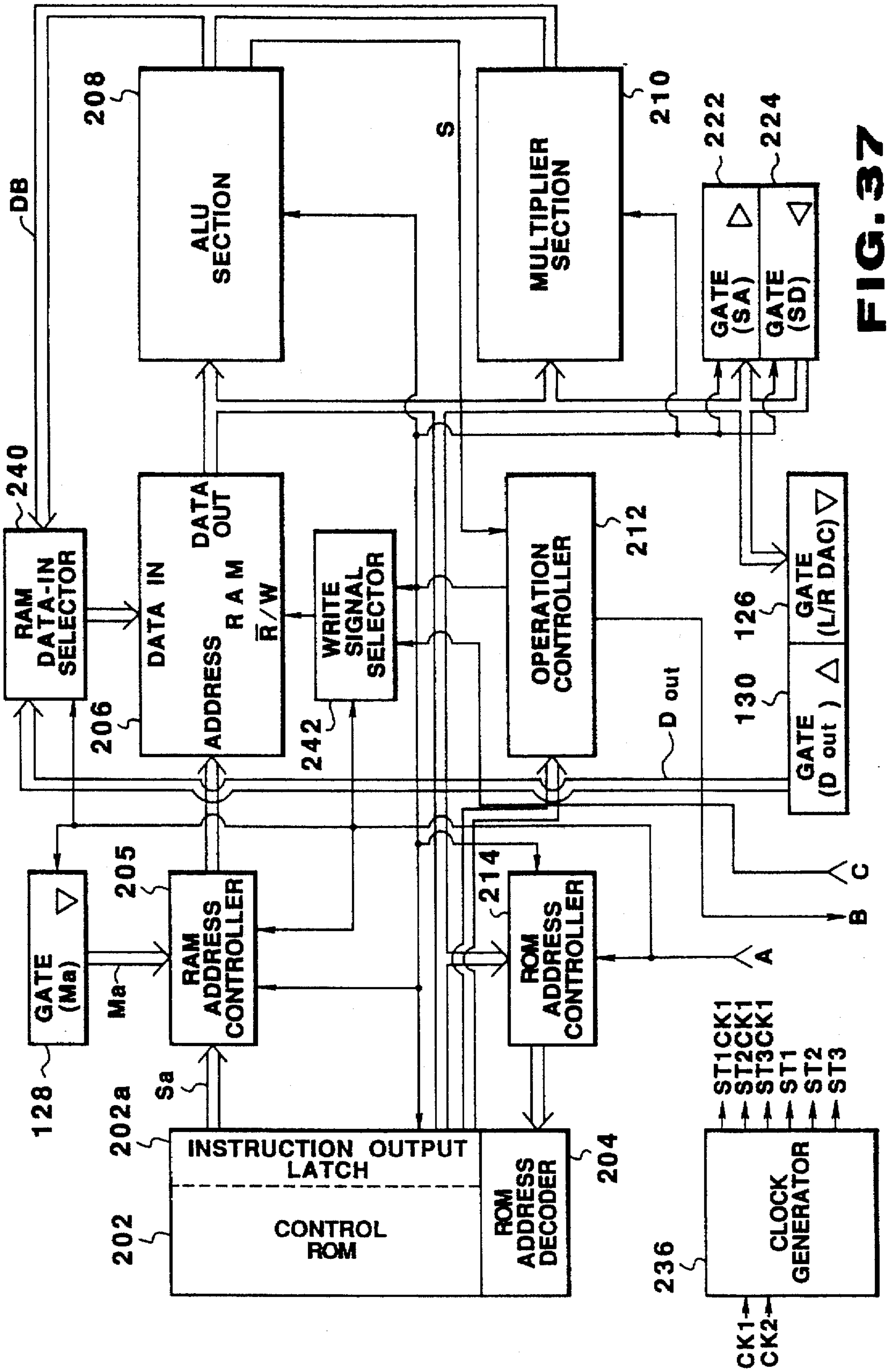
FIG. 37 is a block diagram illustrating the SCPU in FIG. 35.

FIGS. 36 and 37 respectively illustrate the internal structures of the MCPU 10 and SCPU 20. These structures are almost identical to those explained referring to FIGS. 2 and 3 in association with the first embodiment, so that the description of the identical portions will be omitted. In this embodiment, a gate 126 is connected to the internal bus of the SCPU 20 and also is connected to a DAC data transfer bus.

This structure is almost the same as the one explained in association with the first embodiment referring to FIGS. 2 and 3, so that the description of corresponding or identical elements will be omitted. In this embodiment, the gate 126 is connected to the internal bus of the SCPU 20 to be connected to the DAC data transfer bus.

<Description of Operation of CPU>

The main program of the MCPU 10 of this embodiment is the same as the one illustrated in FIG. 4 concerning to the first embodiment, thus omitting its explanation.

Figure 38:
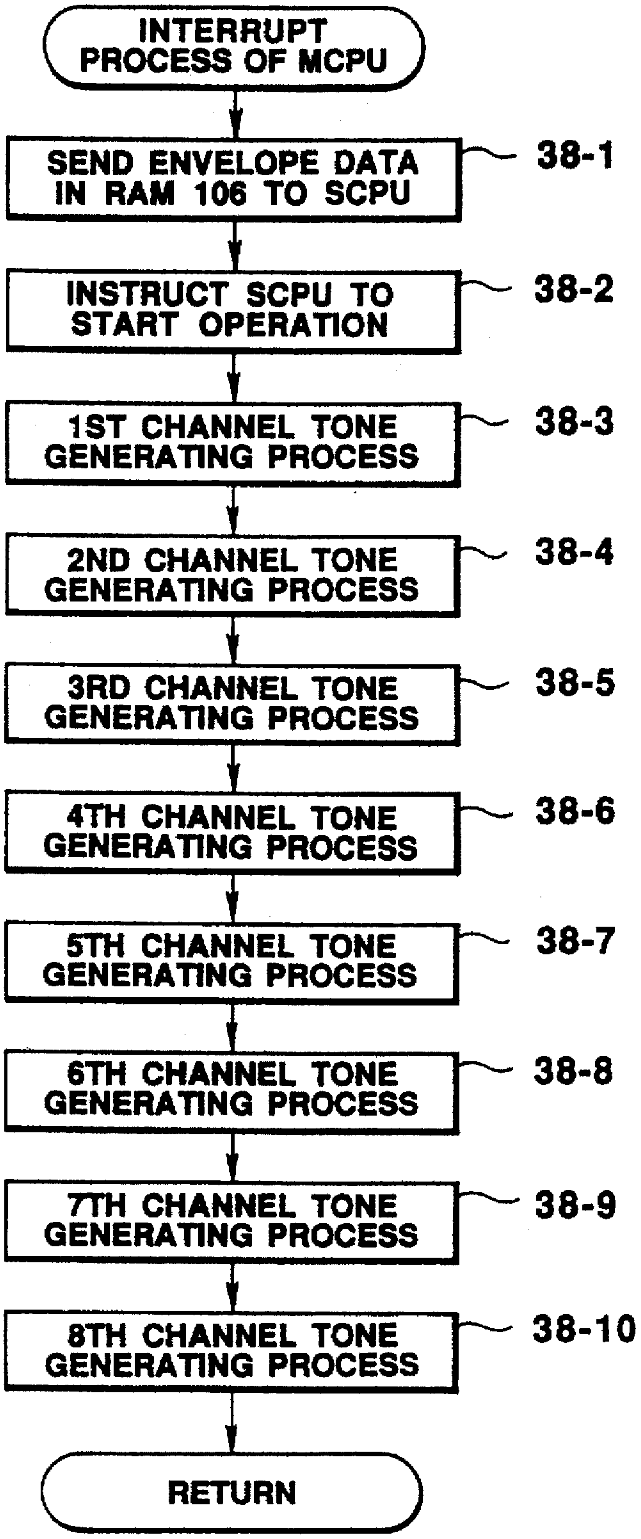
FIG. 38 is a flowchart showing an interrupt routine the MCPU executes.
Figure 39:
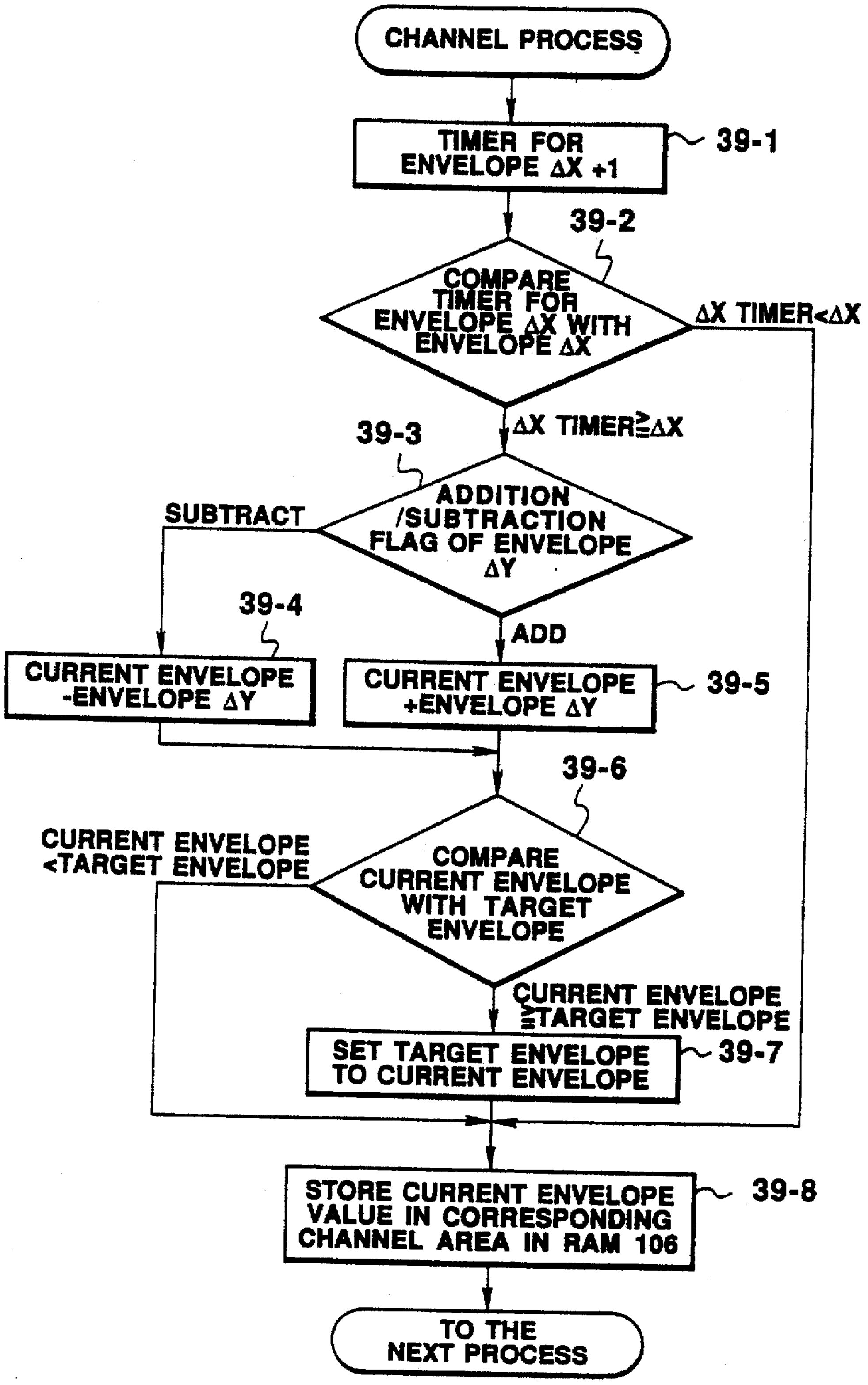
FIG. 39 is a detailed flowchart representing a channel process in FIG. 38.

FIGS. 38 and 39 are flowcharts showing the operation of the MCPU 10 according to the interrupt routine of the MCPU 10, which is invoked by a timer interrupt signal INT: FIGS. 41 and 42 are flowcharts showing the operation of the SCPU 20 according to the program of the SCPU 20, which is invoked by a operation start signal A from the MCPU 10.

The electronic musical instrument system according to this embodiment comprises CPUs, i.e., the MCPU 10 and the SCPU 20. These CPUs cooperate to execute processes for the electronic musical instrument. The MCPU 10 performs the interrupt routine shown in FIGS. 38 and 39 for part of a tone generating process, while the SCPU 20 performs the program illustrated in FIGS. 41 and 42 to generate remaining musical tones. Further, the MCPU 10 executes various tasks for controlling the entire system according to the main program shown in FIG. 4.

Figure 43:
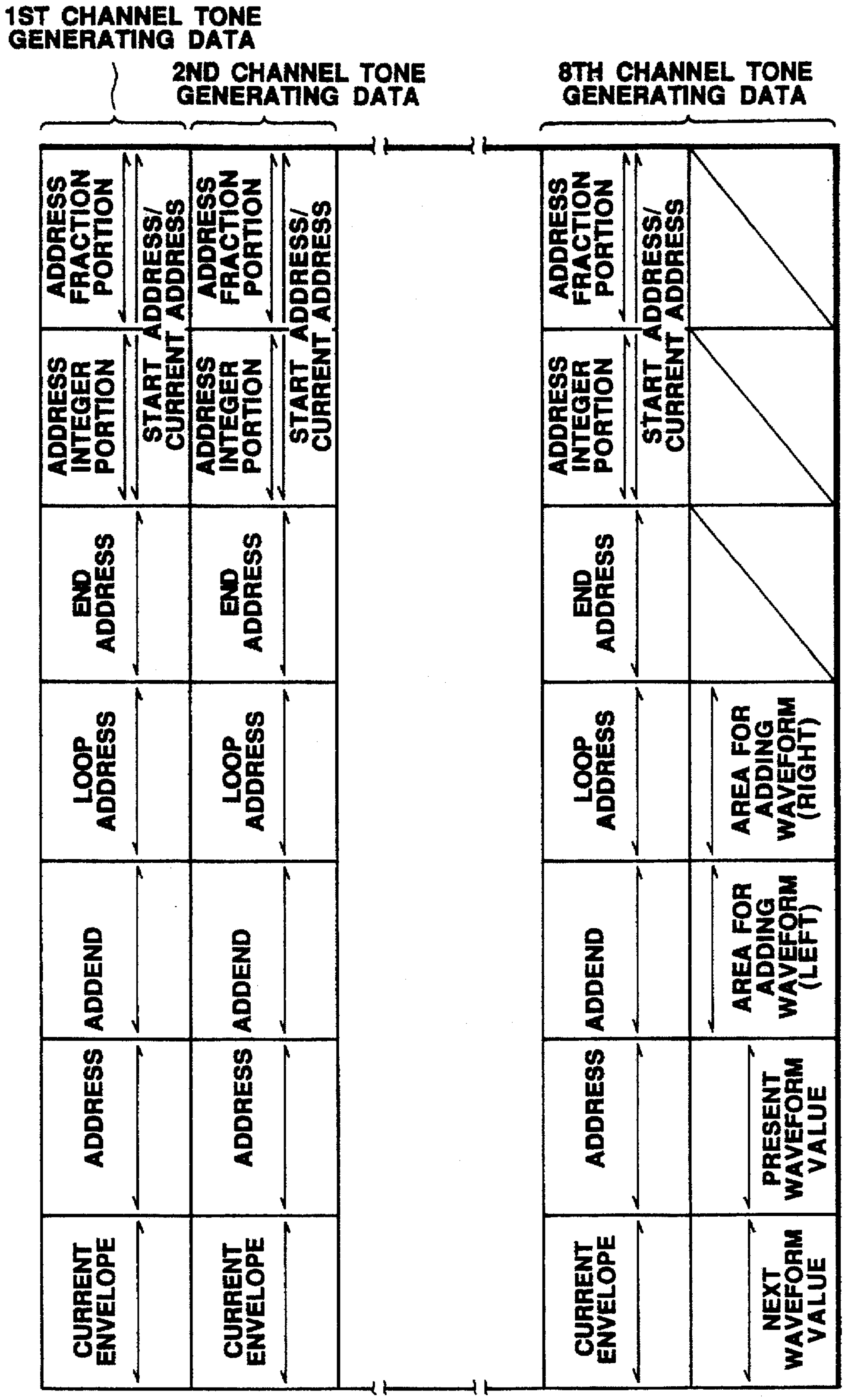
FIG. 43 is a diagram illustrating a RAM table of the SCPU for a tone generating process.

Particularly in this embodiment, various arithmetic operations for actually releasing musical tones are executed in step 4-9, based on data set in steps 4-5, 4-6 and 4-7, and the results of the operations are set from tone generation registers (shown in FIG. 40) in the RAM 106 to tone generation registers in the RAM 206 (shown in FIG. 43). More specifically, the MCPU 10 sets a value to be added to an address, a loop address, an end address and a start address, shown in FIG. 40, which are stored in a tone generation register in the RAM 106, into a tone generation register in the RAM 206 of the SCPU 20 shown in FIG. 43. The MCPU 10 can generate musical tone data for eight channels. These pieces of data are assigned to the corresponding channels in the individual registers of the MCPU 10 and the SCPU 20, based on data assigned in steps 4-5 to 4-7. The address addend, the loop address, the end address and the start address are address information with respect to a basic waveform to be stored in the external memory 90, and are the same as explained in the section of the first embodiment.

When an interrupt signal INT is generated by the interrupt generator 116, the MCPU 10 interrupts the main program in action, and executes the interrupt routine shown in FIG. 38. The MCPU 10 generates the data of a tone signal (specially, envelope data) in the flowchart in FIGS. 38 and 39, and the SCPU 20 generates a tone signal according to the flowchart in FIGS. 41 and 42, based on the data from the MCPU 10.

The flowchart in FIG. 38 will be discussed in detail below. The MCPU 10 is so designed as to output musical tone data for eight channels. In step 38-1, the MCPU 10 transfers data of current envelope value of each channel in the tone generating register (FIG. 40) of the RAM 106 to the register (FIG. 43) in the RAM 206 of the SCPU 20. At the timing of this data transfer, a write signal C in a pulse form is sent from the MCPU 10 to the SCPU 20. The MCPU 10, when terminating the data transfer, outputs an operation start signal A for activating the SCPU 20 (step 38-2). The MCPU 10 then performs tone generation of each of the first to the eighth channels, in steps 38-3 to 38-10, i.e., a process to prepare envelope data and store it in the tone generating register in the RAM 106. The MCPU 10 then returns to the main routine.

Figure 40:
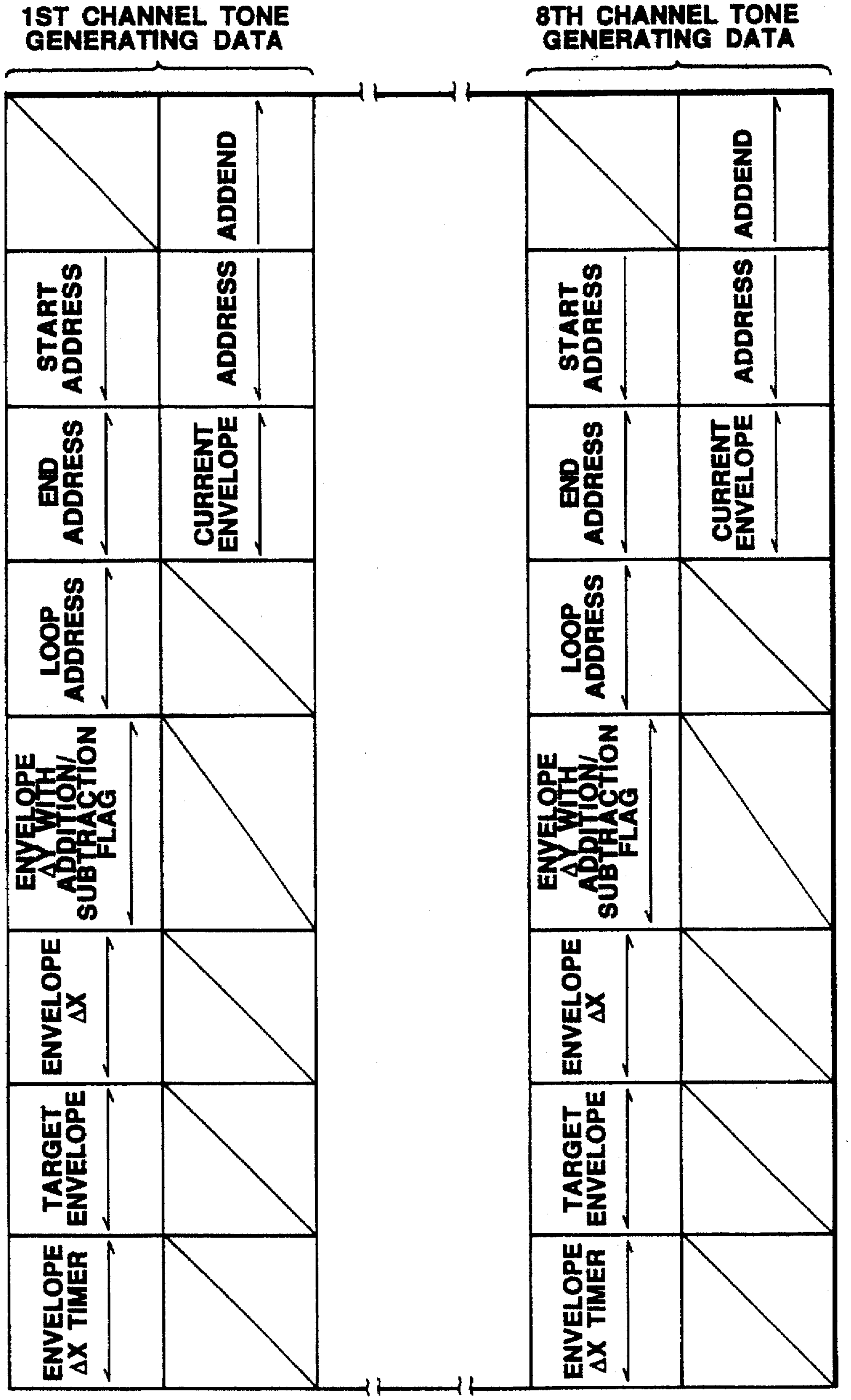
FIG. 40 is a diagram illustrating a RAM table of the MCPU for a tone generating process.

FIG. 39 presents a detailed flowchart of the channel storing process illustrated in steps 38-1 to 38-8 in FIG. 38. A waveform reading system for synthesizing musical tones is employed in this embodiment. (Other tone synthesizing systems, such as an FM synthesizing system, can also be used; the present invention is not limited to a particular tone synthesizing system.) Envelopes are prepared and stored in the tone generation registers in the RAM 106 in this process. To execute this process, registers in the RAM 106 of the MCPU 10 store an envelope Δ x timer, a target envelope, an envelope Δ x, an envelope having an addition/subtraction flag, a current envelope, as shown in FIG. 40, and calculates and updates a desired register. The envelope, which is to be added to a basic waveform for amplitude modulation, consists of several segments (steps). The envelope Δ x timer, the target envelope, the envelope Δ x and the envelope Δ y with an addition/subtraction flag are envelope parameters defining an envelope segment in progress. The envelope parameters are information which is updated each time the envelope value reaches the target value of the segment in the tone generating process 4-9 of the main program of the MCPU 10 (FIG. 4). These envelope parameters, except for the envelope Δ x timer, are simply referred to in the interrupt routine (FIG. 38). The envelope Δ x represents the operation cycle of an envelope; the target envelope is the target value of the envelope in a current segment; the envelope Δ y having an addition/subtraction flag expresses a change in an envelope for each operation cycle; and the current envelope is a current envelope value. The flowchart in FIG. 39 will be described in detail as follows. In step 39-1, the timer register to be compared with the operation cycle Δ x of the envelope is increased for each interrupt. When the timer register coincides with Δ x in step 39-2, it is determined in step 39-3 whether the envelope is rising or falling by checking the addition/subtraction flag (a sign bit) of the data Δ y which indicates a change in the envelope. The subtraction or addition of the current envelope is performed in step 39-4 or 39-5. It is determined in step 39-6 whether or not the value of the current envelope has reached the target envelope value. When it has reached that value, the current level is set to the target level in step 39-7 so that data in the next envelope step will be set in the tone generating process 4-9 of the main program. When no current envelope is read in step 4-9, it is considered the end of the tone generation and is processed accordingly. The current envelope value generated in step 39-8 is stored in the area of a corresponding channel in the tone generating register of the RAM 106.

FIG. 41 shows the flowchart of the interrupt routine of the SCPU 20. This routine starts in synchronism with generating a signal A which is output in the flowchart shown in FIG. 38.

The RAM areas (in the RAM 106 and 206) for adding a waveform are cleared in step 41-1, and tone generating processes for individual channels from the first to the eighth channels are sequentially executed in step 41-2 to 41-9. At the end of each channel tone generating process, the value of the musical tone waveform of the channel is added to data in the RAM area for adding a waveform. In the subsequent step 41-10, data in the RAM for adding waveform is sent to the DAC. In step 41-11 the operation controller 212 sends an end signal B to the SCPU reset controller 134 in the MCPU 10 to stop outputting a signal A, causing the SCPU to stop its operation.

FIG. 42 represents a detailed flowchart of the tone generating process for each channel in FIG. 41. A waveform process for each channel is performed, and an envelope function is added based on the envelope data generated in the interrupt routine (FIGS. 38 and 39) of the MCPU 10. In this waveform process, wave data at two adjoining addresses are read from the basic waveform memory using the integer portion of the current address, and a waveform value, which is estimated with respect to the current address indicated by (integer portion+fraction portion), is acquired by interpolation. The reason why the interpolation is necessary has already been described in the section of the first embodiment.

Among various interpolation methods, a linear interpolation method is employed in this embodiment. More specifically, the address addend is added to the current address in step 42-1 to acquire a new current address. The current address is compared to the end address in step 42-2. The next physical (real) or theoretical (operational) address is calculated in steps 42-3 and 42-4 if the current address>the end address, or in step 42-5 if the current address<the end address In step 42-7, the basic waveform memory is accessed at the integer portion of the acquired address to obtain the next waveform data. The loop address comes after the end address according to the operation. When the current address equals the end address, therefore, the waveform data for the loop address is read as the next address in step 42-6. The basic waveform memory is accessed at the integer portion of the current address in steps 42-8 and 42-9 to read updated waveform data. Then, the updated waveform value is subtracted from the next waveform value in step 42-10, the difference is multiplied by the fraction portion of the current address in step 42-11, and the resultant value is added to the updated waveform value in step 42-12, thereby acquiring a linearly-interpolated waveform value. This linearly-interpolated data is multiplied by the current envelope value, yielding the value of the musical tone data of a channel (step 42-13). This value is added to the content of the waveform adding register, accumulating musical tone data (step 42-14). Digital musical data accumulated in this register is sent to the DAC 100 in the timer interrupt routine 41-10 in FIG. 41. With regard to this processing, the DAC 100 in FIG. 35 comprises the right DAC 100R and the left DAC 100L to provide a stereophonic output. In this case, a decision has only to be made as to which one of the tone generating channels to be operated by the SCPU 20 should be assigned to the left or right DAC. More specifically, selected DAC direction data is stored as tone generation data for an individual channel in the internal RAM 206, and two areas for adding a waveform, i.e., a waveform-adding area for the right DAC and a waveform-adding area for the left DAC are provided in the RAMs. The waveform-adding areas for the left and right DACs are cleared in step 41-1. After the process in step 42-13 is performed, the DAC assigned to the channel to be processed is discriminated according to the selected-DAC indicating data, and the musical tone waveform data of that channel is added to the corresponding waveform-adding area. In step corresponding to step 41-10 of the interrupt routine of the SCPU 20 in FIG. 41, resultant tone waveform data for the left and right DACs are sent respectively to the left DAC 100L and the right DAC 100R.

The structure shown in FIG. 33 associated with the first embodiment may be employed in this embodiment.

Figure 44:
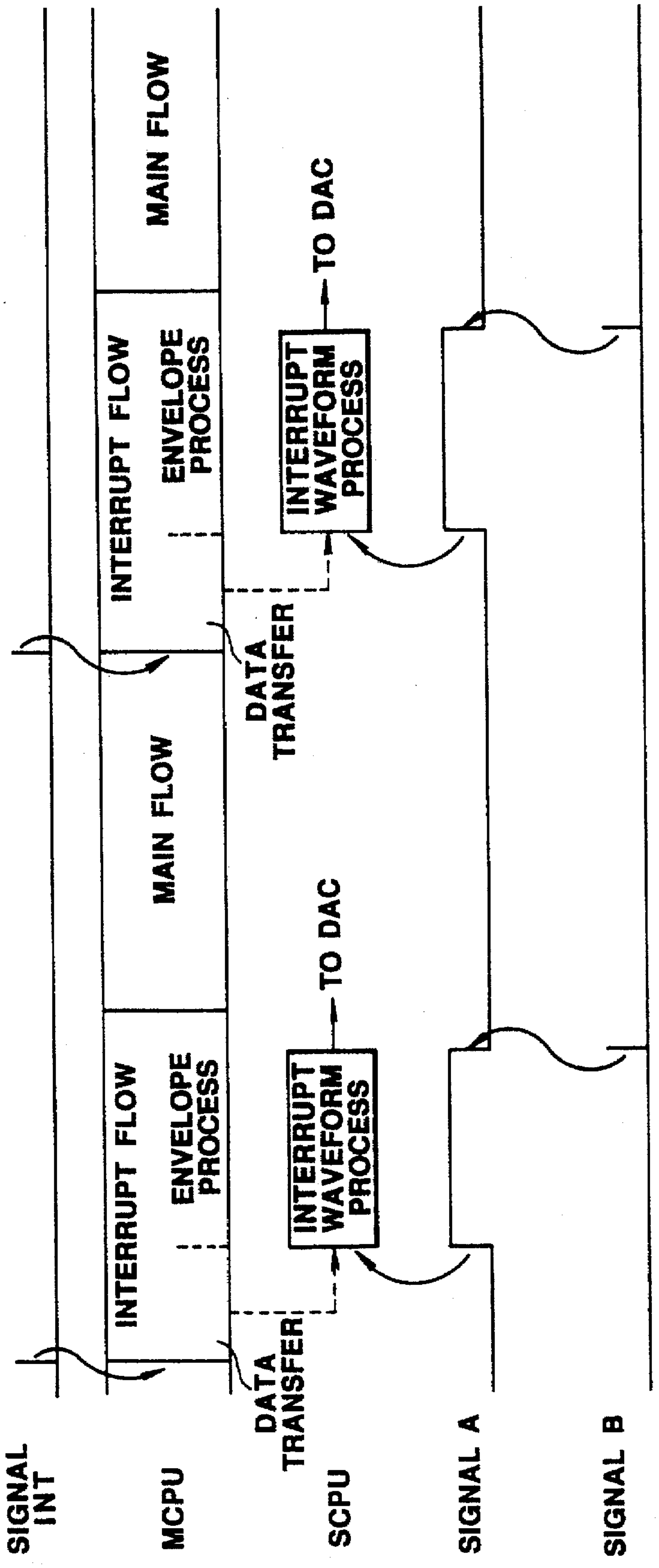
FIG. 44 is a time chart illustrating the time-sequential operation of this embodiment.

FIG. 44 illustrates the time chart indicating the time-sequential operational flow of this embodiment. When an interrupt signal INT is generated as apparent from the drawing, the MCPU 10 interrupts the execution of the main flow, and in turn executes the interrupt routine. In this case, first of all, data is transferred to the SCPU 20, and after such data transfer is completed, an operation start signal A is sent to the SCPU 20 to execute an envelope process. In reception of the signal A, the SCPU 20 executes pitch interpolation of waveform data and envelope multiplication. When the SCPU ends the process, it enters in the waiting status.

As described above, a digital information processing apparatus for an electric musical instrument of this embodiment has multiple CPUs, the MCPU 10 and the SCPU 20, which share and executes to generate a single musical tone according to an incorporated program. Although this embodiment uses only one SCPU, more than one SCPU can be used for tone generation.

<Modifications and Advantages>

The second embodiment, which has been described above, may be modified and altered in various manners within the scope of the present invention.

For example, although in the aforementioned embodiment, the MCPU 10 and the SCPU 20 take their share of a tone generating process for one musical tone, the MCPU 10 performing the envelope process, and the SCPU 20 the waveform process. It is however possible to alter the shared operation of the individual CPUs such that the MCPU 10 only performs the general system control while the SCPU 20 executes the entire tone generating processing.

FIGS. 45 to 48 are flowcharts and a time chart showing the operation of this modification. On feature of this example lies in that only the SCPU 20 copes with the tone generation, while the MCPU 10 executes processes for the general control, such as key scanning, generation of an accompaniment pattern and channel allocation. The MCPU 10 performs the general control in the main flow, and transfers data to the tone generating register (FIG. 49) in the RAM 206 of the SCPU 20 in the interrupt routine. The MCPU 10 will transfer data only as needed, such as when the data value is different from that of the data previously transferred.

Figure 45:
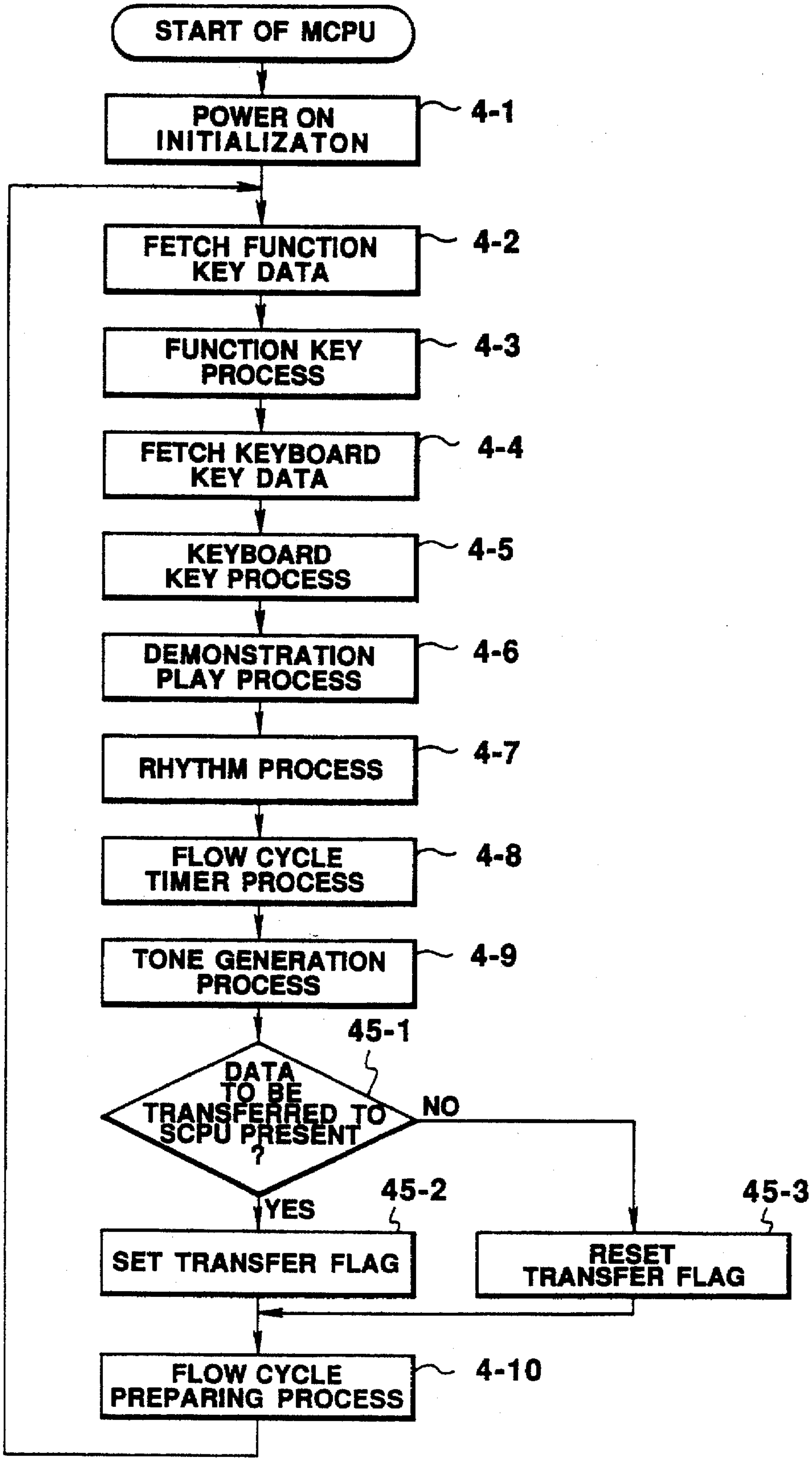
FIG. 45 is a flowchart representing the main routine of the MCPU in a modification of the present invention.

FIG. 45 shows the main flowchart of the MCPU 10. Like or same reference numerals as used to denote the steps of the flowchart in FIG. 4 specify corresponding or identical steps in FIG. 45 to avoid their otherwise redundant description.

After the necessary data is stored in the RAM 106 corresponding to each channel in the voicing process of step 4-9, it is determined in step 45-1 whether there is data to be transferred to the SCPU 20, such as data which has been changed as compared with the data previously transferred. When such data exists, a transfer flag is set in step 45-2. When there is no such data, the transfer flag is reset in step 45-3, and the flow moves to step 4-10. This operation continues until the generation of the interrupt signal INT in which case the flow will enter the MCPU interrupt routine.

Figure 46:
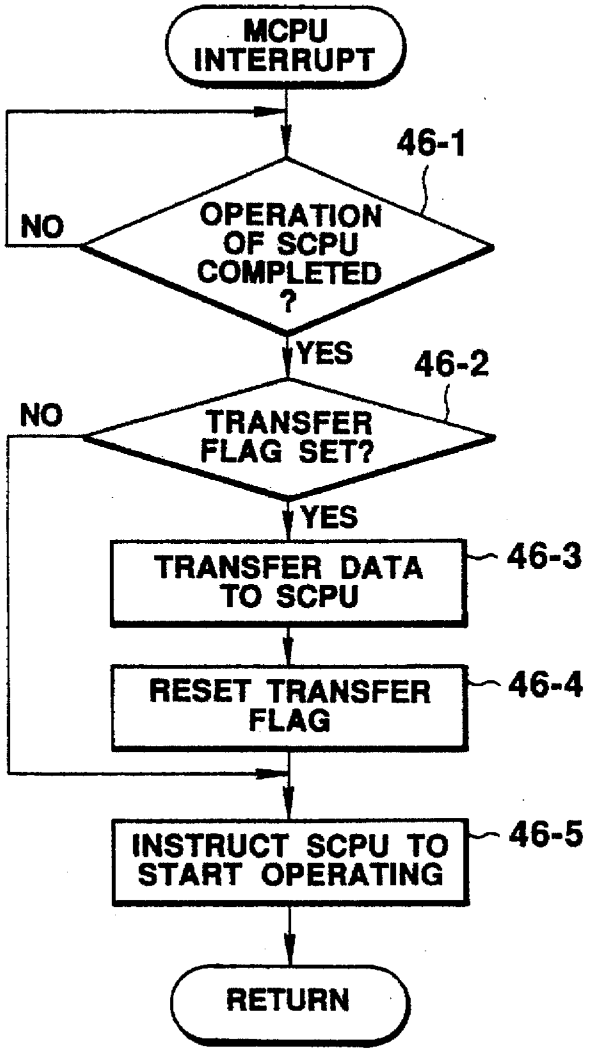
FIG. 46 is a flowchart representing the interrupt routine of the MCPU in the modification.

FIG. 46 is the flowchart of the MCPU interrupt routine.

It is determined in step 46-1 if the SCPU 20 is disabled. More specifically, it is determined whether the operation start signal A is output from the MCPU 10. When the signal A is generated, the flow waits for the next event in this step. When the signal A has not been generated yet, the flow advances to step 46-2 where it is determined whether the above-described transfer flag is set. When the flag is set, data necessary for tone generation, such as modulation data from a modulation wheel, is transferred to the SCPU 20 in step 46-3, and the transfer flag is reset in step 46-4. If it is judged in step 46-2 that the transfer flag has been reset, the processes in steps 46-3 and 46-4 will not be performed, and the operation start signal A is sent to the SCPU 20 in step 46-5. The flow then returns to the main routine.

Figure 47:
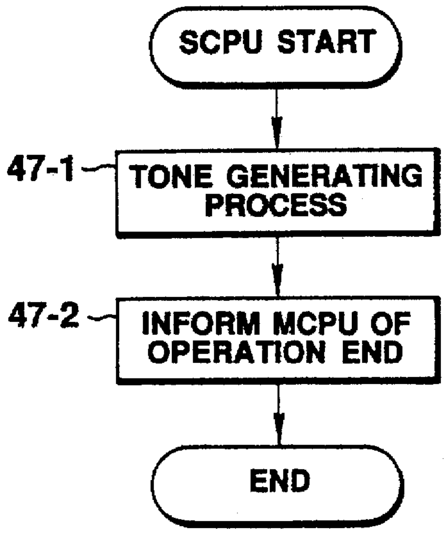
FIG. 47 is a flowchart showing the routine of the SCPU in the modification.

The SCPU 20 start operation upon reception of the operation start signal A from the MCPU 10. FIG. 47 represents the flowchart of the operation of the SCPU 20. Based on data transferred from the MCPU 10, the SCPU 20 generates musical tone signal data and sends it to the DAC 100 in step 47-1. In this step, the SCPU 20 executes the processing involving the flowcharts shown in FIGS. 39 and 42. The operation end signal B is supplied to the MCPU 10 in step 47-2. In reception of this signal, the MCPU 10 stops sending the signal A to the SCPU 20, thus disabling the SCPU 20.

Figure 48:
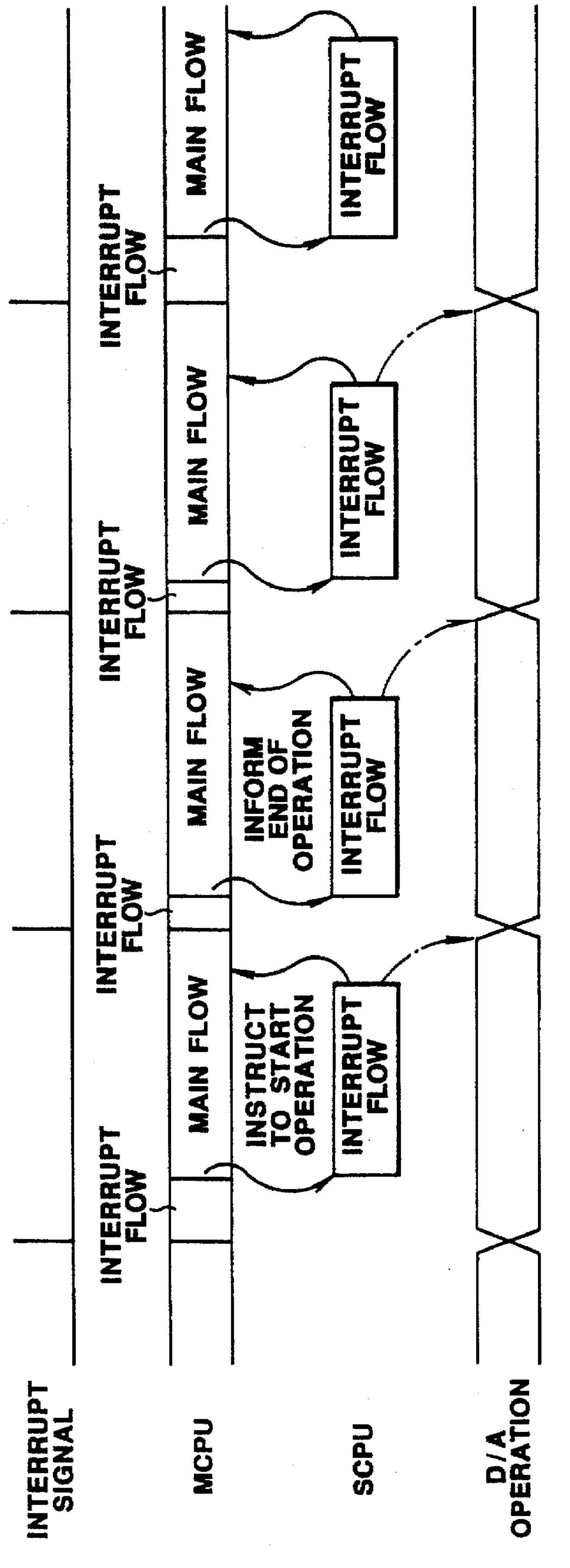
FIG. 48 is a time chart illustrating the time-sequential operation of the modification.
Figure 49:
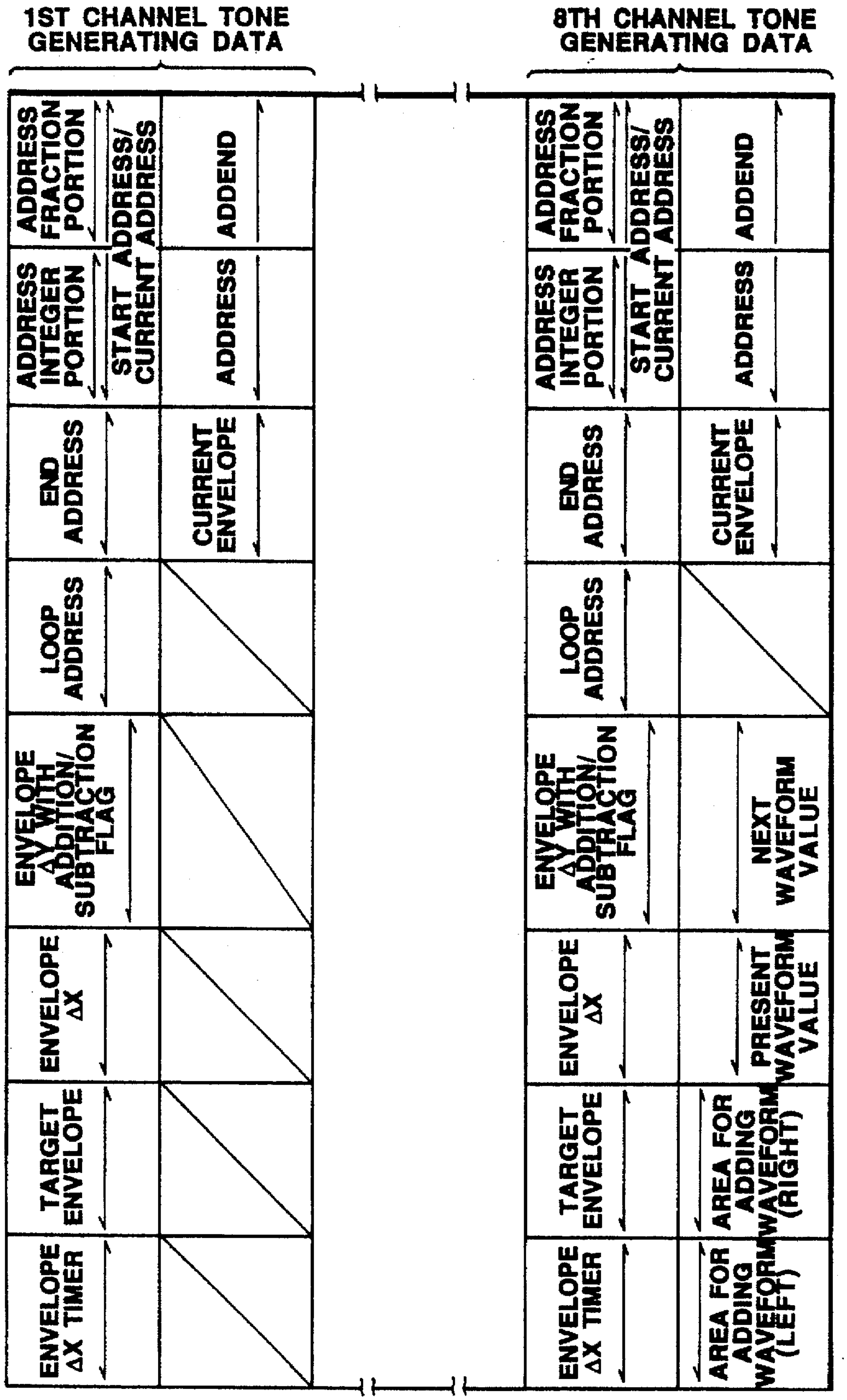
FIG. 49 is a diagram illustrating the RAM table of the SCPU for a tone generating process in the modification.

FIG. 48 shows a time chart illustrating the operational flow of this modified example. As apparent from this chart, the MCPU 10 executes the interrupt flow by the interrupt signal INT generated, and instructs the SCPU 20 to start operating as well as transfers data thereto while the flow is being executed. According to the operation start instruction, the SCPU 20 starts to operate, and generates musical tone data, sending the data to the DAC 100. The DAC 100 is so designed as to perform D/A conversion of the data from the SCPU 20 and output the analog data at the time the next interrupt signal is issued. Though data is all transferred from the MCPU to the SCPU in the interrupt routine in this modification, data can be transferred in the operational period of the main flow of the MCPU while the SCPU is disabled as per the second embodiment.

In this modification as described above, the MCPU 10 and SCPU 20 take their share of the processing in such a way that the MCPU 10 performs the general system control, while the SCPU 20 performs the tone generating process. Since the conventional hardware for tone generation is replaced with a single CPU, the characteristic of the tone generator can easily be altered, and this CPU can be applied as a tone generator in another musical instrument without changing its hardware structure. Though only one SCPU is used in this modification, multiple SCPUs may be provided for tone generation.

According to the embodiment, since multiple CPUs operate in accordance with the respective programs to take their share of the process for generating musical tone signals, it is possible to provide a digital information processing apparatus for an electronic musical instrument having high performance as a tone generator, without depending on the conventional specially-designed, hardware-based tone generating circuit. The functions of the processing apparatus can be added or altered basically by changing a program which is executed by each CPU, thus eliminating the need to significantly alter the hardware circuit.

The main CPU executes the first process which is the first portion of a tone generation process, and the sub CPU performs the second process or the remaining portion. In the case that an algorithm for synthesizing musical tones is complicated and requires many procedures, therefore, the burden on each CPU is reduced, ensuring generation of more musical tone signals.

Also, the main CPU performs the general control and executes part of the tone generating process while the sub CPU performs the remaining tone generating process. In the case where the tone generating process requires many procedures, therefore, the sub CPU is prevented from being overloaded, shortening the processing time and improving the tone generating performance as a consequence.

Further, if the tone generating process consists of an envelope process and a waveform process involving a process of adding an envelope (multiplication process), the main CPU executes the envelope process, and the sub CPU executes the waveform process including the multiplication process. Since the waveform process with the multiplication process which requires more processing time is performed by the exclusive sub CPU, both CPUs are prevented from being overloaded, shortening the time for generating musical tones as a consequence.

Since the sub CPU is also used exclusively for tone generation, in the case of changing the characteristic of the tone generator, it is possible to easily change the tone generating mode without altering the hardware structure. This embodiment can therefore be applied to various electronic musical instruments.

<THIRD EMBODIMENT>

The third embodiment will now be described, where the present invention is also applied to an electronic musical instrument.

The third embodiment (FIGS. 50 to 62) has the same features as the first embodiment. One different feature is to use a microcomputer (CPU) which is program-controlled to serves as a tone generator for generating musical tone signals, and another microcomputer (CPU) which is also program-controlled to server as an effect apparatus for adding an effect to a tone signal, thus eliminating the need to use the conventional specially-designed, hardware-based tone generator and hardware-based effect apparatus. A single CPU serves as a main CPU or a master CPU (10), and controls input devices (a keyboard, function keys, etc.) of an application (a musical instrument in this case), as well as copes with the tone generating process. The other CPU serves as a sub CPU or a slave CPU (20) to the master CPU, executing an effect process and an output process (D/A conversion) (FIGS. 57 to 60).

Figure 52:
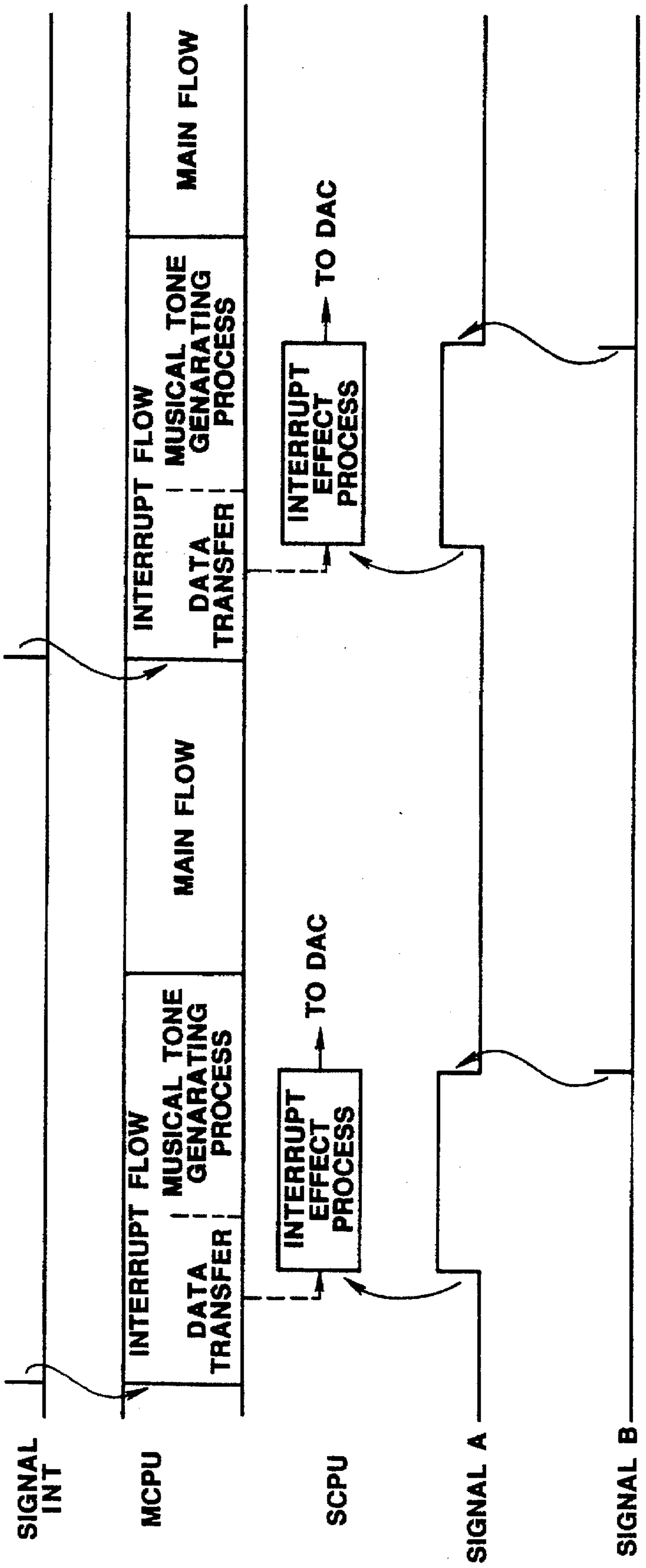
FIG. 52 is a time chart showing the operation of this embodiment.

Another different feature concerns a mechanism by which that the sub CPU starts and ends its operation. According to this embodiment, the sub CPU starts operating when the sub CPU receives tone generating data from the master CPU in response to a timer interrupt which requests the master CPU to generate musical tones. As a result, the master CPU and the sub CPU respectively execute the tone generating process and the effect process in parallel. When the sub CPU terminates the effect process, the sub CPU is rendered in the reset status (disabled status) according to an end signal originating from the termination of the effect process, and sends that signal to the master CPU (FIG. 52). Because of this feature, the master CPU can effectively control and grasp the operational period and timing of the sub CPU. Further, this feature ensures effectively execution of a task for the tone generating process and effect process which require high-speed processing (a task to generate the digital sample of a musical tone signal, and further to add a digital effect thereto).

<General Structure (FIG. 1)>

FIG. 1 is a block diagram illustrating the general structure of this embodiment as a digital information processing apparatus of an electronic musical instrument. Like or same reference numerals as used to denote the elements in the first and second embodiments specify corresponding or identical elements in this embodiment to avoid their otherwise redundant description. This system comprises two central processing units on a single chip (one of the CPUs is referred to as "MCPU 10" and the other as "SCPU 20"). The CPUs 10 and 20 incorporate programs, and operate according to their own programs. The MCPU 10 generates musical tones (FIGS. 9 and 51), performs the general control of the system; for example, processes input information from input units (a keyboard, function keys, etc.) to be connected to an input port 118 and an output port 120, and controls an effect process to be done by the SCPU 20 (FIG. 4). The SCPU 20 is employed only for performing the effect process and controlling the DAC 100 which converts a digital musical tone signal to an analog musical tone signal (FIGS. 57 to 60).

Figure 50:
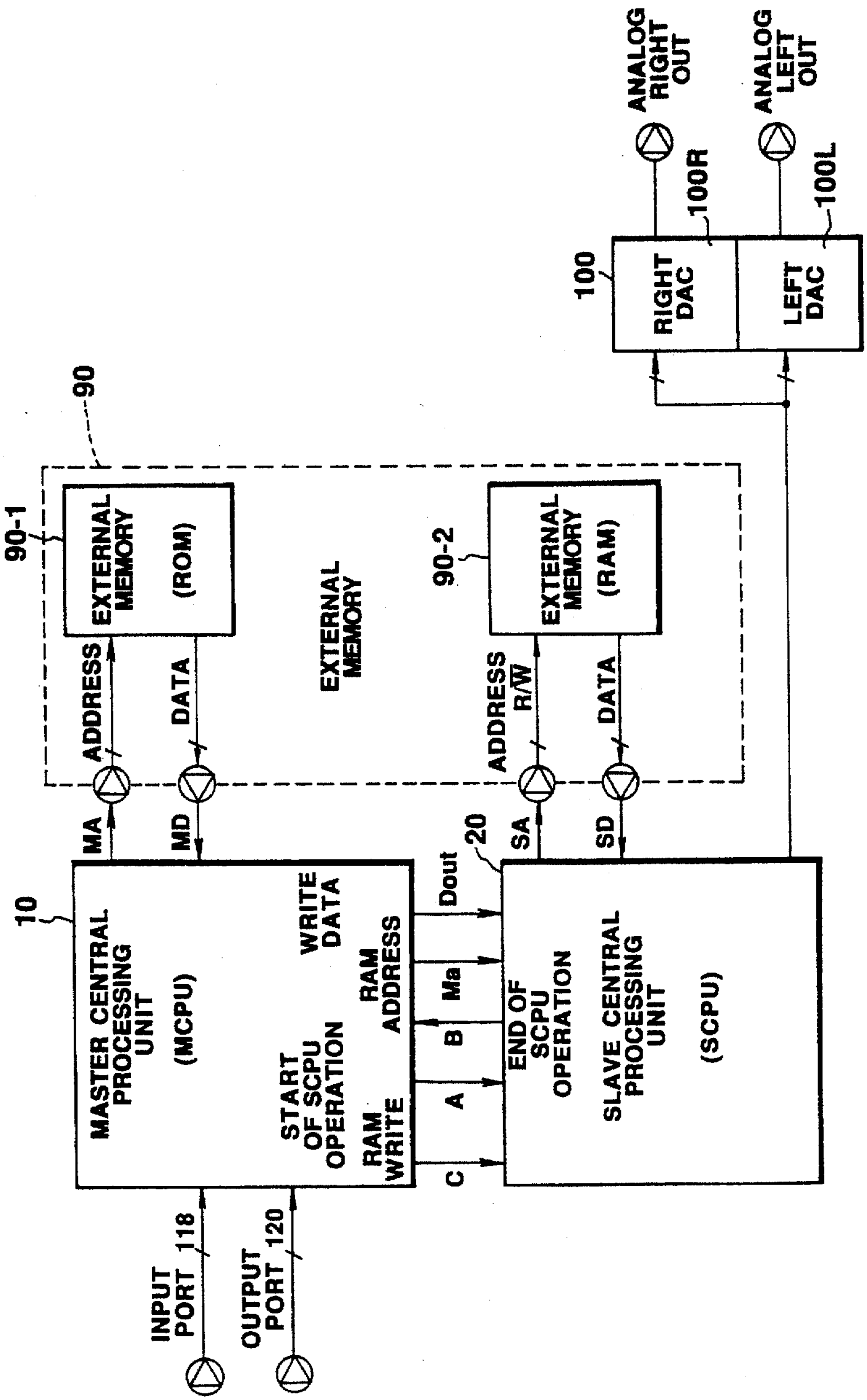
FIG. 50 is a diagram illustrating the general structure of a digital information processing apparatus for an electronic musical instrument according to the third embodiment of the present invention.

Reference numeral "90" denotes a memory as a source of data such as tone generating control data and waveform data and also a memory for storing wave data of the effect process. The data memory 90 includes a ROM 90-1 and a RAM 90-2 located outside to an LSI chip on which the remaining devices shown in FIG. 50 are mounted. The ROM 90-1 charges the former function, and the RAM 90-2 has the latter function. With higher integration, it is possible to mount the data memory 90 as an internal memory on a single LSI chip. The ROM 90-1 of the external data memory 90 is used by the MCPU 10 and the RAM 90-2 is used by the SCPU 20. The MCPU 10 supplies address information to the address input terminal of the ROM 90-1 of the external data memory 90 via an address bus MA connected to the MCPU 10. The SCPU 20 supplies address information to the address input terminal of the RAM 90-2 of the external data memory 90 via an address bus SA connected to the SCPU 20. A data transfer path from the ROM 90-1 of the external data memory 90 to the MCPU 10 is formed by the data output from the ROM 90-1 and a data bus MD connected to the MCPU 10. A data transfer path from the RAM 90-2 of the external data memory 90 to the SCPU 20 is along a data output from the RAM 90-2 and a data bus SD connected to the SCPU 20.

As described above, an effect-added digital tone signal is generated by the SCPU 20 in the effect process. The generated signal is sent from the SCPU 20 to a digital/analog converter (DAC) 100 comprising a right DAC 100R and a left DAC 100L, where it is converted into an analog musical tone signal, and is output outside.

21 Structures of MCPU and SCPU (FIGS. 36 and 37)>

The MCPU 10 and the SCPU 20 are structured as described referring to FIG. 36 and 37, in association with the second embodiment, so that the detailed explanation will be omitted. Only a program for the effect process is usually stored in the ROM 202 in the SCPU 20, which functions as a processor only for an effect process.

<Description of Operation of CPU>

Figure 51:
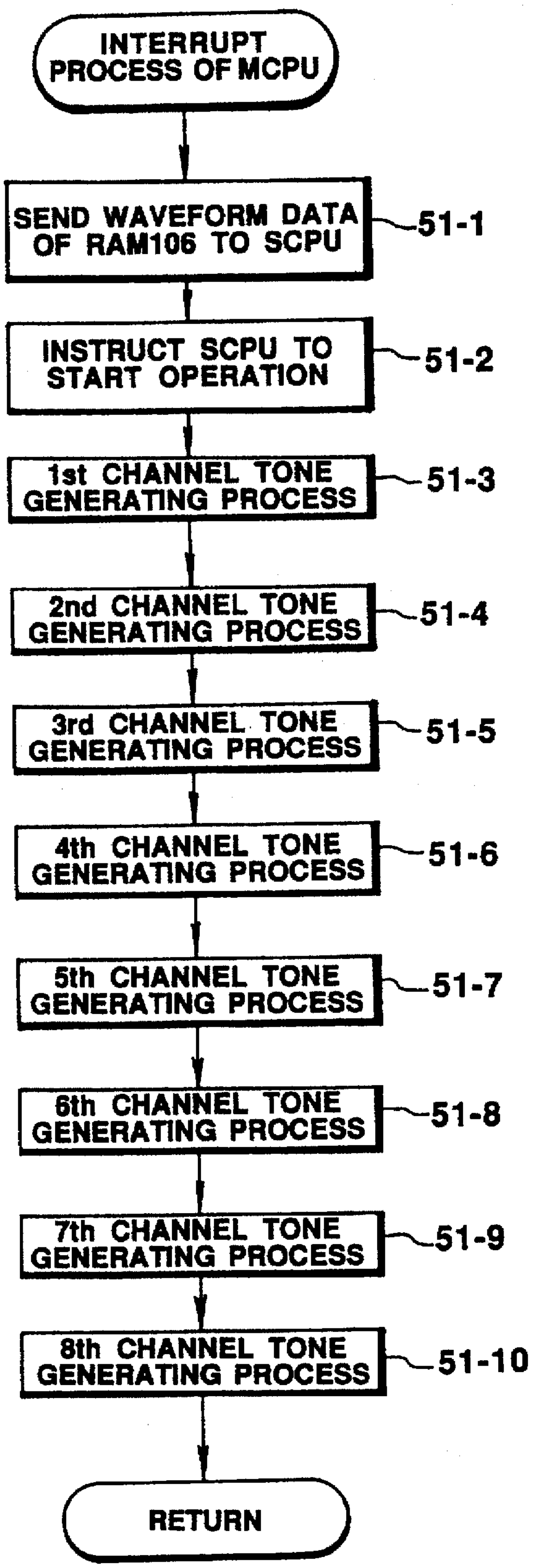
FIG. 51 is a flowchart showing an interrupt routine the MCPU executes.

The main program of the MCPU 10 according to this embodiment is the same as the one described referring to FIG. 4 in association with the first embodiment, so that the explanation will be omitted. FIG. 51 illustrates the interrupt routine of the MCPU 10, and channel tone generating processes, 51-3 to 51-10, are identical to those described referring to FIG. 9 associated with the first embodiment. FIGS. 57 to 60 are flowcharts showing the operation of the SCPU 20 to be controlled by the program of the SCPU 10 run by an operation start signal A from the MCPU 10.

The electronic musical instrument system according to this embodiment comprises CPUs, i.e., the MCPU 10 and the SCPU 20. These CPUs cooperate to execute processes for the electronic musical instrument. The MCPU 10 performs the interrupt routine shown in FIG. 9 and 51 for a tone generation process, while the SCPU 20 performs the program illustrated in FIGS. 57 to 60 to execute the effect process. Further, the MCPU 10 executes various tasks for controlling the entire system according to the main program shown in FIG. 4.

In step 4-1 of the main program shown in FIG. 4, in step 4-3, the MCPU 10 discriminates a function key whose status has changed, from the new status acquired in step 4-2 and the previous status, and executes the indicated task (such as setting musical tone numbers, envelope numbers, rhythm numbers and the status of effect to be added). Particularly, according to a designated effect input, the MCPU 10 sets various parameters with respect to a table for the effect process, which is stored in the SCPU 20 (in the RAM 206, as shown in FIG. 62). This operation can be included in the control program of the SCPU 20, so that the SCPU 20 may execute such a setting process in response to an instruction from the MCPU 10.

When an interrupt signal INT is generated by the interrupt generator 116, the MCPU 10 interrupts the main program in action, and executes the interrupt routine shown in FIG. 51. The MCPU 10 generates the data of a tone signal through the processing given in the flowchart in FIGS. 9 and 51, and the SCPU 20 adds an effect to the data from the MCPU 10 according to the flowchart in FIGS. 57 to 60.

In a flowchart in FIG. 51, same as FIGS. 7 and 38 described above, the MCPU 10 is designed to be able to output musical tone data for eight channels. The MCPU 10 transfers the total value (stereo output) of the musical tone waveforms of channels, which are acquired by the previous interrupt in waveform-adding areas (left and right) in a tone generating register (same as those in FIGS. 11 and 49) of the RAM 106, to the register (WAVER and WAVEL in FIG. 62) of the RAM 206 in the SCPU 20. After this transfer, both waveform-adding areas (left and right) are cleared. At the timing of this data transfer, an address signal and a write signal C in a pulse form are sent from the MCPU 10 to the SCPU 20. When the data transfer is terminated the MCPU 10 outputs an operation start signal A for starting the operation of the SCPU 20 as shown in FIG. 52 (see step 51-2). The MCPU 10 then performs tone generation of each of the first to the eighth channels, in steps 51-3 to 51-10. Then, the flow returns to the main routine.

As a result, musical tone waveform data (or synthesized value) in left and right waveform-adding areas in the internal RAM 106 of the MCPU 10 are basically left and right stereo outputs.

The operation of the SCPU 20 will now be described. As shown in FIG. 52, the SCPU 20 starts operating in response to an instruction given in step 51-2 of the interrupt routine of the MCPU 10. while new musical tone data (stereo output) is sent piece by piece from the MCPU 10 to the SCPU 20 in step 51-1, the SCPU performs a digital effect process.

Figure 53:
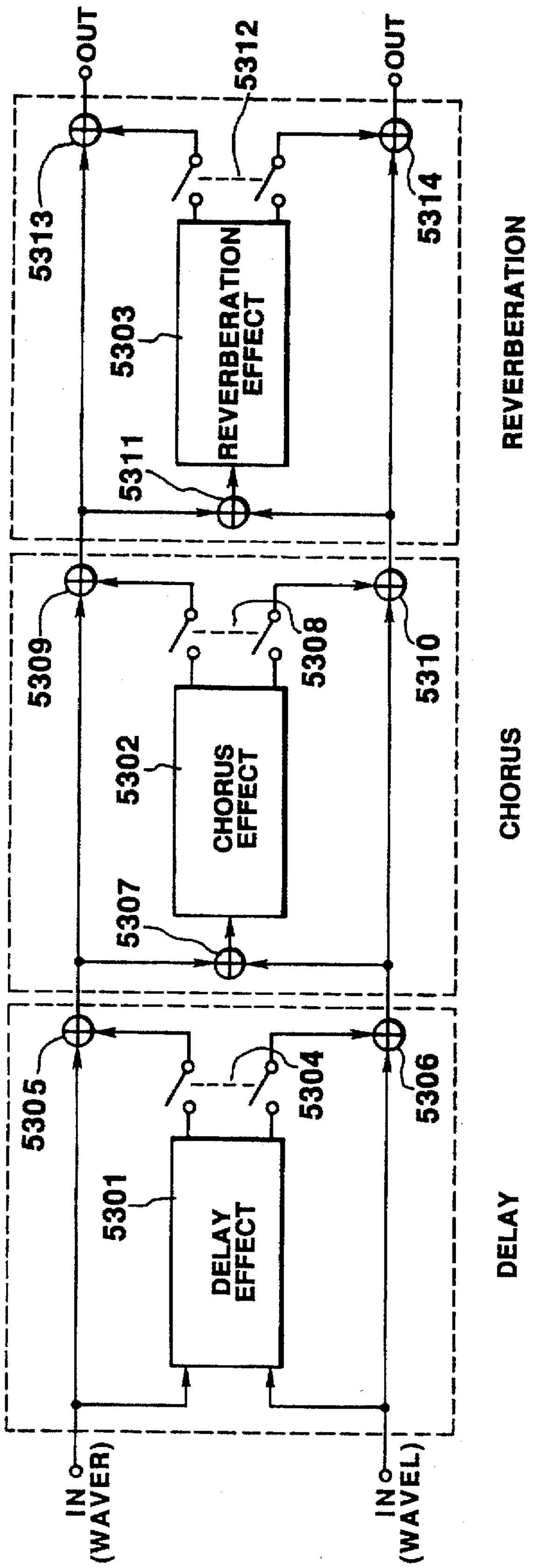
FIG. 53 is a general functional block diagram illustrating an effect process to be executed by the SCPU in FIG. 50.

Before specifically discussing the program of the effect process, the contents of the effect process according to this embodiment will be roughly explained. FIG. 53 illustrates the function block of the effect process. The SCPU 20 executes the process of a function block for every sampling. More specifically, this block includes a delay effect adding circuit 5301, a chorus effect adding circuit 5301 and a reverberation effect adding circuit 5303. Delay, chorus and reverberation effect adding process are performed in a time-shared manner in stereo by the SCPU 20 every sampling time. Right and left stereo input signals (WAVER and WAVEL) from the MCPU 10 are sent to the right and left input terminals of the delay effect adding circuit 5301 to be described later, and are added with a delay effect before they are output from the right and left terminals, respectively. These right and left outputs from the delay effect adding circuit 5301 are sent respectively to adders 5305 and 5306 through a delay effect selecting switch 5304 which has switching elements switchable at the same time. The adders 5305 and 5306 add the right and left outputs from the delay effect adding circuit 5301 to the respective right and left input signals. Then, the outputs from the adders 5305 and 5306 are added together in an adder 5307. The added output is input to the input terminal of a one-input chorus effect adding circuit 5302 (to be described later), and is added with a chorus effect before being output from the right and left terminals. These right and left outputs from the chorus effect adding circuit 5302 are sent respectively to adders 5309 and 5310 through a chorus effect selecting switch 5308 which has switching elements switchable at the same time. The adders 5309 and 5310 add the right and left outputs from the chorus effect adding circuit 5302 to the outputs of the adders 5305 and 5306, respectively. Then, the outputs from the adders 5309 and 5310 are added together in an adder 5311. This added output is input to the input terminal of a one-input reverberation effect adding circuit 5303 (to be described later), and is added with a reverberation effect before being output from the right and left terminals. These right and left outputs from the reverberation effect adding circuit 5303 are sent respectively to adders 5313 and 5314 through a reverberation effect selecting switch 5312 which has switching elements switchable at the same time. The adders 5313 and 5314 add the right and left outputs from the reverberation effect adding circuit 5303 to the outputs of the adders 5309 and 5310, and the added results are output through the right and left output terminals, respectively. In other words, the input side of the delay effect adding circuit 5301, the output sides of the adders 5305 and 5306, the output sides of the adders 5309 and 5310, and the output sides of the adders 5313 and 5314 have two inputs or outputs, respectively, so that the effect adding circuits can be rearranged on a block-by-block base (blocks illustrated by the broken lines in FIG. 53). This means that the order of the effect adding processes can be altered in the operation of the SCPU 20.

Figure 54:
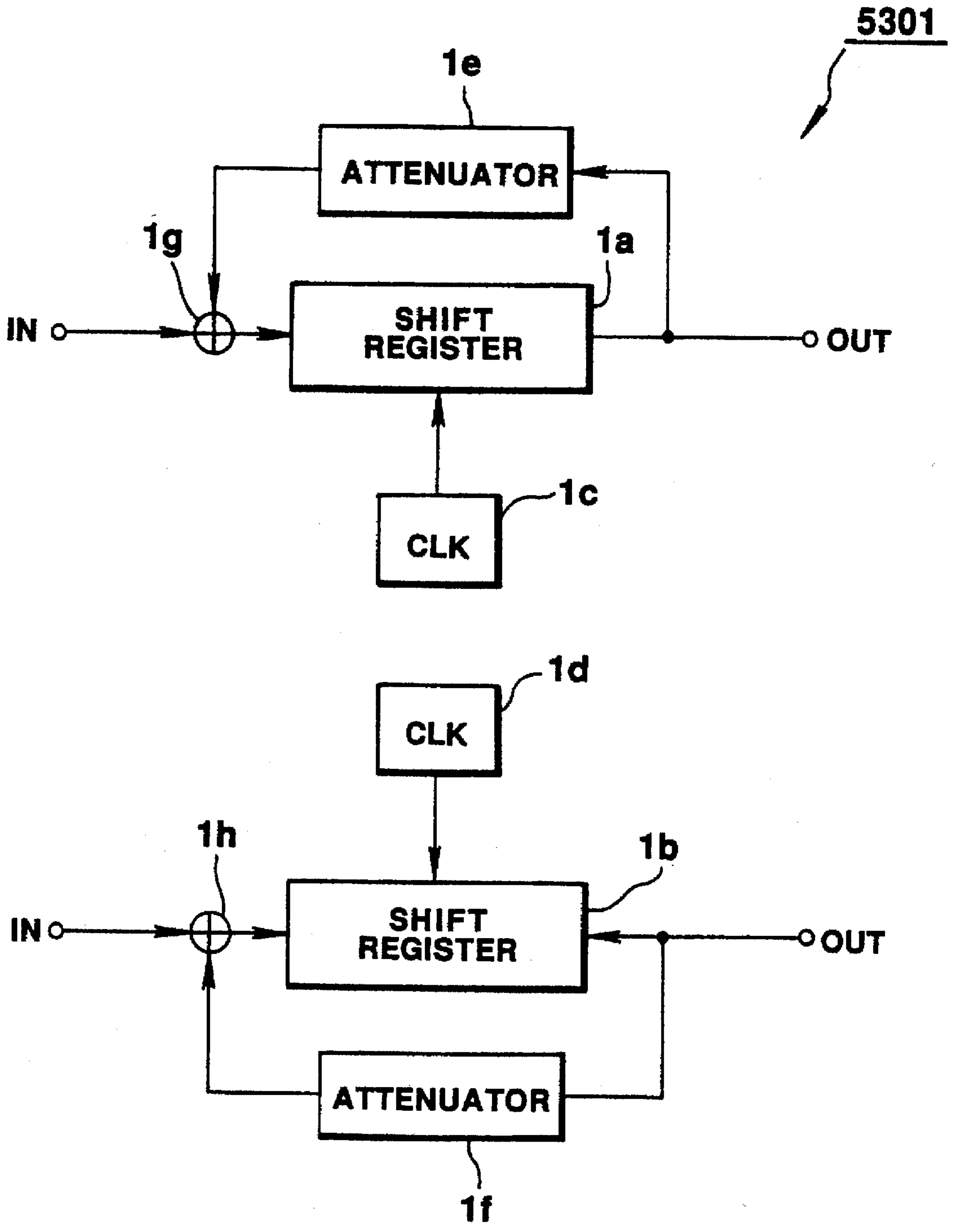
FIG. 54 is a detailed functional block diagram of a delay effect adding process shown in FIG. 53.

FIG. 54 is a function block exemplifying the delay effect adding circuit 5301 in FIG. 53. Two delay effect adding circuits 5301 are separately provided for adding right and left delay effects. The circuits 5301 respectively comprise shift registers 1*a* and 1*b* each constituting a delay circuit, clock generators (CLKs) 1*c* and 1*d* for shifting the shift registers 1*a* and 1*b*, attenuators 1*e* and if for attenuating the outputs of the shift registers 1*a* and 1*b* and feeding the attenuated outputs back to the input sides, and adders 1*g* and 1*h* provided on the input sides of the respective shift registers 1*a* and 1*b* for adding input signals to the outputs from the attenuators 1*e* and 1*f*. Further, the circuits 5301 have output terminals for delay effect on the output sides of the shift registers 1*a* and 1*b*, respectively. The input signals are delayed by the shift registers 1*a* and 1*b* which have a feedback loop to be added with a predetermined delay effect, and are output in stereo. The shift time of the shift registers 1*a* and 1*b* means the delay time of a delay effect, while the amount of attenuation in the attenuators 1*e* and if means the feedback amount of the delay effect.

Figure 55:
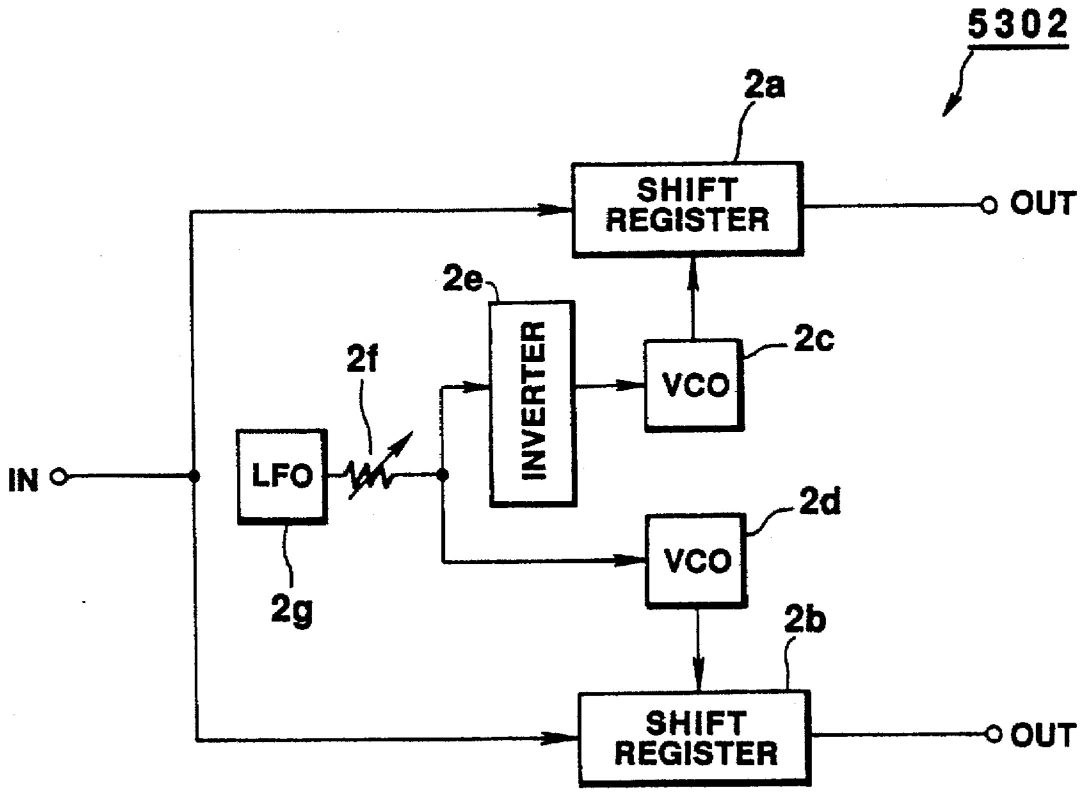
FIG. 55 is a detailed functional block diagram illustrating a chorus effect adding process in FIG. 53.

FIG. 55 is a function block exemplifying the chorus effect adding circuit 5302 in FIG. 53. The chorus effect adding circuit 5302 comprises shift registers 2*a* and 2*b*, having one common input terminal and constituting two delay circuits for right and left outputs, voltage control oscillators (VCO) 2*c* and 2*d* for respectively supplying modulation frequencies to the shift registers 2*a* and 2*b*, and a low frequency oscillator (LFO) 2*g* for supplying a low frequency output via a phase inverter 2*e* to the voltage control oscillator 2*c* and directly to the other voltage control oscillator 2*d* both through a volume 2*f* for determining a modulation degree. There are output terminals for chorus effect on the output sides of the individual shift registers 2*a* and 2*b*. The low frequency output generated from the low frequency oscillator (LFO) 2*g* is sent through the inverter 2*e* to the voltage control oscillator 2*c* and then to the shift register 2*a*, while the low frequency output is sent directly to the oscillator 2*d* and then to the shift register 2*b*, thereby changing the oscillation frequencies of the voltage control oscillators 2*c* and 2*d*. The oscillation frequencies are added with the frequency modulation effect to be stereo outputs. The SCPU 20 acquires low frequency outputs and signal outputs for reading a waveform under the digital operation control, not under the voltage control.

Figure 56:
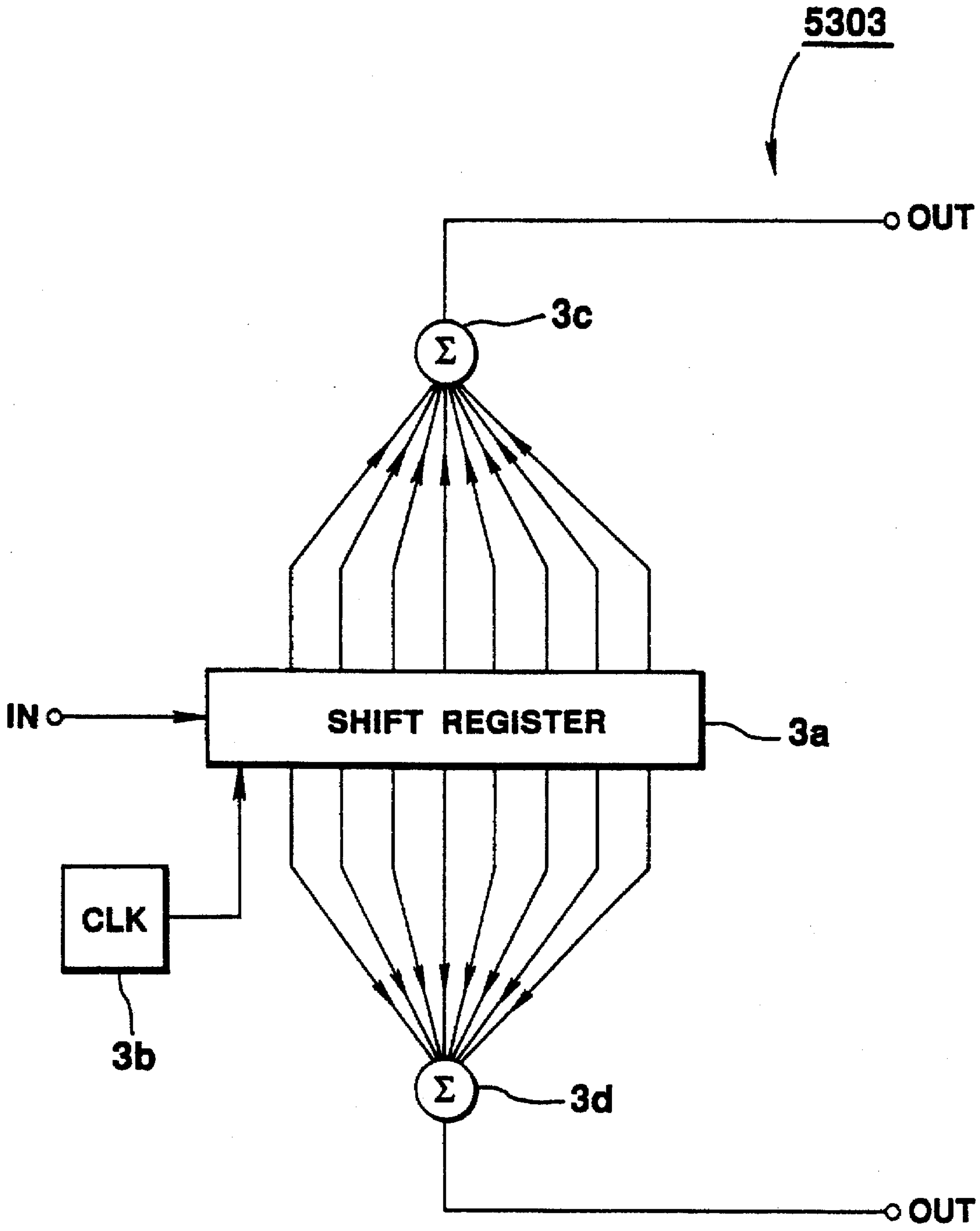
FIG. 56 is a detailed functional block diagram illustrating a reverberation effect adding process in FIG. 53.

FIG. 56 is a function block exemplifying the reverberation effect adding circuit 5303 in FIG. 53. The reverberation effect adding circuit 5303 comprises a shift register 3*a*, a clock generator (CLK) 3*b* for shifting the shift register 3*a*, and adders 3*c* and 3*d* for adding outputs from multiple intermediate taps as right and left outputs and outputting them. Output terminals for reverberation effect are provided on the output sides of the respective adders 3*c* and 3*d*. An input signal is added to various delayed outputs from the intermediate taps of the shift register 3*a* to be added with a predetermined reverberation effect by the adders 3*c* and 3*d*, and the resultant signals are output in stereo.

The operation of the effect adding device having the above-described function blocks will now be explained.

Suppose, as an example of the operation, that the reverberation effect selecting switch 5312 is set OFF, the other delay effect selecting switch 5304 and chorus effect selecting switch 5308 are set ON. Signals (WAVER, WAVEL) input to the two input terminals are added with a delay effect in the delay effect adding circuit 5301 and the resultant signals are output in stereo therefrom. The outputs with the delay effect are respectively added to the input signals by the adders 5305 and 5306. The outputs of the adders 5305 and 5306 are the input signals added with the delay effect.

The outputs from the adders 5305 and 5306 are added together by the adder 5307, and the resultant signal is sent to the chorus effect adding circuit 5302 where it is added with a chorus effect to become stereo outputs. The outputs with the chorus effect are respectively added to the outputs of the adders 5305 and 5306 by the adders 5309 and 5310. The outputs from the adders 5309 and 5310 are those resulting from the addition of the delay effect and the chorus effect to the signals input to the input terminals. Further, the outputs from the adders 5309 and 5310 are added together by the adder 5311. Since the reverberation effect selecting switch 5312 is rendered OFF, however, the adders 5313 and 5314 output only the outputs of the adders 5309 and 5310, respectively. Therefore, the delay effect and the chorus effect, for which the respective selecting switches are ON, are added to the input signals by the adders 5313 and 5314, and become stereo outputs.

The effect adding device will function in the same manner with another selecting switch set ON. In other words, as long as one of the effect selecting switches is set ON, stereo outputs with the selected effect added thereto will be acquired at the final output terminals.

Figure 57:
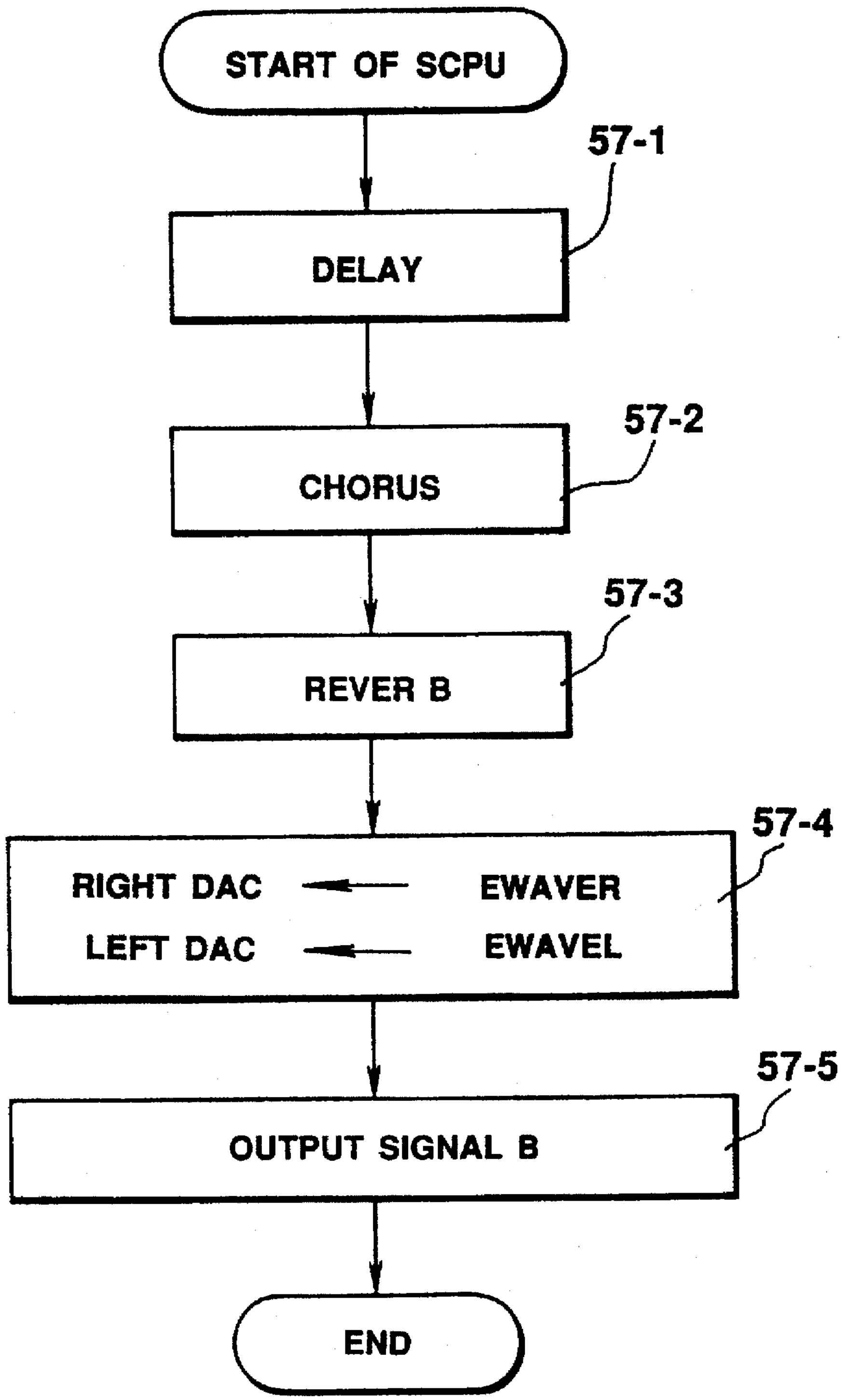
FIG. 57 is a flowchart showing a program the SCPU executes.

The operation of the SCPU 20 to realize the above-described function blocks through software-based processing will now be described referring to FIGS. 57 and 60. FIG. 62 shows a table for an effect process, which is formed in the RAM 206 of the SCPU 20. Data and parameters to be stored in the individual registers of the table mean as follows:

LFO: area for an LFO (low frequency oscillator), where parameters for oscillation of the LFO are recorded, such as time information, angle information and information of a change in angle LFOH: upper-bit side of LFO output LFOL: lower-bit side of LFO output DPOINTR: input pointer of the right channel delay memory DPOINTL: input pointer of the left channel delay memory DERIAAR: size of the right channel delay memory DERIAAL: size of the left channel delay memory DERIAOR: head address of the right channel delay memory DERIAOL: head address of the left channel delay memory CPOINT: input pointer of the chorus memory CERIAA: size of the chorus memory CERIAO: head address of the chorus memory RPOINT: input pointer of the reverberation memory RERIAA: size of the reverberation memory
RERIAO: head address of the reverberation memory
DRDATAR: feedback waveform data of the right channel delay
DRDATAL: feedback waveform data of the left channel delay
WAVER: waveform data of right channel
WAVEL: waveform data of left channel
EWAVER: waveform data of an effect sound for right channel
EWAVEL: waveform data of an effect sound for left channel
DTIMER: delay time for right channel (corresponding to the delay time of the shift register 1*a*)
DTIMEL: delay time for left channel (corresponding to the delay time of the shift register 1*b*)
DRPEATR: amount of delay feedback for right channel (corresponding to the attenuator 1*e*)
DRPEATL: amount of delay feedback for left channel (corresponding to the attenuator 1*f*)
DDEPTHR: depth of a delay effect for right channel
DDEPTHL: depth of a delay effect for left channel
CDEPTH: depth of a chorus effect
CDTIME: delay time of a chorus (corresponding to the delay time of the shift registers 2*a* and 2*b*)
RTIR: individual delay time of reverberation for right channel (corresponding to the intermediate tap on the right side of the shift register 3*a*)
DTmR: individual delay time of reverberation for right channel
RTIL: individual delay time of reverberation for left channel (corresponding to the intermediate tap on the left side of the shift register 3*a*)
DTmL: individual delay time of reverberation for left channel
RDEPTH: depth of a reverberation effect FIG. 57 is a flowchart of the interrupt process to be executed by the SCPU 20 in response to the operation start signal from the MCPU 10. Before the process is performed along this flowchart, the above-described data and parameters are transferred from the MCPU 10 to the RAM 206 of the SCPU 20 to be set therein (see FIGS. 52 and 62). Specially, stereo tone signals are sent from the right and left waveform-adding areas in the RAM 106 of the MCPU 10 to the registers WAVER and WAVEL of the SCPU 20, respectively (step 51-1 in FIG. 51)

In steps 57-1 to 57-3, the SCPU 20 sequentially executes a delay-effect adding process (DELAY), a chorus-effect adding process (CHORUS) and a reverberation-effect adding process (REVERB), all to be described later. To add only one of the effects selected in advance, the SCPU 20 executes the selected process in the associated one of steps 57-1 to 57-3, and passes through the other two steps. This function is equivalent to the functions of the switches 5304, 5308 and 5312 shown in FIG. 53. In step 57-4, EWAVER and EWAVEL are respectively transferred to the right DAC 100R and the left DAC 100L. This means that the delay, chorus or reverberation effect is added in the delay-effect adding circuit 5301, the chorus-effect adding circuit 5301, or the reverberation-effect adding circuit 5301 in FIG. 53, providing stereo outputs at the output terminals. When the SCPU 20 has completed the series of the processes, the SCPU 20 sends the signal B to the MCPU 10, informing that the effect processing is terminated (see FIG. 52).

Figure 58:
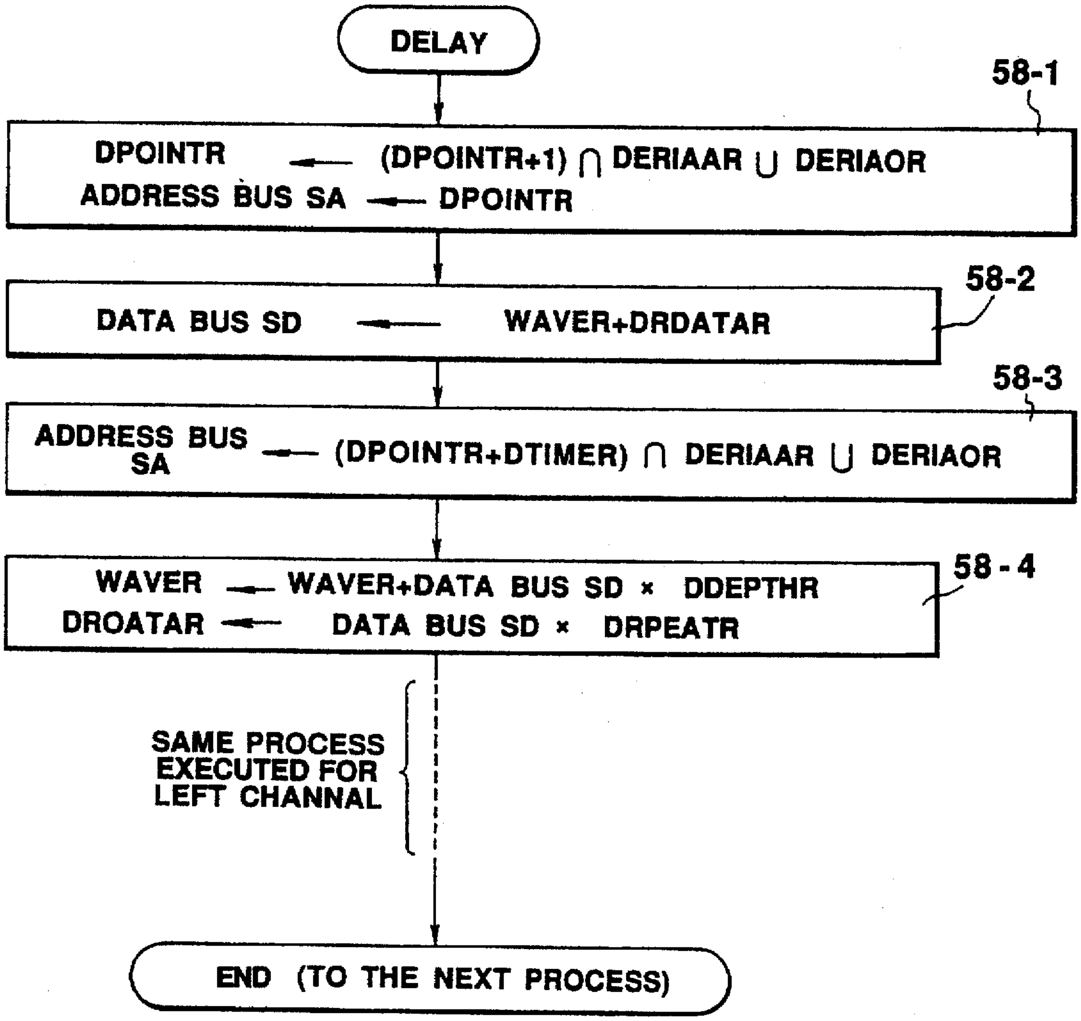
FIG. 58 is a detailed flowchart representing the process for adding a delay effect (DELAY) in FIG. 57.

FIG. 58 is a detailed flowchart of the essential part of the delay-effect adding process in step 57-1 shown in FIG. 57. An AND operation of an incremented value of the DPOINTR and the DERIAAR is performed in step 58-1, and then an OR operation of this resultant value and the DERIAOR is performed with the result stored in the DPOINTR (DPOINTR←(DPOINTR+1)∩ DERIAAR ∪ DERIAOR), while the content of the DPOINTR is set on the address bus SA (address bus SA←DPOINTR). That is, if the result of the arithmetic operation in step 58-1, or the incremented value of the DPOINTR is within the memory area in use for a delay effect in the RAM 90-2 of the external memory 90, the incremented value indicates the content of the DPOINTR, and when the incremented value is beyond the last address, the value having returned to the head address indicates the content of the DPOINTR. In step 58-2, the value of the WAVER added to the DRDATAR is set at the data bus SD. This value on the data bus SD is written into the waveform data memory specified by the address bus SA, i.e., at the specified address of the RAM 90-2. As shown in FIG. 54, this corresponds to an arithmetic operation such that the output of the shift register 1*a*, after being attenuated by the attenuator 1*e*, is added to the value of the input data by the adder 1*g*, and the resultant value is again input (written) to the shift register 1*a*. In the next step 58-3 in FIG. 58, an AND operation of a value resulting from the addition of the DTIER to the DTIMER and the DERIAAR is performed, and then an OR operation of the ANDed result and the DERIAOR is performed with the resultant value set on the address bus SA (address bus←(DPOINTR+DTIMER)(∩ DERIAAR ∪ DERIAOR). In step 58-3, the same arithmetic operation as done in step in step 58-1 is performed, and an address is designated to read waveform data from the delay effect memory at the area incremented by an address corresponding to the DTIMER. According to this embodiment, DERIAAR–DTIMER corresponds to the actual delay time, as is apparent from the fact that a waveform held at the address following the DTIMER is really an old waveform of DERIAAR–DTIMER. In step 58-4, a value acquired by the addition of the WAVER to a value resulting from the multiplication of the DDEPTHR by the value on the data bus SD is stored in the WAVER, while a value originating from the multiplication of the DRPEATR by the value on the data bus SD is stored in the register DRDATAR in the RAM 206 (WAVER←WAVER+data register×DDEPTHR, DRDATAR←data register×DRPEATT). In other words, the waveform data of the waveform data memory (RAM 90-2) specified by the address bus SA is read out in step 58-4, thus providing a delay effect sound for the right channel.

The same processing as described above will be executed in steps 58-1 to 58-4 for the left channel, yielding a delay effect sound for the left channel.

Figure 59:
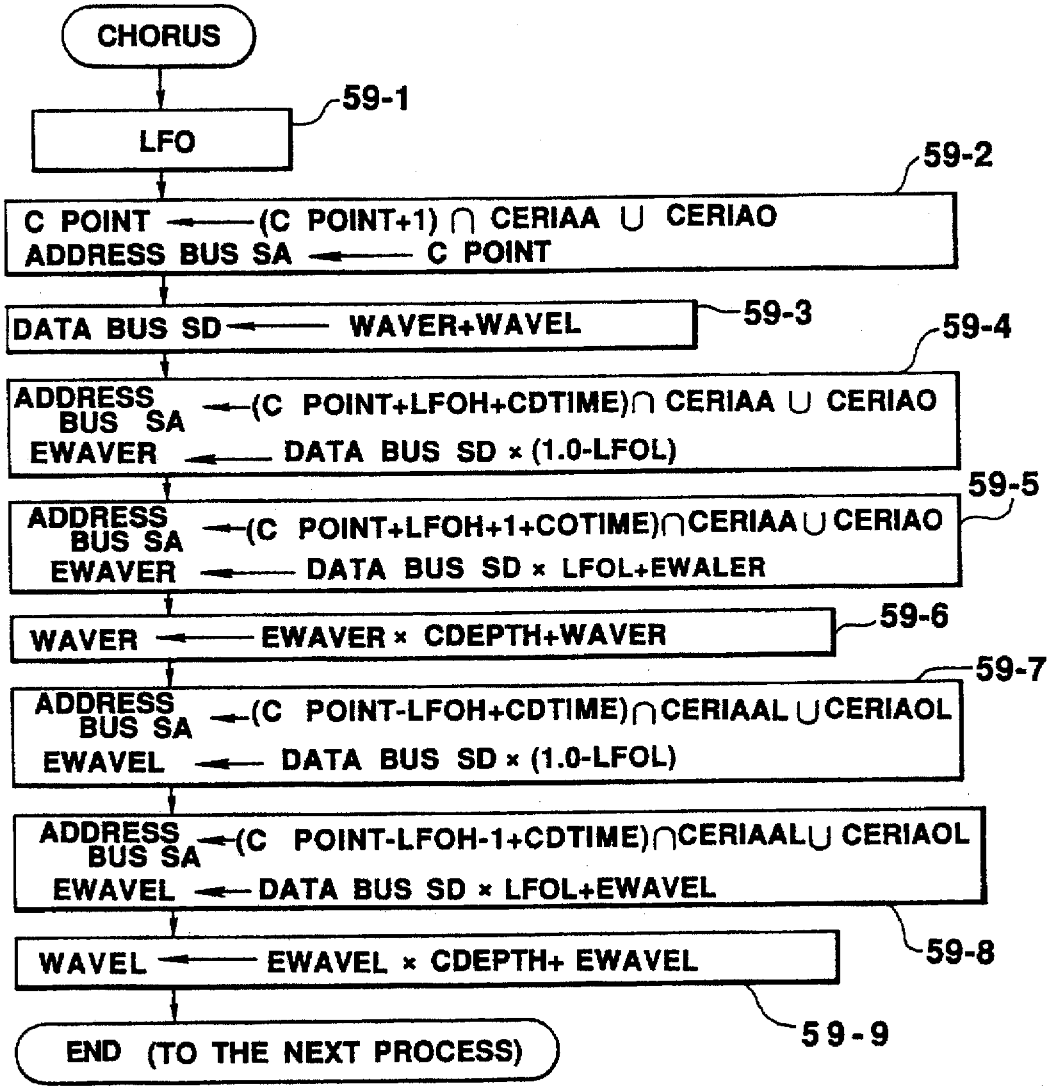
FIG. 59 is a detailed flowchart showing the process for adding a chorus effect (CHORUS) in FIG. 57.

FIG. 59 is a detailed flowchart of the essential part of the chorus-effect adding process in step 57-2 shown in FIG. 57. The operation of the low frequency oscillator (LFO) is performed to acquire waveform data for low frequency oscillation in step 59-1, in which registers LFO in the RAM 206 are used. In brief, the process in this step is to store a waveform to be generated as time information, angle information and information about a change in angle, to change the reading speed by means of counting means and accumulating means, and to send the output of the integer portion (LFOH) and the output of the fraction portion (LFOL) of the waveform. Through this process, a waveform having less distortion can be generated according to the frequency, and the output of the fraction portion (LFOL) with a constant change is easily obtained. In other words, after the process in step 59-1 is done, the outputs of integer portion and the fraction portion (LFOH and LFOL) of a waveform to be generated are acquired.

An AND operation of an incremented value of the CPOINT and the CERIAA is performed in step 59-2, and then an OR operation of this resultant value and the CERIAO is performed with the result stored in the CPOINT (CPOINT←(CPOINT+1)(∩ CERIAA ∪ CERIAO), while the content of the CPOINT is set on the address bus SA (address bus SA←CPOINT). That is, if the incremented value of the CPOINT is within the memory area in use for a chorus effect in the external RAM 90-2, the incremented value indicates the content of the CPOINT, and when the incremented value is beyond the last address of the associated area of the memory 90-2, the value having returned to the head address indicates the content of the CPOINT. In step 59-3, the value of the WAVER added to the WAVERL is set at the data bus SD. This value on the data bus SD is written into the waveform data memory specified by the address bus SD, i.e., at the specified address of the RAM 90-2. As shown in FIG. 53, this corresponds to an arithmetic operation such that the output of the adder 5305 is added to the output of the adder 5306 by the adder 5307, and the resultant value is supplied to the chorus-effect adding circuit 5302. In the next step 59-4, an AND operation of a value, resulting from the addition of the CPOINT, the LFOH and the CDTIME, to the CERIAA is performed, and then an OR operation of the ANDed result and the CERIAO is performed with the resultant value set on the address bus SA (address bus SA←(CPOINT+LFOH+CDTIME)∩ CERIAA∪ CERIAO). The resultant value output on the data bus SD is multiplied by a value acquired by the subtraction of the LFOL from 1.0, and the resultant value is stored in the EWAVER (EWAVER←data register×(1.0−LFOL)).

Figure 61:
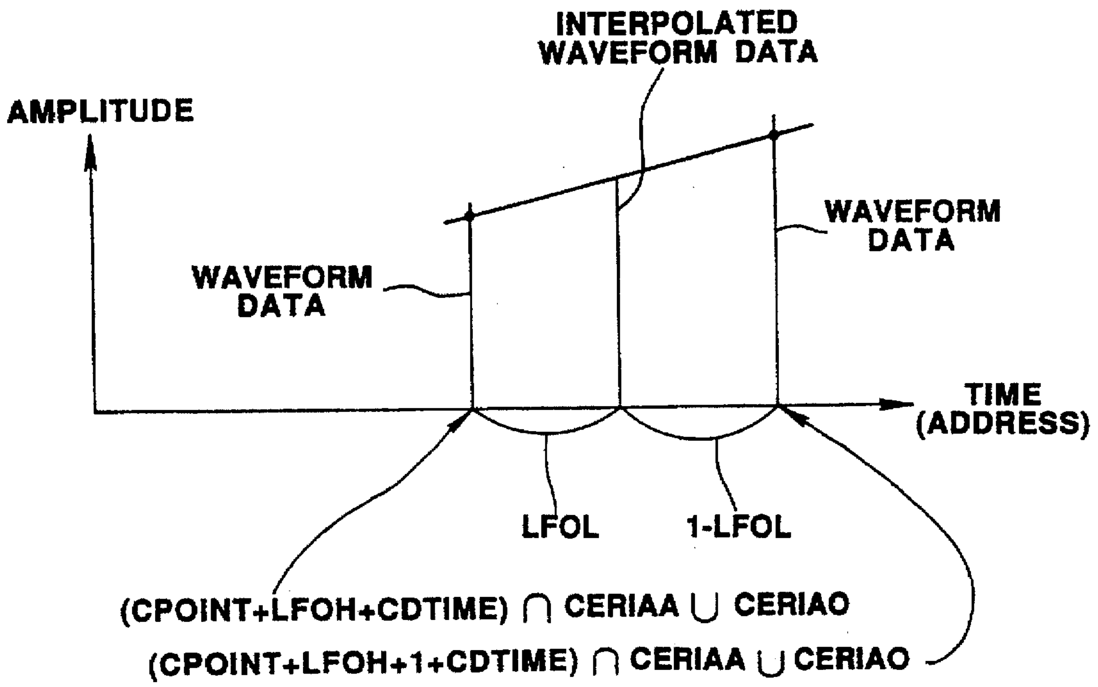
FIG. 61 is a diagram for explaining an arithmetic operation for the chorus effect.

In the next step 59-5, an AND operation of a value, resulting from the addition of the CPOINT, the LFOH, 1 and the CDTIME, to the CERIAA is performed, and then an OR operation of the ANDed result and the CERIAO is performed with the resultant value set on the address bus SA (address bus SA←(CPOINT+LFOH+1+CDTIME)∩ CERIAA ∪ CERIAO). The resultant value output on the data bus SD is multiplied by the LFOL, and then is added to the EWAVER, and the resultant value is stored in the EWAVER (EWAVER←data bus SD×LFOL+EWAVER). In steps 59-4 and 59-5, an address is designated to read waveform data from the chorus effect memory (provided in the RAM 90-2) at the area incremented by an address corresponding to the value acquired from the addition of the LFOH and the CDTIME, or the value acquired from the addition of the former value and 1. As shown in FIG. 61, two values of the waveform data memory addresses, shifted by "1" each other, are subject to be linear-interpolated, providing values corresponding to those in the fraction portion (LFOL). In steps 59-4 to 59-6, a value acquired by the addition of the WAVER to a value resulting from the multiplication of the EWAVER by the CDEPTH is stored in the WAVER. In steps 59-4 to 59-6, the read address is changed in accordance with the low-frequency waveform to change the delay time, thus providing a chorus-effect added sound for the right channel from which the waveform data is output.

In steps 59-7 and 59-8, as performed in the steps 59-4 and 59-5, an address is designated to read waveform data from the chorus effect memory (provided in the RAM 90-2) at the area incremented by an address corresponding to the value acquired from the subtraction of "1" from the value resulting from the addition of the–LFOH and the CDTIME. Two values of the waveform data memory addresses, shifted by "1" each other, are subject to be linear-interpolated, providing values corresponding to those in the fraction portion (LFOL). In other words, in steps 59-7 and 59-8, in contrast to the process for the right channel in steps 59-4 and 59-5, an address, which corresponds to the value of the output from the low frequency oscillator (LFO) inverted, is designated and read out, and then interpolating arithmetic operation is also performed as done in the process for the right channel. This corresponds to the process in FIG. 55 such that the low frequency oscillator **2*g* sends one of its outputs to the shift register 2*a* through the inverter 2*e* and the voltage control oscillator 2*c*, and the other output to the shift register 2*b* only through the voltage control oscillator 2*d*, reading the output at a different delay time. In step 59-9, the value of the WAVEL is added to the value of the CDEPTH multiplied by the EWAVEL and the result is stored in the WAVEL. In steps 59-7 to 59-9**, therefore, the read address is changed in accordance with the low-frequency waveform of the LFO, and the delay time is changed to provide a chorus-effect added sound for the left channel from which the waveform data is output.

Figure 60:
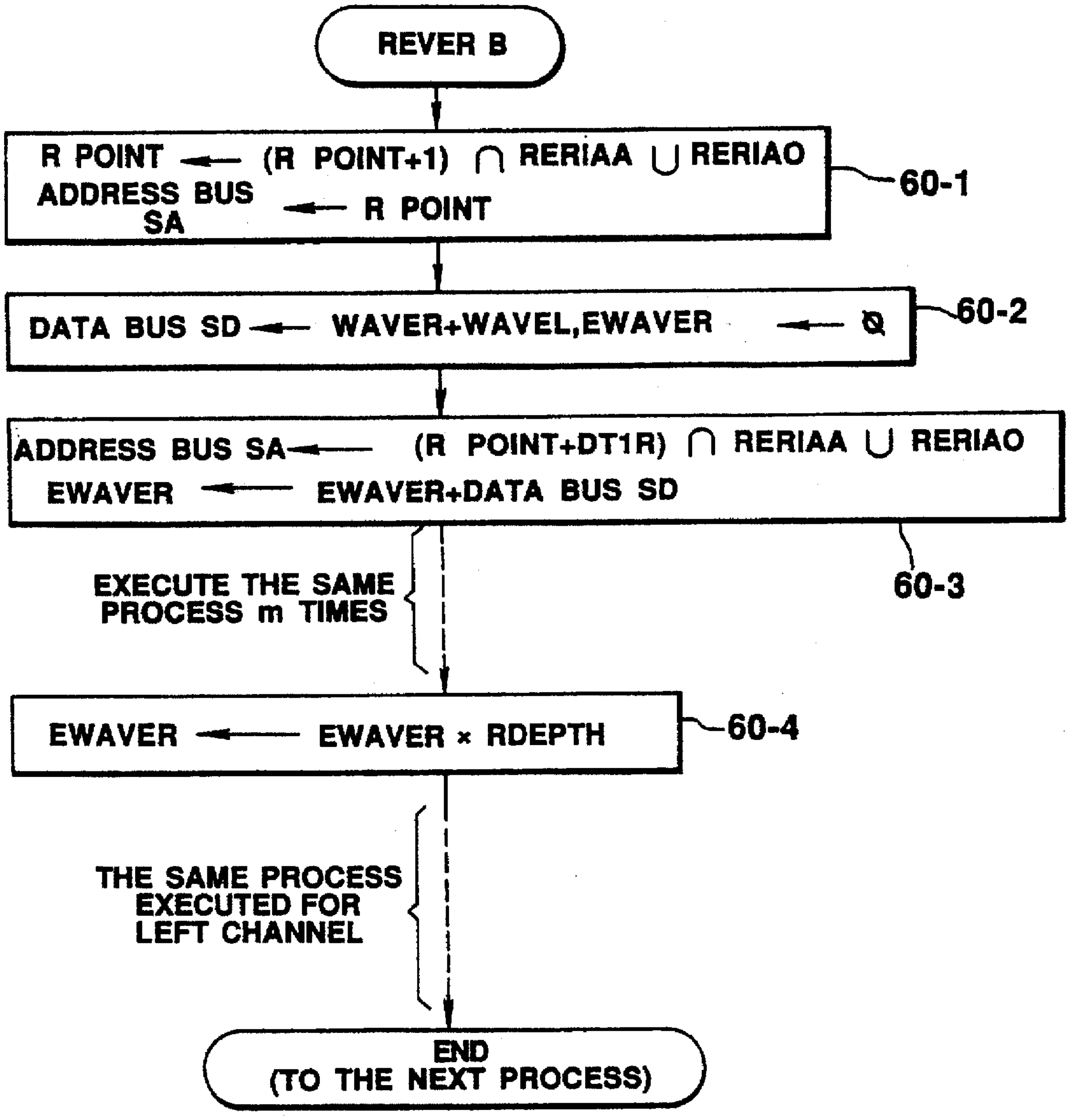
FIG. 60 is a detailed flowchart showing the process for adding a reverberation effect (REVERB) in FIG. 57.

FIG. 60 is a detailed flowchart of the essential part of the reverberation-effect adding process in step 57-3.in FIG. 57. An AND operation of an incremented value of the RPOINT and the RERIAA is performed in step 60-1, and then an OR operation of this resultant value and the RERIAO is performed with the result stored in the RPOINT (RPOINT←(RPOINT+1)∩ RERIAA ∪ RERIAO), while the content of the RPOINT is set on the address bus SA (address bus SA←RPOINT). That is, if the incremented value of the RPOINT is within the memory area in use for a reverberation effect in the RAM 90-2 of the external memory 90, the incremented value indicates the content of the RPOINT, and when the incremented value is beyond the last address in the associated area of the memory, the value having returned to the head address indicates the content of the RPOINT. In step 60-2, the value "0" is stored in the EWAVER, and the value of the WAVER added to the WAVEL is transferred to the data bus SD. As shown in FIG. 53, this corresponds to an arithmetic operation such that the output of the adder 5309 is added to the output of the adder 5310 by the adder 5311, and the resultant value is supplied to the revervberation-effect memory. This value on the data bus SD is written at the address of the waveform data memory (the external RAM 90-2) specified by the address bus SA. In the step 60-3, an AND operation of a value, resulting from the addition of the RPOINT and the DT1R to the RERIAA is performed, and then an OR operation of the ANDed result and the RERIAO is performed with the resultant value set on the address bus SA (address bus SA←(RPOINT+DT1R)∩ RERIAA ∪ RERIAO). The resultant value output on the data bus SD is added to the EWAVER. The resultant value is stored in the EWAVER (EWAVER←EWAVER+data bus SD). In steps 60-3, an address is designated to read waveform data from the reverberation effect memory (provided in the RAM 90-2) at the area incremented by an address corresponding to the delay time DT1R. The contents of the waveform data memory (RAM 90-2) at the designated address is added to the register EWAVER. Then, the waveform data of the reverberation effect is sequentially read from the area incremented by addresses corresponding to the delay times DT2R to DTmR, as in step 60-3. This corresponds to the addition of the outputs from the intermediate taps of the shift register **3*a* in the adder 3*c* in FIG. 56. A value obtained by multiplying the RDEPTH by the EWAVER is stored in the EWAVER in step 60-4. That is, the depth of the reverberation effect is multiplied by the waveform data of a reverberation-effect added sound, providing the output of the reverberation effect for the right channel. Then, the same processing as done in steps 60-2 to 60-4 is performed to obtain the output of the reverberation effect for the left channel. To permit the adders 5313 and 5314 in FIG. 53 to perform an operation equivalent to producing an effect output by synthesizing the outputs of the effect circuits at the previous stage, the process in step 60-4** may be changed to EWAVER←EWAVER×RDEPTH+WAVER, while the process for the left channel may be likewise changed to EWAVEL←EWAVEL×RDEPTH+WAVEL. Through these altered steps, the ratio of the original tone to a reverberation tone will be determined by the RDPTH.

As described above, the SCPU 20 produces an effect-added stereo outputs in time-shared processing within one sampling while using the external memory (RAM) 90-2 on the software basis.

According to this embodiment, the DAC 100 converts an effect-added digital tone signal generated by the SCPU 20 to an analog tone signal. As shown in step 57-4 in FIG. 57, the SCPU 20 sets the samples EWAVER and EWAVEL of an effect-added digital tone signal generated by the SCPU 20 to the DAC 100 (right DAC 100R and left DAC 100L) in the timer interrupt routine. The execution interval of the process in step 57-4 is equal to the interval of occurrence of the interrupt signal INT, which is generated by the timer interrupt generator 116 of the MCPU 10. The actual execution interval, however, varies because of the operation of the program. If D/A conversion is conducted with the execution interval of the process 57-4 as a D/A conversion cycle, therefore, significant distortion will occur on the resultant analog tone signal.

This problem, however, can be solved by the structure as illustrated in FIG. 33, which has been explained earlier in association with the first embodiment.

FIG. 52 illustrates the time chart indicating the time-sequential operational flow of this embodiment. When an interrupt signal INT is generated as apparent from the drawing, the MCPU 10 interrupts the execution of the main flow, and in turn executes the interrupt routine. In this case, first of all, data is transferred to the SCPU 20, and after such data transfer is completed, an operation start signal A is sent to the SCPU 20 to execute tone generation. In reception of the signal A, the SCPU 20 executes an effect process with respect to a tone signal generated from the MCPU 10. When the SCPU ends the process, it enters in the waiting status.

As described above, a digital information processing apparatus for an electric musical instrument of this embodiment has multiple CPUs, the MCPU 10 and the SCPU 20, which share and execute to generate a single musical tone and to add effects to a musical tone according to an incorporated program.

<Modification and Advantages>

The embodiment of the present invention has been described, and can be variously modified within the scope of the present invention. Although this embodiment uses only one SCPU, more than one SCPU can be used for tone generation.

Alternatively, tone generation may be shared by multiple CPUs, and an effect process for the output musical tone signal may be performed by one or multiple CPUs.

As an example of allotting of the task to multiple CPUs, one CPU handles the envelope process, another performs the waveform process, and the other CPU executes the effect process.

As another aspect, one CPU may deal with the general control of the system, while another CPU may execute the tone generating process, with the other CPU performing the effect process.

Neither case requires a specially-designed hardware-based circuit for the effect process, and the contents of various processes can be altered by changing the associated programs, thus simplifying the circuit design.

Further, although the MCPU 10 and the SCPU 20 are realized on one chip according to the above embodiments, they may be provided on separate chips, or more CPUs may be provided on a single chip. The optimal design has only to be employed depending on the integration of the semiconductor devices. Other modifications are also possible: the external memories 90-1 and 90-2 may be provided together with the MCPU 10 and SCPU 20 on a single chip, and that the DAC 100 may be located on a separate chip.

In the tone generating process, the number of polyphonic sounds (the number of tone generating channels) and the tone generating system may be modified as needed. Particularly, regarding the tone generating system, not only the PCM system as described above but also a waveform coding system, such as a DPCM system or ADPCM system, a nonlinear modulation system, such as an FM tone generating system, PD tone generating system, or iPD tone generating system, can be realized by the software processing of the CPUs each having a tone generating program stored in its control ROM (or in a RAM, if necessary).

The content of an effect process may take other forms than the above-described delay, chorus and reverberation. As long as the effect processing program is stored in the control ROM (in the RAM if needed), the effect process can be executed by the software processing of the CPUs.

According to the above embodiments, signals of eight musical tones are all synthesized, and then a series of the effects are added to the result. However, tone generating channels may be designed to have a one-to-one relation or multiple-to-on relation to effect processing channels, for example, so that the effect process is separately performed for each pair or group. For example, multiple tone generating channels may be assigned to a melody and accompaniment to generate tone signals, and independent effect-adding processing may be performed on tone signals resulting from separately synthesizing the generated tone signals.

Various types of outputs are possible, such as a monaural output, or four-channel outputs, beside the stereo outputs as obtained in the above embodiments.

According to these embodiments, the tone generation and effect process in the respective CPUs are executed by running the interrupt program which is invoked by the interrupt signal. The subroutine may be designed not to be invoked by the interrupt. In this case, a no operation command (NOP command or dummy command) has only to be distributed wherever necessary in the program in such a way that the intervals between one execution of the subroutine to the next execution thereof becomes constant irrespective of the conditions.

As described above, according to the embodiments, since multiple CPUs take their share of a process for generating tone signals, and an effect process for adding an effect to these signals according to their own programs. It is therefore possible to provide a digital information processing apparatus for use in an electronic musical instrument, which, unlike the prior art apparatus, does not depend on a specially-designed hardware-based tone generating circuit and a hardware-based digital effect circuit.

The functions of the apparatus may altered or new functions may be added thereto basically by changing the associated programs which are to executed by the individual CPUs, thus eliminating the need for significant alteration of the hardware circuit.

Further, since the main CPU and the sub CPU can share the tone generating process and the effect-adding process, thus facilitating their structures and controls. Also, since it is possible to generate a musical tone signal to which an effect is added in perfect synchronism with the sampling period, musical tones with less distortion can be released outside.

The present invention has been described in detail with reference to several embodiments which are each applied to an electronic musical instrument. These embodiments, however, are not restrictive but just illustrative, and the present invention may be modified in various other manners. The present invention can be applied to various electronic apparatus, such as general-purpose computer systems, using CPUs, as well as various types of audio apparatuses and video apparatuses.

Therefore, all modifications and applications of the present invention as described above are within the scope of the present invention, and this scope of the invention should be determined only by the appended claims and their equivalents.

what is claimed is:

1. A digital information processing apparatus comprising:

at least first and second CPUs for executing respective programs of a multi-channel tone waveform generation process, said first and second CPUs being coupled to each other and including respective means to perform at least a portion of said multi-channel tone waveform generation process, wherein a plurality of tone waveform signals are output in parallel from only one of said first and second CPUs responsive to execution of said respective programs of said multi-channel waveform generation process, without using either a tone generating circuit or discrete oscillators.

2. The digital information processing apparatus of claim 1, further comprising:

parallel-process start signal generating means for generating a parallel-process start signal;

CPU-mode control means for controlling mode switching so as to switch a mode of said first and second CPUs to an execution mode for predetermined processes respectively allotted to each of said first and second CPUs, in response to said parallel-process start signal, thereby ensuring said first and second CPUs realize parallel processing of tone generation of said plurality of tone waveform signals.

3. A digital microcomputer comprising:

a main CPU for executing a main program to process various control inputs and an interrupt routine incorporated therein to generate a plurality of tone waveform signals;

at least one sub CPU for executing a program for executing a process to generate a plurality of tone waveform signals assigned by said main program of said main CPU;

interrupt signal generating means for generating an interrupt signal each time a predetermined time elapses;

main-CPU mode control means for switching a mode of said main CPU to interrupt said main program being executed by said main CPU and execute said interrupt routine in response to said interrupt signal, and for switching said mode of said main CPU back to a mode to execute said main program again upon completion of execution of said interrupt routine;

sub-CPU mode control means for switching a mode of said sub CPU from an idle status to a mode to execute said program of said sub CPU in response to said interrupt signal, and for rendering said sub CPU again in said idle status upon completion of execution of said program of said sub CPU; and wherein said plurality of tone waveform signals are generated and output in parallel from said main CPU by executing said interrupt routine in said main CPU and said program in said sub CPU, without using either a tone generating circuit or discrete oscillators.

4. A digital microcomputer comprising:

a main CPU for executing a main program to process various control inputs and an interrupt routine to generate a plurality of tone waveform signals;

at least one sub CPU having an internal memory;

interrupt signal generating means for generating a timer interrupt signal each time a predetermined time elapses;

main-CPU mode control means for switching a mode of said main CPU to an interrupt mode in which the main program executed by said main CPU is interrupted and said main CPU is caused to execute the interrupt routine in response to said timer interrupt signal, and for switching said mode of said main CPU back to an execute mode to restart said interrupted main program and execute said main program upon completion of execution of said interrupt program;

sub-CPU mode control means for switching a mode of said sub CPU from an idle status mode to a an execute mode for executing a program of said sub CPU in response to said timer interrupt signal to generate a plurality of tone waveform signals, and for switching said mode of said sub CPU back to said idle status mode upon completion of execution of said program of said sub CPU;

sub-CPU mode signal generating means, provided in said sub CPU-mode control means, for generating a signal representing the idle status mode;

sub-CPU mode detecting means, provided in said main CPU, for detecting said mode of said sub CPU upon reception of said mode-representing signal from said sub-CPU mode signal generating means;

sub-CPU access means, provided in said main CPU, for accessing the internal memory of said sub CPU while said sub CPU is detected to be in said idle status mode by said sub-CPU mode detecting means; and wherein said plurality of tone waveform signals are generated and output in parallel from said main CPU by executing said interrupt routine in said main CPU and said program in said sub CPU, without using either a tone generating circuit or discrete oscillators.

5. A digital microcomputer, comprising:

a first CPU for executing a program to generate a plurality of tone waveform signals;

a second CPU with an internal memory for executing a program to generate a plurality of tone waveform signals;

said first CPU including access-request signal generating means for generating an excess request signal when executing a command to access the internal memory of said second CPU;

said second CPU including operation interrupt means for interrupting an operation being executed by said second CPU so as to set said internal memory free for said first CPU in response to said access request signal;

said first CPU further including access executing means for executing an access operation to access said internal memory of said second CPU when said internal memory is rendered free for said first CPU, and access end signal generating means for generating an access end signal when said access executing means completes said access operation;

said second CPU further comprising operation restart means for restarting said interrupted operation in response to said access end signal; and wherein said plurality of tone waveform signals are generated and output in parallel from said first CPU by executing said programs in said first CPU and said second CPU, without using either a tone generating circuit or discrete oscillators.

6. A digital microcomputer having a first CPU and a second CPU including an internal memory, comprising:

first clock generating means for generating a clock signal to enable said first CPU;

said first CPU executing a program to generate a plurality of tone waveform signals;

second clock generating means for generating a clock signal to enable said second CPU;

said second CPU executing a program to generate a plurality of tone waveform signals;

clock stop means for disabling said second clock generating means in response to an access request signal output from said first CPU when said first CPU executes a command to access the internal memory of said second CPU, thereby interrupting an operation being executed by said second CPU and setting said second CPU in an idle state;

access-path switching means for switching an access path to said internal memory of said second CPU from a first access path to be used by said second CPU to a second access path to be used by said first CPU, in response to said access request signal;

access executing means for executing an access operation to access said internal memory of said second CPU from said first CPU through said second access path switched by said access-path switching means;

access-path restoring means for switching said access path to said internal memory from said second access path to be used by said first CPU to said first access path to be used by said second CPU, in response to an access end signal from said first CPU, representing an end of said access operation;

clock restarting means for restarting said second clock generating means in response to said access end signal to thereby restart said interrupted operation in said second CPU from said idle state; and wherein said plurality of tone waveform signals are generated and output in parallel from said first CPU by executing said programs in said first and second CPUs, without using either a tone generating circuit or discrete oscillators.

7. A digital information processing apparatus for use in an electronic musical instrument, comprising:

one main CPU;

at least one sub-CPU; and means for permitting said main CPU and said sub CPU to execute respective programs for taking a share of executing individual portions of a process of generating tone waveform signals, wherein said main CPU executes a program of a first process, which is a first portion of a multiple tone signal generating process, and said sub CPU executes a program of a second process which is the remaining portion of said multiple tone signal generating process in accordance with a result of said process executed by said main CPU, and wherein said tone waveform signals are generated and output in parallel from said main CPU, without using either a tone generating circuit or discrete oscillators.

8. A digital information processing apparatus having one main CPU and at least one sub CPU to be controlled by said main CPU, said main CPU comprising:

MCPU program storage means for storing a process program representing a predetermined process to generate a plurality of tone waveform signals;

MCPU address control means for controlling an address of said MCPU program storage means;

MCPU data storage means for storing data necessary for said predetermined process;

MCPU arithmetic operation means coupled to said MCPU program storage means and to said MCPU data storage means for executing an arithmetic operation; and MCPU operation control means for decoding individual commands of said program stored in said MCPU program storage means and controlling operations of said MCPU address control means, said MCPU data storage means and said MCPU arithmetic operation means;

said at least one sub CPU comprising:

SCPU program storage means for storing a process program representing a predetermined process to generate a plurality of tone waveform signals;

SCPU address control means for controlling an address of said SCPU program storage means;

SCPU data storage means for storing data necessary for said predetermined process;

SCPU arithmetic operation means coupled to said SCPU program storage means and to said SCPU data storage means for executing an arithmetic operation; and SCPU operation control means for decoding individual commands of said program stored in said SCPU program storage means and controlling operations of said SCPU address control means, said SCPU data storage means and said SCPU arithmetic operation means; and said digital information processing apparatus further comprising:

parallel-process start signal generating means for generating a parallel-start signal; and CPU-mode control means for controlling mode switching so as to switch a mode of said one main CPU and said at least one sub CPU to an sub CPU to an execution mode for a predetermined process allotted to said CPUs, in response to said parallel-process start signal, thereby ensuring said one main CPU and said at least one sub CPU realize parallel processing; and wherein said plurality of tone waveform signals are generated and output in parallel from said main CPU by executing said programs in said main CPU and in said sub CPU, without using either a tone generating circuit or discrete oscillators.

9. A digital information processing apparatus having a plurality of CPUs including one main CPU and at least one sub CPU to be controlled by said main CPU, said main CPU comprising:

MCPU program storage means for storing a process program representing a predetermined process to generate a plurality of tone waveform signals;

MCPU address control means for controlling an address of said MCPU program storage means;

MCPU data storage means for storing data necessary for said predetermined process;

MCPU arithmetic operation means coupled to said MCPU program storage means and to said MCPU data storage means for executing an arithmetic operation; and MCPU operation control means for decoding individual commands of said program stored in said MCPU program storage means and controlling operations of said MCPU address control means, said MCPU data storage means and said MCPU arithmetic operation means;

said at least one sub-CPU comprising:

SCPU program storage means for storing a process program representing a predetermined process to generate a plurality of tone waveform signals;

SCPU address control means for controlling an address of said SCPU program storage means;

SCPU data storage means for storing data necessary for said predetermined process;

SCPU arithmetic operation means coupled to said SCPU program storage means and to said SCPU data storage means for executing an arithmetic operation; and SCPU operation control means for decoding individual commands of said program stored in said SCPU program storage means and controlling operations of said SCPU address control means, said SCPU data storage means and said SCPU arithmetic operation means; and said digital information processing apparatus further comprising:

a common read-only memory means shared by said plurality of CPUs;

a plurality of address latch means for respectively latching addresses for said common read-only memory means output from said plurality of CPUs;

address select means, provided between said plurality of address latch means and said common read-only memory means, for selecting an address output from any of said plurality of address latch means;

a plurality of output-data latch means, provided between said common read-only memory means and said plurality of CPUs, for selectively latching data output from said common read-only memory means to distribute said data to a desirable one of said plurality of CPUs;

control means for, in response to access request signals output from two or more of said plurality of CPUs when simultaneously requesting access to said common read-only memory means, controlling said address select means, said common read-only memory means and said plurality of output-data latch means in a sequence so as to execute an actual access operation to said common read-only memory means for each of said two or more CPUs requesting said address without causing any overlapping; and wherein said plurality of tone waveform signals are generated and output in parallel from said main CPU by executing said programs in said main and in said sub CPUs, without using either a tone generating circuit or discrete oscillators.

* * * * *